US012633054B2

(12) United States Patent
Jang et al.

(10) Patent No.: US 12,633,054 B2
(45) Date of Patent: May 19, 2026

(54) ROUTE GUIDANCE DEVICE AND ROUTE GUIDANCE SYSTEM BASED ON AUGMENTED REALITY AND MIXED REALITY

(71) Applicant: LG ELECTRONICS INC., Seoul (KR)

(72) Inventors: Yujung Jang, Seoul (KR); Kihyung Lee, Seoul (KR); Sunghwan Choi, Seoul (KR); Seungman Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 73 days.

(21) Appl. No.: 18/567,889

(22) PCT Filed: Jul. 12, 2022

(86) PCT No.: PCT/KR2022/010144
§ 371 (c)(1),
(2) Date: Dec. 7, 2023

(87) PCT Pub. No.: WO2023/287172
PCT Pub. Date: Jan. 19, 2023

(65) Prior Publication Data
US 2024/0271953 A1 Aug. 15, 2024

Related U.S. Application Data

(60) Provisional application No. 63/221,467, filed on Jul. 13, 2021.

(51) Int. Cl.
*G06T 17/05* (2011.01)
*B60K 35/23* (2024.01)
(Continued)

(52) U.S. Cl.
CPC .............. *G06T 17/05* (2013.01); *B60K 35/23* (2024.01); *B60K 35/28* (2024.01); *G01C 21/30* (2013.01);
(Continued)

(58) Field of Classification Search
CPC .. G06T 17/05; G06T 7/80; G06T 7/73; G06T 15/04; G06T 19/00; G06T 19/006;
(Continued)

(56) References Cited

U.S. PATENT DOCUMENTS 5,802,492 A 9/1998 DeLorme et al.
7,860,301 B2 12/2010 Se et al.
(Continued)

FOREIGN PATENT DOCUMENTS

CN 109974733 7/2019
EP 3244591 11/2017
(Continued)

OTHER PUBLICATIONS

Shohin Aheleroff, Xun Xu, Ray Y. Zhong, Yuqian Lu, "Digital Twin as a Service (DTaaS) in Industry 4.0: An Architecture Reference Model" Dec. 16, 2020 (Year: 2020).*
(Continued)

*Primary Examiner* — Scott A Browne
*Assistant Examiner* — Terry C Buse
(74) *Attorney, Agent, or Firm* — LEE, HONG, DEGERMAN, KANG & WAIMEY

(57) ABSTRACT

A path navigating device including a transceiver and receiver that communicates with a vehicle and a cloud server, an interface unit that receives an image of an environment around the vehicle and sensing information that has sensed a driving state of the vehicle from the vehicle, an augmented reality (AR) engine that renders an AR view image including AR information, a mixed reality (MR)
(Continued)

navigation engine that renders a MR view image including MR information, and a processor that detects a view image that matches a current driving situation of the vehicle and controls the interface unit to display an AR view image or an MR view image on a display of the vehicle.

21 Claims, 30 Drawing Sheets

(51) Int. Cl.

| | |
|---|---|
| B60K 35/28 | (2024.01) |
| G01C 21/00 | (2006.01) |
| G01C 21/30 | (2006.01) |
| G01C 21/36 | (2006.01) |
| G06F 9/54 | (2006.01) |
| G06T 7/73 | (2017.01) |
| G06T 7/80 | (2017.01) |
| G06T 15/04 | (2011.01) |
| G06T 19/00 | (2011.01) |
| G06V 10/44 | (2022.01) |
| G06V 10/74 | (2022.01) |
| G06V 10/94 | (2022.01) |
| G06V 20/10 | (2022.01) |
| G06V 20/56 | (2022.01) |

(52) U.S. Cl.
CPC ..... *G01C 21/3602* (2013.01); *G01C 21/3635* (2013.01); *G01C 21/3638* (2013.01); *G01C 21/3641* (2013.01); *G01C 21/3644* (2013.01); *G01C 21/3647* (2013.01); *G01C 21/365* (2013.01); *G01C 21/367* (2013.01); *G01C 21/3682* (2013.01); *G01C 21/3881* (2020.08); *G06F 9/543* (2013.01); *G06T 7/73* (2017.01); *G06T 7/80* (2017.01); *G06T 15/04* (2013.01); *G06T 19/00* (2013.01); *G06T 19/006* (2013.01); *G06V 10/44* (2022.01); *G06V 10/761* (2022.01); *G06V 10/95* (2022.01); *G06V 20/176* (2022.01); *G06V 20/56* (2022.01); *B60K 2360/166* (2024.01); *B60K 2360/177* (2024.01); *B60K 2360/21* (2024.01); *G06T 2200/24* (2013.01); *G06T 2207/10028* (2013.01); *G06T 2207/30252* (2013.01)

(58) Field of Classification Search
CPC ....... G06T 2200/24; G06T 2207/10028; G06T 2207/30252; G06V 20/56; B60K 35/28; B60K 35/23; B60K 2360/21; B60K 2360/166; B60K 2360/177; G01C 21/30; G01C 21/3602; G01C 21/3635; G01C 21/3638; G01C 21/3641; G01C 21/3644; G01C 21/3647; G01C 21/365; G01C 21/367; G01C 21/3682; G06F 9/543
See application file for complete search history.

(56) References Cited

U.S. PATENT DOCUMENTS

| | | | |
|---|---|---|---|
| 8,564,607 B2 | 10/2013 | Lee et al. | |
| 9,195,390 B2* | 11/2015 | Wu .................... | G06F 3/04883 |
| 9,945,676 B2 | 4/2018 | Wong et al. | |
| 10,268,195 B2 | 4/2019 | Majumdar et al. | |
| 10,366,290 B2 | 7/2019 | Wang et al. | |
| 11,276,234 B2 | 3/2022 | Choi et al. | |
| 11,610,342 B2 | 3/2023 | Wan et al. | |
| 11,651,565 B2 | 5/2023 | McCall | |
| 12,229,874 B1 | 2/2025 | Mousseau | |
| 2007/0260628 A1 | 11/2007 | Fuchs et al. | |
| 2009/0289937 A1 | 11/2009 | Flake et al. | |

| | | | |
|---|---|---|---|
| 2010/0235080 A1 | 9/2010 | Faenger et al. | |
| 2012/0221241 A1 | 8/2012 | Nurmi | |
| 2012/0254263 A1 | 10/2012 | Hiestermann et al. | |
| 2013/0147837 A1 | 6/2013 | Stroila | |
| 2014/0053099 A1 | 2/2014 | Groten | |
| 2014/0277939 A1 | 9/2014 | Ren et al. | |
| 2014/0301645 A1 | 10/2014 | Mattila | |
| 2017/0330034 A1 | 11/2017 | Wang et al. | |
| 2018/0058879 A1 | 3/2018 | Tayama et al. | |
| 2018/0066956 A1* | 3/2018 | Kim ..................... | G01C 21/365 |
| 2018/0079427 A1 | 3/2018 | Herz et al. | |
| 2018/0196427 A1* | 7/2018 | Majumdar ........... | G05D 1/0061 |
| 2018/0227974 A1 | 8/2018 | Puttagunta et al. | |
| 2019/0017839 A1 | 1/2019 | Eyler et al. | |
| 2019/0043235 A1 | 2/2019 | Tsushima et al. | |
| 2019/0050905 A1 | 2/2019 | Nomura et al. | |
| 2019/0066382 A1 | 2/2019 | Kubo et al. | |
| 2019/0166352 A1 | 5/2019 | Alaniz et al. | |
| 2019/0182613 A1 | 6/2019 | Mate et al. | |
| 2019/0304202 A1 | 10/2019 | Zhou et al. | |
| 2020/0004332 A1 | 1/2020 | Jeon et al. | |
| 2020/0042083 A1 | 2/2020 | Min | |
| 2020/0062179 A1 | 2/2020 | Kim | |
| 2020/0074061 A1 | 3/2020 | Kim | |
| 2020/0153885 A1 | 5/2020 | Lee et al. | |
| 2020/0255026 A1* | 8/2020 | Katardjiev ....... | G08G 1/096741 |
| 2020/0273235 A1 | 8/2020 | Emami et al. | |
| 2020/0304375 A1* | 9/2020 | Chennai ..................... | G06T 7/70 |
| 2020/0309557 A1 | 10/2020 | Efland | |
| 2020/0309558 A1 | 10/2020 | Cowburn et al. | |
| 2021/0036834 A1 | 2/2021 | Lee et al. | |
| 2021/0056762 A1 | 2/2021 | Robbe et al. | |
| 2021/0125411 A1 | 4/2021 | Choi et al. | |
| 2021/0134248 A1 | 5/2021 | Wan et al. | |
| 2021/0142526 A1 | 5/2021 | Mantyjarvi et al. | |
| 2021/0148713 A1 | 5/2021 | Yu et al. | |
| 2021/0150236 A1 | 5/2021 | Yu et al. | |
| 2021/0158779 A1 | 5/2021 | Singh | |
| 2021/0190530 A1 | 6/2021 | Jung et al. | |
| 2021/0201584 A1 | 7/2021 | Ha et al. | |
| 2021/0207971 A1 | 7/2021 | Kim et al. | |
| 2022/0163337 A1* | 5/2022 | Ju ...................... | G01C 21/3423 |
| 2022/0254119 A1 | 8/2022 | Berliner et al. | |
| 2023/0058169 A1* | 2/2023 | Cella ......................... | G06N 3/08 |
| 2023/0245391 A1* | 8/2023 | Adkinson ................. | G06T 7/50 |
| | | | 345/419 |
| 2024/0096037 A1 | 3/2024 | Warren et al. | |
| 2024/0290143 A1 | 8/2024 | Famiglietti et al. | |
| 2024/0318974 A1 | 9/2024 | Jang et al. | |
| 2024/0344841 A1 | 10/2024 | Jang et al. | |
| 2025/0076079 A1 | 3/2025 | Wannerberg | |
| 2025/0076080 A1 | 3/2025 | Phillips | |
| 2025/0153735 A1 | 5/2025 | Li et al. | |
| 2025/0171051 A1 | 5/2025 | Li et al. | |

FOREIGN PATENT DOCUMENTS

| | | |
|---|---|---|
| KR | 10-2004-0025150 | 3/2004 |
| KR | 10-2008-0076456 | 8/2008 |
| KR | 10-2016-0059376 | 5/2016 |
| KR | 10-2017-0056752 | 5/2017 |
| KR | 10-2019-0085894 | 7/2019 |
| KR | 10-2021-0059980 | 5/2021 |
| KR | 10-2021-0080936 | 7/2021 |
| KR | 10-2021-0087271 | 7/2021 |
| WO | 2021133053 | 7/2021 |

OTHER PUBLICATIONS

United States Patent and Trademark Office U.S. Appl. No. 18/550,422, Notice of Allowance dated Apr. 3, 2024, 23 pages.
European Patent Office Application Serial No. 22842418.0, Search Report dated Mar. 10, 2025, 9 pages.
European Patent Office Application Serial No. 22842415.6, Search Report dated Apr. 7, 2025, 11 pages.
European Patent Office Application Serial No. 22842438.8, Search Report dated Mar. 21, 2025, 11 pages.

(56)　　　　　References Cited

OTHER PUBLICATIONS

European Patent Office Application Serial No. 22842434.7, Search Report dated Oct. 25, 2024, 10 pages.
European Patent Office Application Serial No. 22842439.6, Search Report dated Nov. 18, 2024, 7 pages.
PCT International Application No. PCT/KR2022/010144, International Search Report dated Oct. 7, 2022, 5 pages.
European Patent Office Application Serial No. 22842431.3, Search Report dated Aug. 13, 2024, 17 pages.
European Patent Office Application Serial No. 22842414.9, Search Report dated Oct. 14, 2024, 13 pages.
Matsumoto et al., "Dracena: Real-Time Digital Twin Platform: Fujitsu Global," XP093026753, May 2020, 18 pages.
Fernandez et al., "Associated Reality: A cognitive Human-Machine Layer for autonomous driving," Robotics and Autonomous Systems, XP086272130, Aug. 2020, 15 pages.
United States Patent and Trademark Office U.S. Appl. No. 18/579,215, Office Action dated Oct. 7, 2025, 14 pages.
United States Patent and Trademark Office U.S. Appl. No. 18/579,180, Office Action dated Oct. 28, 2025, 8 pages.
Korean Intellectual Property Office Application No. 10-2023-7022159, Office Action dated Jul. 28, 2025, 9 pages.
United States Patent and Trademark Office U.S. Appl. No. 18/579,000, Office Action dated Jul. 29, 2025, 22 pages.
Wang et al., "A Digital Twin Paradigm: Vehicle-to-Cloud Based Advanced Driver Assistance Systems," IEEE Xplore, Jun. 2020, 6 pages.
Korean Intellectual Property Office Application No. 10-2023-7026072, Office Action dated May 27, 2025, 4 pages.
United States Patent and Trademark Office U.S. Appl. No. 18/579,180, Office Action dated Jun. 18, 2025, 9 pages.
United States Patent and Trademark Office U.S. Appl. No. 18/569,418, Office Action dated Jun. 30, 2025, 41 pages.
United States Patent and Trademark Office U.S. Appl. No. 18/567,587, Notice of Allowance dated Jul. 11, 2025, 22 pages.

* cited by examiner

HEIGHT
DIRECTION(H)

WIDTH
DIRECTION(W)

OVERALL-LENGTH
DIRECTION(L)

FIG. 13
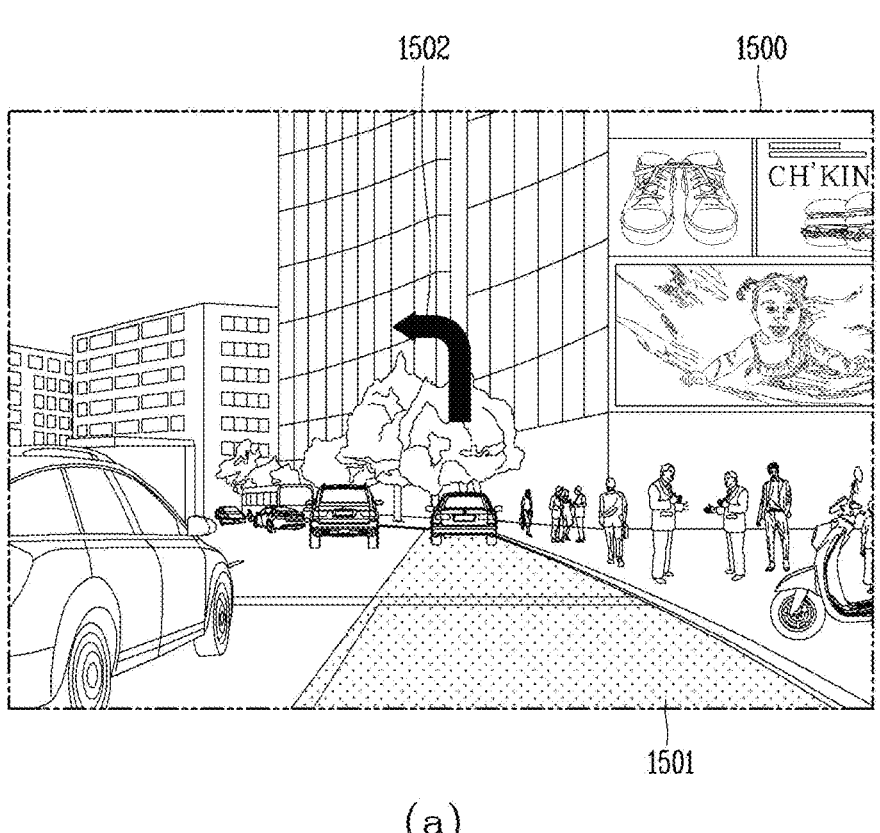
(a)
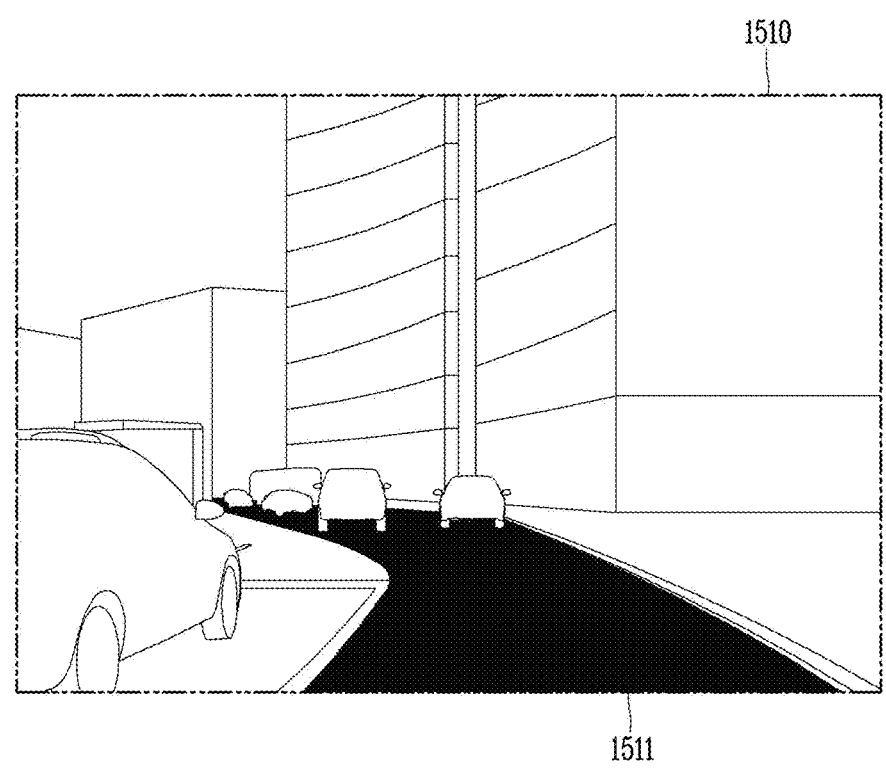
(b)

FIG. 15A

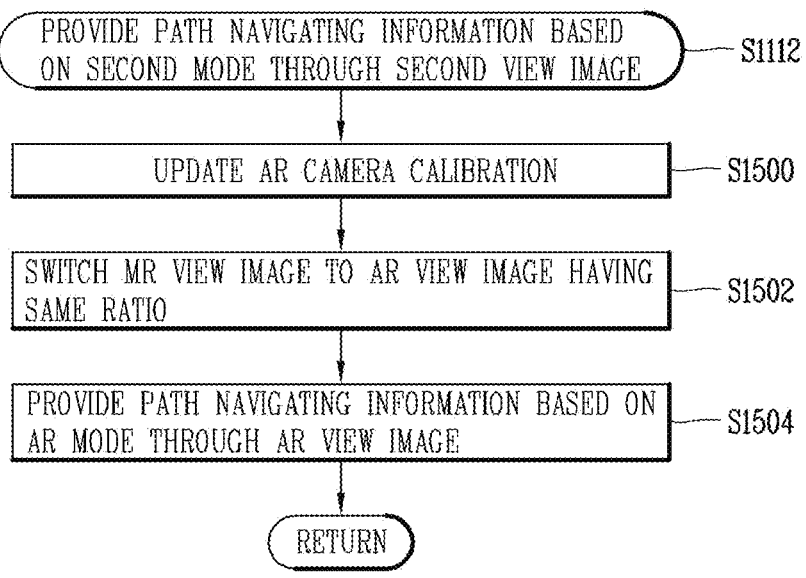

PROVIDE PATH NAVIGATING INFORMATION BASED ON SECOND MODE THROUGH SECOND VIEW IMAGE — S1112

UPDATE AR CAMERA CALIBRATION — S1500

SWITCH MR VIEW IMAGE TO AR VIEW IMAGE HAVING SAME RATIO — S1502

PROVIDE PATH NAVIGATING INFORMATION BASED ON AR MODE THROUGH AR VIEW IMAGE — S1504

RETURN

FIG. 15B

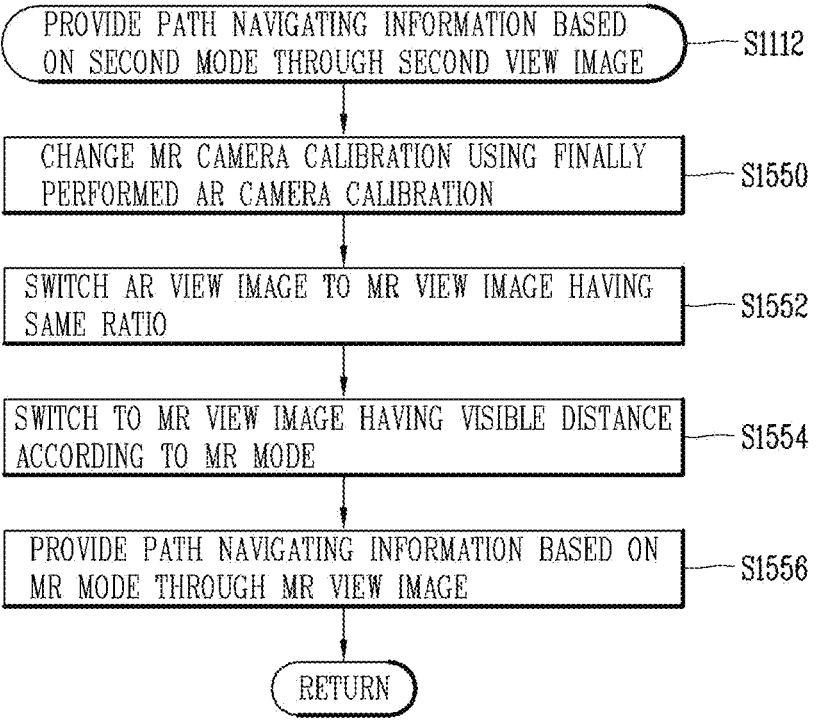

PROVIDE PATH NAVIGATING INFORMATION BASED ON SECOND MODE THROUGH SECOND VIEW IMAGE — S1112

CHANGE MR CAMERA CALIBRATION USING FINALLY PERFORMED AR CAMERA CALIBRATION — S1550

SWITCH AR VIEW IMAGE TO MR VIEW IMAGE HAVING SAME RATIO — S1552

SWITCH TO MR VIEW IMAGE HAVING VISIBLE DISTANCE ACCORDING TO MR MODE — S1554

PROVIDE PATH NAVIGATING INFORMATION BASED ON MR MODE THROUGH MR VIEW IMAGE — S1556

RETURN

FIG. 16

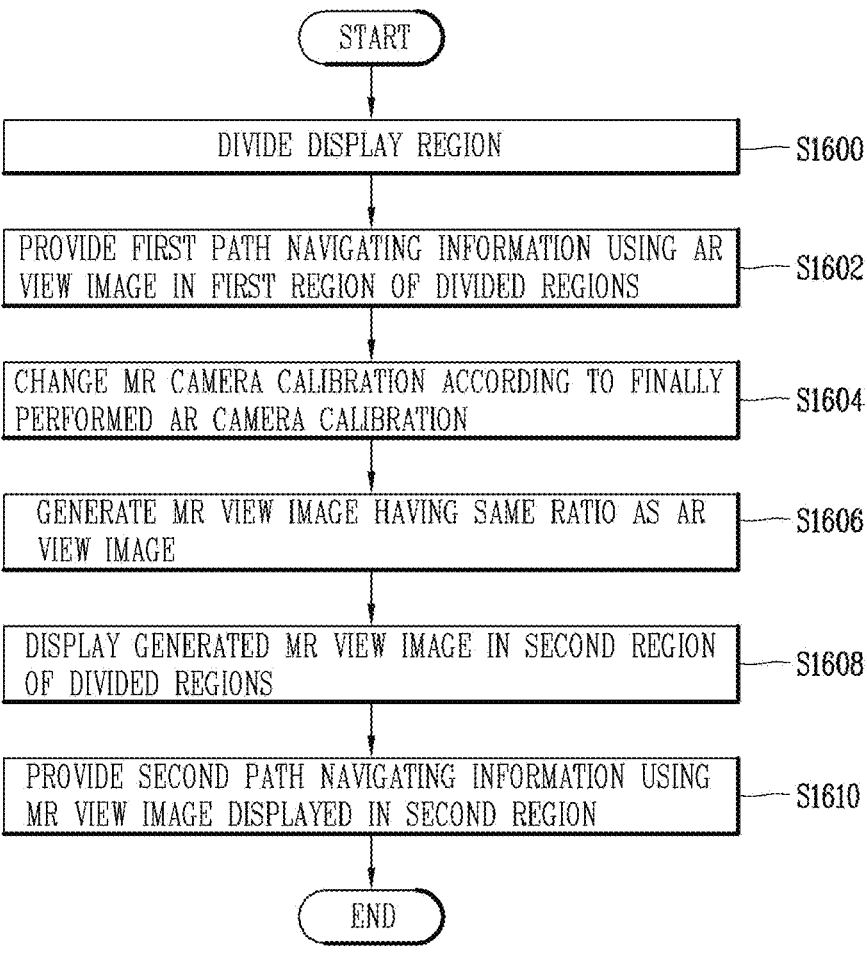

START

DIVIDE DISPLAY REGION — S1600

PROVIDE FIRST PATH NAVIGATING INFORMATION USING AR VIEW IMAGE IN FIRST REGION OF DIVIDED REGIONS — S1602

CHANGE MR CAMERA CALIBRATION ACCORDING TO FINALLY PERFORMED AR CAMERA CALIBRATION — S1604

GENERATE MR VIEW IMAGE HAVING SAME RATIO AS AR VIEW IMAGE — S1606

DISPLAY GENERATED MR VIEW IMAGE IN SECOND REGION OF DIVIDED REGIONS — S1608

PROVIDE SECOND PATH NAVIGATING INFORMATION USING MR VIEW IMAGE DISPLAYED IN SECOND REGION — S1610

END

FIG. 19
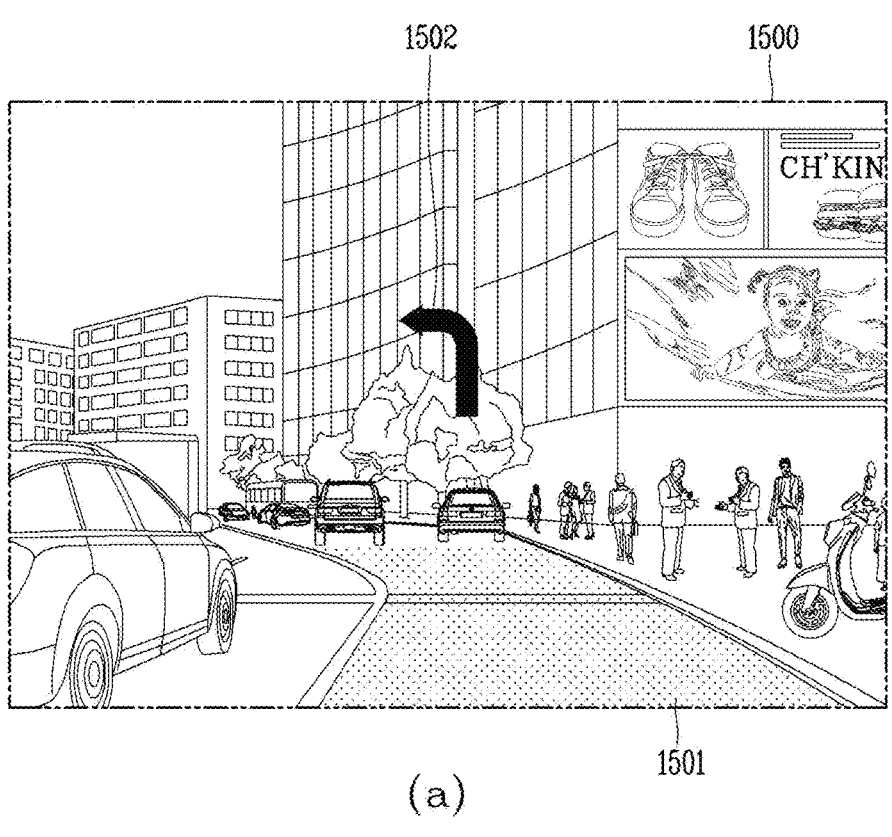
(a)
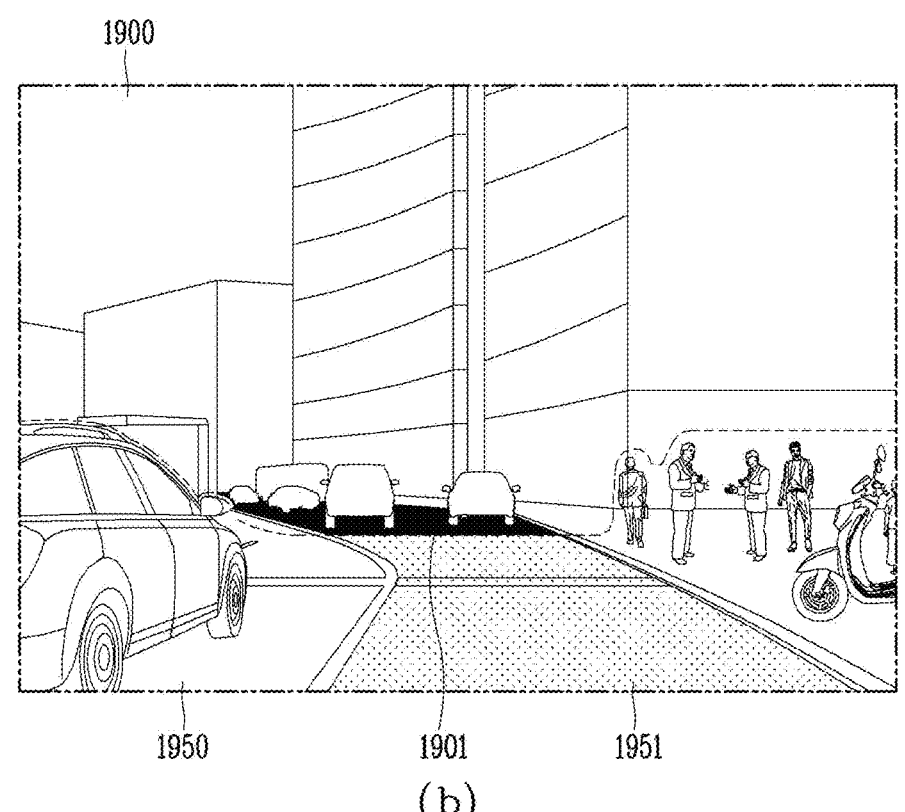
(b)

START

GENERATE SECOND VIEW IMAGE HAVING SIZE CORRESPONDING TO AT LEAST PART OF FIRST VIEW IMAGE ─── S2000

OVERLAP SECOND VIEW IMAGE ON AT LEAST PART OF FIRST VIEW IMAGE DISPLAYED ON DISPLAY SCREEN ─── S2002

PROVIDE PATH NAVIGATING INFORMATION THROUGH FIRST VIEW IMAGE IN WHICH SECOND VIEW IMAGE OVERLAPS ─── S2004

END

FIG. 24
2410 2420
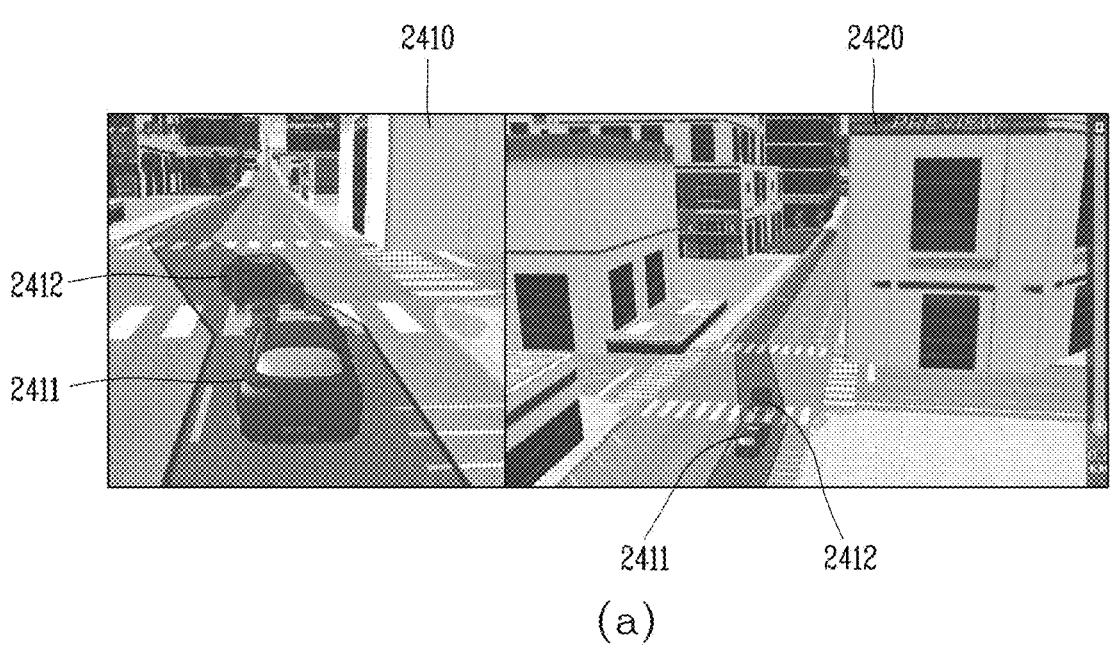
2412
2411
2411 2412
(a)
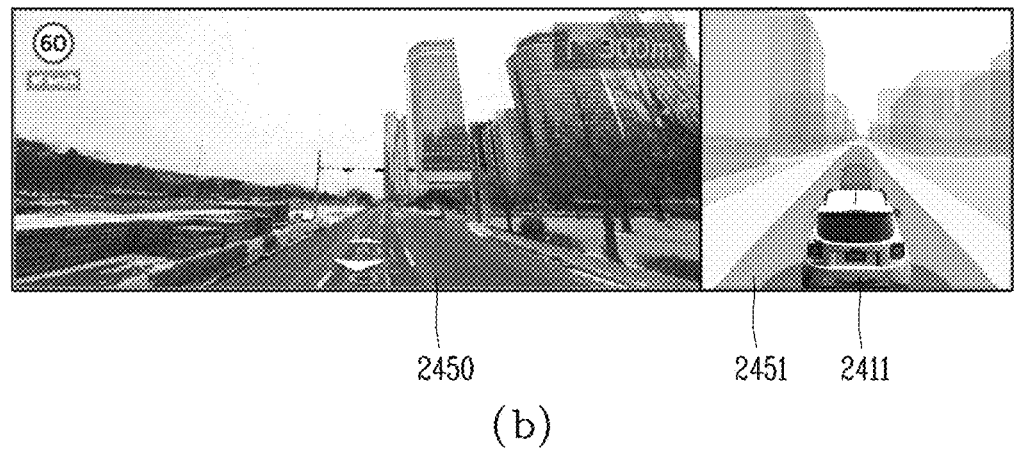
2450 2451 2411
(b)
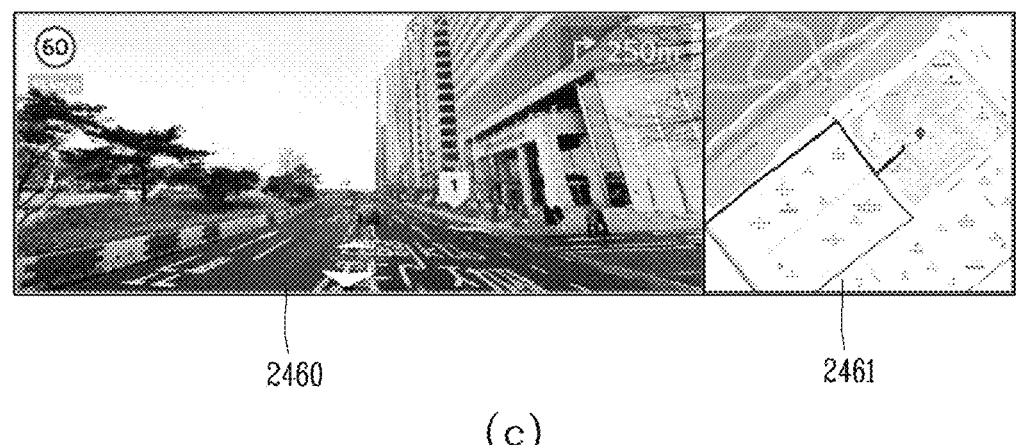
2460 2461
(c)

ROUTE GUIDANCE DEVICE AND ROUTE GUIDANCE SYSTEM BASED ON AUGMENTED REALITY AND MIXED REALITY

CROSS-REFERENCE TO RELATED APPLICATION(S)

This application is the National Stage filing under 35 U.S.C. 371 of International Application No. PCT/KR2022/010144, filed on Jul. 12, 2022, which claims the benefit of U.S. Provisional Application No. 63/221,467, filed on Jul. 13, 2021, the contents of which are all hereby incorporated by reference herein in their entireties.

TECHNICAL FIELD

The present disclosure relates to a route guidance device and a route guidance system that navigate a path for a vehicle to drive.

BACKGROUND ART

In recent years, an augmented reality technology that outputs a graphic object through a vehicle's windshield or head up display (HUD), or additionally outputs a virtual object to a real world using a graphic object that overlaps an image captured by a camera has been introduced. A vehicle at present may provide a driver with additional information related to an environment around the vehicle, a state of the vehicle, and a driving path of the vehicle through the augmented reality technology, thereby allowing the driver to intuitively recognize the vehicle and the driving environment of the vehicle. Accordingly, the efficiency and convenience of driving may be further improved.

Meanwhile, when the augmented reality technology is used, various information necessary for driving a vehicle may be provided based on an actual real world. That is, the augmented reality technology uses an image of the actual real world acquired through a camera, and requires the acquisition of a clear image of the real world. However, since a sensor that acquires the image of the real world, that is, a camera, senses a real-time environment around the vehicle as it is, in bad weather such as rain or snow, or in a complex traffic condition such as traffic congestion, there is a problem in that path navigating information cannot be accurately identified from an image acquired from the sensor due to the rain or snow, or obstacles such as shadows and vehicles in front.

As an example, the camera may not recognize a lane in which the vehicle is currently driving due to the snow or rain, the shadows, or the vehicles in front. Furthermore, when a road on which the vehicle drives is a road having a different height or a complicated curve, such as a slope road, the slope or the curvature of the road may not be recognized. In addition, in this case, there is a problem in that an augmented reality object related to the lane cannot be displayed or an incorrect augmented reality object may be displayed. That is, there is a problem in that a discrepancy between the augmented reality object and the actual environment may occur depending on a complexity of the real world acquired through the camera or a state of the acquired image.

Meanwhile, following the augmented reality technology, technological development related to mixed reality (MR) capable of applying a digital twin (DT) technology to provide various simulation information related to a vehicle has been actively carried out.

As a part of technological development related to mixed reality, a method of providing information related to path navigation to a driver using mixed reality has been actively studied. As such, in the case of path navigation using mixed reality in this manner, there is an advantage capable of displaying a graphic object corresponding to a vehicle on a three-dimensional map digitized through the digital twin technology, and providing information on a driving path on which the driver has not yet driven through the map and the graphic object or providing the driver with various information that cannot be confirmed by the driver located in the cockpit, such as providing a viewing angle such as a bird view.

Such mixed reality may provide vehicle-related information through a virtual object displayed through a digitized three-dimensional map, and may provide information regardless of an image of the real world acquired through the camera. Accordingly, the problem that a discrepancy between the provided information and the actual environment may occur depending on a complexity of the real world acquired through the camera or a state of the acquired image may be solved.

However, the mixed reality provides information through an image of a digitized three-dimensional map. Accordingly, a discrepancy between a graphic object provided through the mixed reality, that is, a mixed reality object, and an actual environment may occur according to a degree of correspondence between the three-dimensional map image and the real world around the vehicle.

However, it is very difficult to provide a three-dimensional map that is exactly the same as the real world, and accordingly, it is only possible to provide information on fixed objects such as buildings or objects having a size higher than a predetermined level such as vehicles, but there is a problem in that it is difficult to display small or difficult-to-detect objects such as people or animals around the vehicle in mixed reality using a three-dimensional map image.

Due to this problem, there is a problem that it is difficult to completely substitute augmented reality using images in the real world with mixed reality, and accordingly, technology development for an effective method capable of using both augmented reality and mixed reality has been actively studied.

DISCLOSURE OF INVENTION

Technical Problem

The present disclosure is contrived to solve the foregoing problems and other problems.

An aspect of the present disclosure is to compensate a disadvantage of augmented reality using mixed reality, so as to provide a route guidance device and a route guidance system capable of providing path navigating information using mixed reality when it is difficult to provide the path navigating information through augmented reality.

Another aspect of the present disclosure is to compensate a disadvantage of augmented reality using mixed reality, so as to provide a route guidance device and a route guidance system capable of further improving the visibility of information provided through the augmented reality.

Still another aspect of the present disclosure is to compensate a disadvantage of augmented reality using mixed reality, so as to provide a route guidance device and a route guidance system capable of simultaneously providing information of objects located in a region within a viewing angle displayed through augmented reality, and information of objects located in a region other than the viewing angle.

Solution to Problem

A route guidance device according to an embodiment of the present disclosure may include a telecommunication unit that communicates with a cloud server, an interface unit that receives an image of an environment around a vehicle comprising an image of a road on which the vehicle drives, and sensing information that has sensed a driving state of the vehicle from at least one sensor provided in the vehicle, an AR module that renders AR information using at least one of the sensing information and POI information received from the cloud server, a digital twin image generating unit that generates a reality-based digital twin view image comprising at least one virtual object based on the sensing information and map information received from the cloud server, and a processor that controls the interface unit to display an AR view image comprising the AR information or the reality-based digital twin view image on a display of the vehicle, the reality-based digital twin view image comprising an image rendered with virtual objects equal to objects in an area corresponding to an area displayed through the AR view image, detects a view image that matches a driving environment of the vehicle based on the sensing information while a first view image of the AR view image and the reality-based digital twin view image is displayed, and controls the display provided in the vehicle through the interface unit to switch the detected view image to a second view image different from the first view image when the detected view image is different from the first view image.

In an embodiment, the processor may determine whether a zone in which the vehicle is driving is a highway or a general road in a downtown based on the sensing information, and detect any one view image that matches a driving environment of the vehicle based on a result of the determination.

In an embodiment, the processor may determine a road condition of a zone in which the vehicle is driving based on the sensing information, and detect any one view image that matches a driving environment of the vehicle based on the determined pavement condition of the road or a curvature of the road.

In an embodiment, the processor may determine a time at which the vehicle is driven and weather around the vehicle based on the sensing information, and detect any one view image that matches a driving environment of the vehicle based on at least one of the determined time or weather.

In an embodiment, the processor may determine a driving state of the vehicle based on the sensing information, and detect any one view image that matches a driving environment of the vehicle based on at least one of whether the vehicle is stopped or driving, and a speed at which the vehicle is driving.

In an embodiment, the processor may determine a traffic congestion condition around the vehicle based on the sensing information, and detect any one view image that matches a driving environment of the vehicle based on the determined traffic congestion condition.

In an embodiment, the processor may determine structures detected from the vicinity of the vehicle based on the sensing information, and detect any one view image that matches a driving environment of the vehicle based on sizes of the determined structures.

In an embodiment, the processor may control the interface unit to display warning information for warning of a potential collision detected from a danger region located around the vehicle or from the vicinity of the vehicle, and detect any one view image that matches a driving environment of the vehicle according to whether the displayed warning information is exposed from a front of the vehicle.

In an embodiment, the processor determines a driving path of the vehicle based on the sensing information, detects the AR view image as a view image that matches a driving environment of the vehicle when the determined driving path is a straight section, and detects the reality-based digital twin view image as a view image that matches a driving environment of the vehicle when the vehicle approaches to a junction, an exit, or a destination on the path within a predetermined distance.

In an embodiment, the processor calculates a curvature variation of a road and a slope variation of the road on which the vehicle drives based on the sensing information, calculates an error rate (fitting rate) between an actual image of a front of the vehicle acquired through a camera of the vehicle and an AR object displayed on the actual image based on the calculated curvature variation and slope variation, detects the reality-based digital twin view image as a view image that matches a driving environment of the vehicle when the calculated error rate exceeds a threshold value, and detects the AR view image as a view image that matches the driving environment of the vehicle when the calculated error rate is below the threshold value.

In an embodiment, the processor may calculate a curvature variation of a road according to a detection value of a gyro sensor that detects an inclination of the vehicle and a detection result of a lane recognizer that detects a lane of the road on which the vehicle drives, and calculate a slope variation of the road according to a vertical profile detected based on map information on the road on which the vehicle is currently driving and a road shape detected through a high-definition map (HD MAP).

In an embodiment, the processor detects the AR view image as a view image that matches a driving environment of the vehicle when path information requested by a passenger of the vehicle is path information on a driving path where the vehicle is currently driving, and detects the reality-based digital twin view image as a view image that matches the driving environment of the vehicle when the path information requested by the passenger is path information on a driving path where the vehicle has not yet driven or path information on a driving path where the vehicle has already driven.

In an embodiment, the processor may change the camera calibration of a second view image according to the camera calibration of the first view image to generate to the second view image having the same point of attention as that of the first view image when the conversion of the view image is started. In an embodiment, the processor determines whether or not a view position of the second view image matches a view position of the first view image, and generates the second view image having the same point of attention according to a result of the determination.

In an embodiment, the second view image may be an image having the same size and ratio of the first view image based on a field of view (FOV) of the first view image, and may be an image in which a point of attention of the second view image corresponding to the point of attention of the first view image is formed at the same location as the point of attention of the first view image.

In an embodiment, the processor may detect a horizontal reference line and a vertical reference line from a point of attention of the first view image, and generate the second view image whose point of attention corresponds to a point where the horizontal reference line and the vertical reference line of the first view image intersect as the second view image having the same point of attention as the first view image.

In an embodiment, the processor may control the interface unit to further display an additional screen including additional information while the AR view image or the reality-based digital twin view image is displayed on the display, wherein the additional information includes at least one of point of interest (POI) information, driving history, and path navigating information in the form of a bird view image.

In an embodiment, the additional screen may be displayed on the display on which the AR view image or the reality-based digital twin view image is displayed in any one of screen division, PIP, and multi-layer schemes. In an embodiment, the processor switches the first view image into the second view image according to whether or not a preset view image switching condition is satisfied, the preset view image switching condition, when the first view image is the AR view image, includes a case where the AR view image is not appropriate for displaying the information required according to the driving environment of the vehicle.

In addition, a route guidance device mounted on a vehicle, the route guidance device that displays an AR view image comprising AR information rendered based on received point of interest (POI) information or a reality-based digital twin view image comprising MR information rendered based on three-dimensional map information on a display of the vehicle, and a cloud server that provides POI information or three-dimensional map information corresponding to a current, past or expected future location of the vehicle to the route guidance device according to a request of the route guidance device, wherein the route guidance device switches a view image displayed on the display to either one of the AR view image and the reality-based digital twin view image based on sensing information sensed from at least one sensor provided in the vehicle, and the reality-based digital twin view image includes an image rendered with virtual objects equal to objects in an area corresponding to an area displayed through the AR view image.

In an embodiment, the cloud server may include a Digital Twin as a Service (DTaaS) server including digitally twinned three-dimensional map information including virtual objects corresponding to respective buildings included in a map region, a mixed reality (MR) server that performs communication connection with the route guidance device, provides the location information of the vehicle collected from the route guidance device to the DTaaS server, and provides digitally twinned three-dimensional map information provided from the DTaaS server to the route guidance device, and an augmented reality (AR) server that receives the location information of the vehicle and the sensing information provided from the route guidance device, and provides POI information corresponding to the received information to the route guidance device.

Advantageous Effects of Invention

The effects of a route guidance device and a route guidance system according to an embodiment of the present disclosure will be described as follows.

First, the present disclosure may provide a view image according to mixed reality that matches an augmented reality view image when it is difficult for the view image provided according to augmented reality to display accurate path navigating information, thereby having an advantage capable of providing a driver with accurate path navigating information regardless of an environment or complexity of a real world around a vehicle or an image state of the real world required therefrom.

Second, the present disclosure may display part of a view image according to mixed reality that matches an augmented reality view image on part of the augmented reality view image provided according to augmented reality, or allow at least part of the mixed reality view image to overlap at least part of the augmented reality view image, thereby having an advantage capable of further improving the visibility of information displayed on objects around the vehicle.

Third, the present disclosure may display a mixed reality view image according to mixed reality together with an augmented reality view image provided according to augmented reality, thereby having an advantage capable of simultaneously providing information of objects located in a region within a viewing angle displayed through augmented reality, and information of objects located in a region other than the viewing angle.

BRIEF DESCRIPTION OF DRAWINGS

FIG. 8B is a conceptual diagram illustrating an MR service platform for providing an MR service of the present disclosure.

FIG. 13 illustrates an example of an AR view image displayed in the route guidance device according to an embodiment of the present disclosure, and an MR view image corresponding to the AR view image.

FIG. 15A is a flowchart illustrating an operation process of providing path navigating information through an MR view image according to an MR mode when an AR mode is switched to the MR mode.

FIG. 15B is a flowchart illustrating an operation process of providing path navigating information through an AR view image according to an AR mode when an MR mode is switched to the AR mode.

FIG. 16 is a flowchart illustrating an operation process of dividing a display region to simultaneously display an AR view image and an MR view image by the route guidance device according to an embodiment of the present disclosure.

FIG. 19 illustrates an example of a display screen in which an AR view image and an MR view image are displayed in regions divided through the operation process of FIG. 18, respectively.

FIG. 24 is an exemplary diagram in which a composite screen of an AR view image and an MR view image is displayed through the route guidance device according to an embodiment of the present disclosure.

FIG. 26 is an exemplary diagram illustrating an example in which path navigating information for providing preview information in FIG. 25 is provided through a drone view or a preview camera.

MODE FOR THE INVENTION

Figure 1:
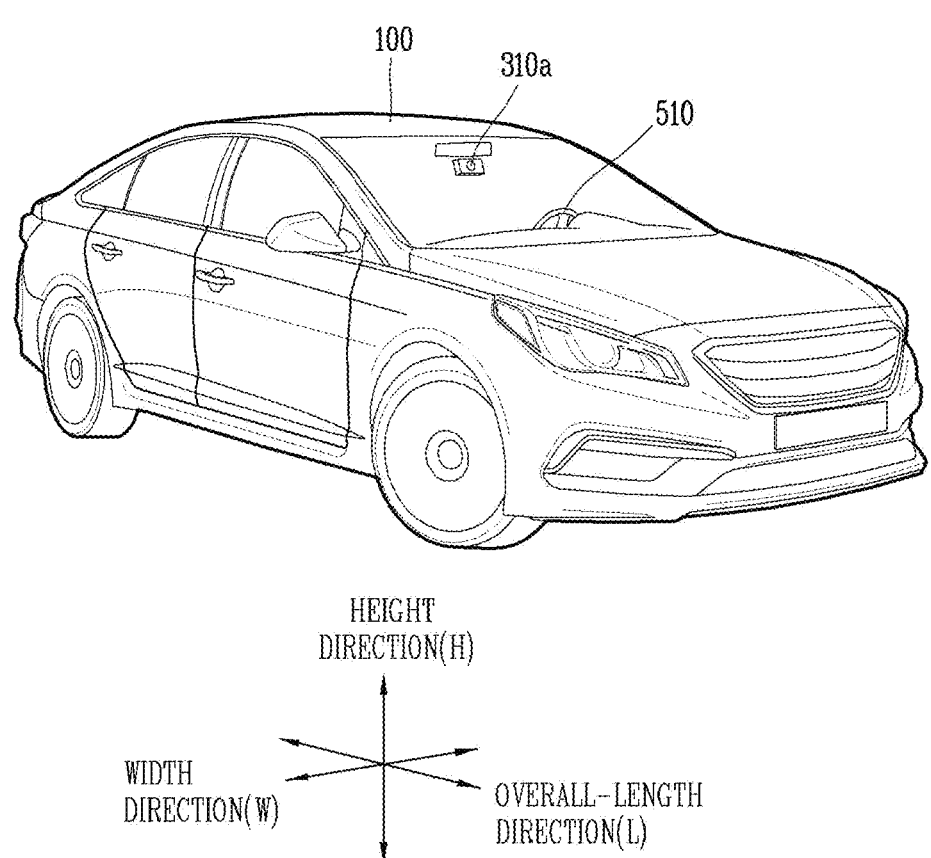
FIG. 1 is a view illustrating an appearance of a vehicle according to an embodiment of the present disclosure.

Hereinafter, the embodiments disclosed herein will be described in detail with reference to the accompanying drawings, and the same or similar elements are designated with the same numeral references regardless of the numerals in the drawings and their redundant description will be omitted. A suffix "module" or "unit" used for elements disclosed in the following description is merely intended for easy description of the specification, and the suffix itself is not intended to give any special meaning or function. In describing the embodiments disclosed herein, moreover, the detailed description will be omitted when specific description for publicly known technologies to which the invention pertains is judged to obscure the gist of the present disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. On the other hand, when an element is referred to as being "directly connected with" another element, there are no intervening elements present.

A singular representation may include a plural representation unless it represents a definitely different meaning from the context.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

A vehicle according to an embodiment of the present disclosure may be understood as a conception including cars, motorcycles and the like. Hereinafter, the vehicle will be described based on a car.

The vehicle according to the embodiment of the present disclosure may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

FIG. 1 is a view illustrating an appearance of a vehicle according to an embodiment of the present disclosure.

Figure 2:
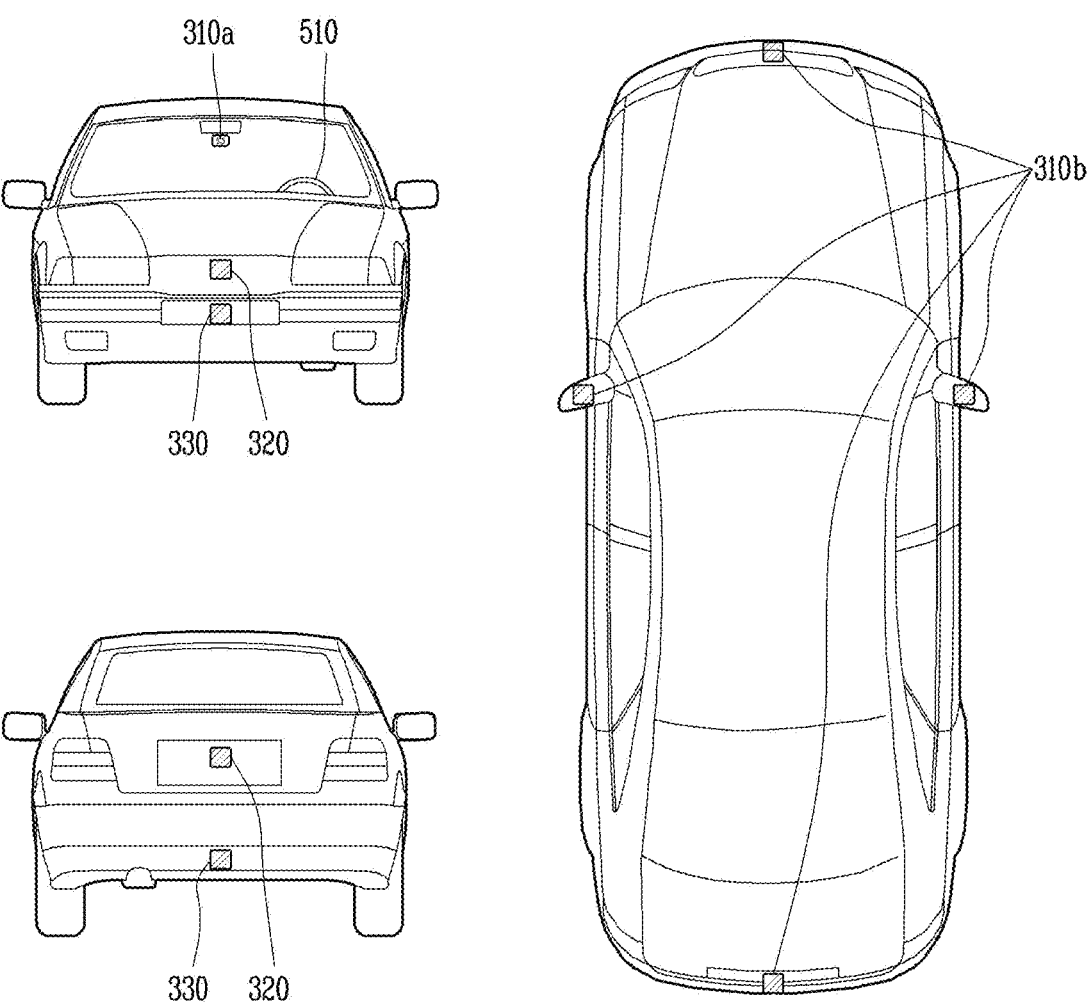
FIG. 2 is a view in which a vehicle according to an embodiment of the present disclosure is viewed at various angles from the outside.

FIG. 2 is a view in which a vehicle according to an embodiment of the present disclosure is viewed at various angles from the outside.

Figure 3:
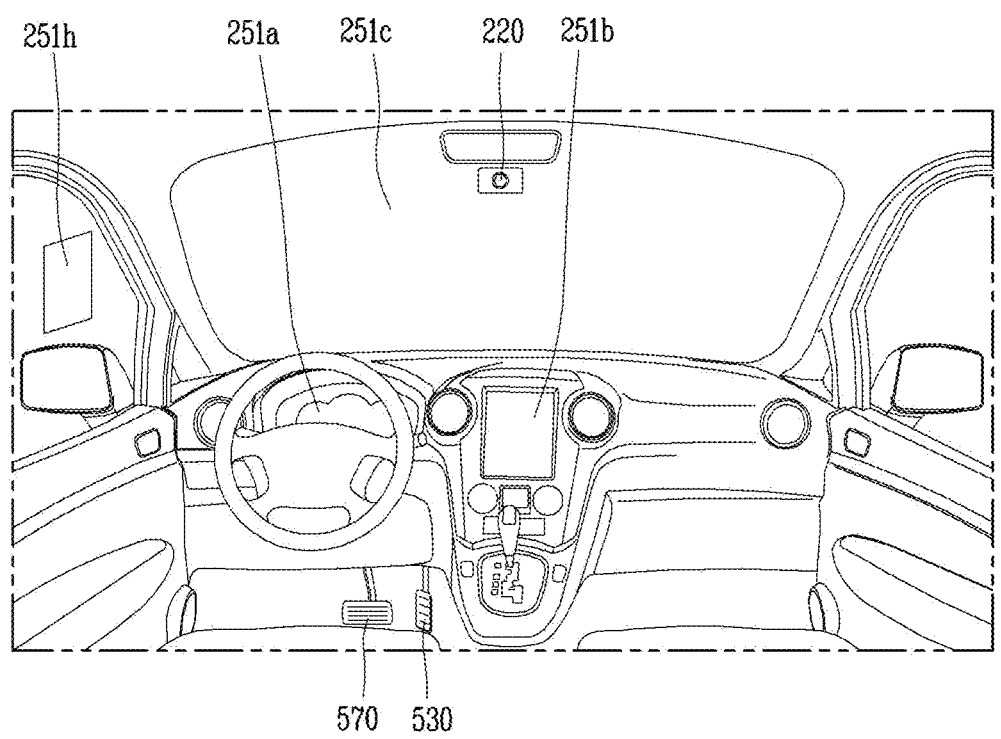
FIGS. 3 and 4 are views illustrating an inside of a vehicle according to an embodiment of the present disclosure.
Figure 4:
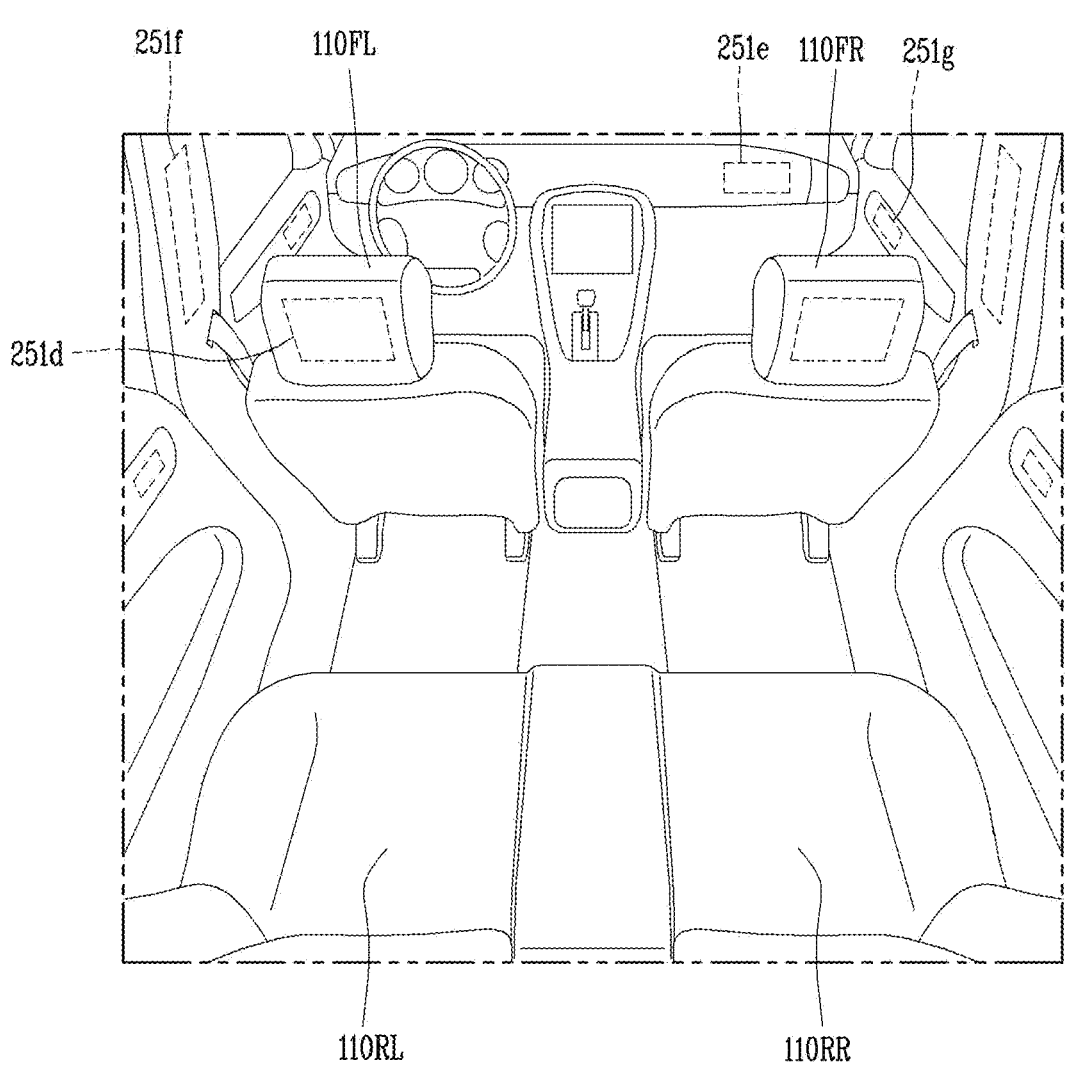

FIGS. 3 and 4 are views illustrating an inside of a vehicle according to an embodiment of the present disclosure.

Figure 5:
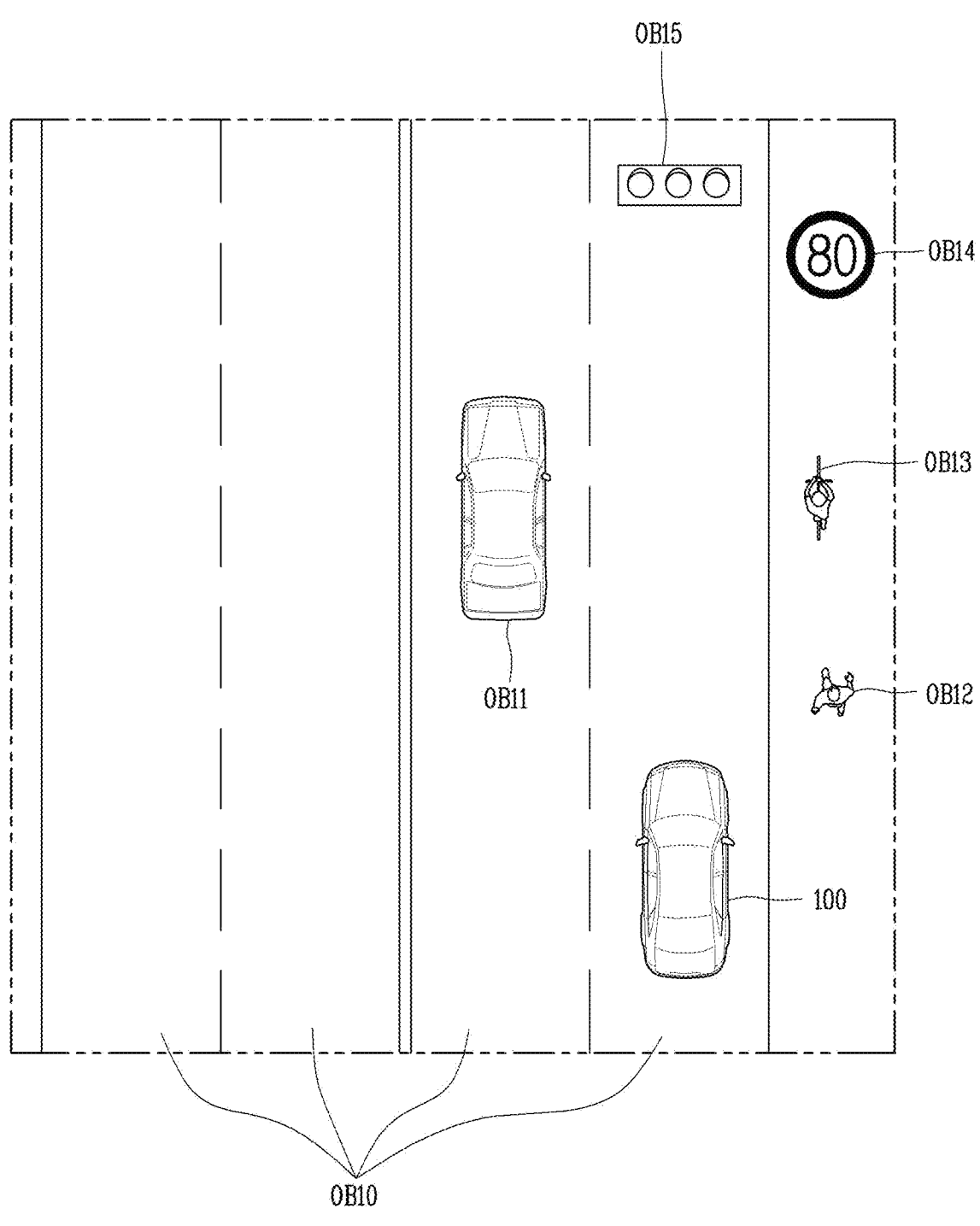
FIGS. 5 and 6 are views referenced to describe objects according to an embodiment of the present disclosure.
Figure 6:
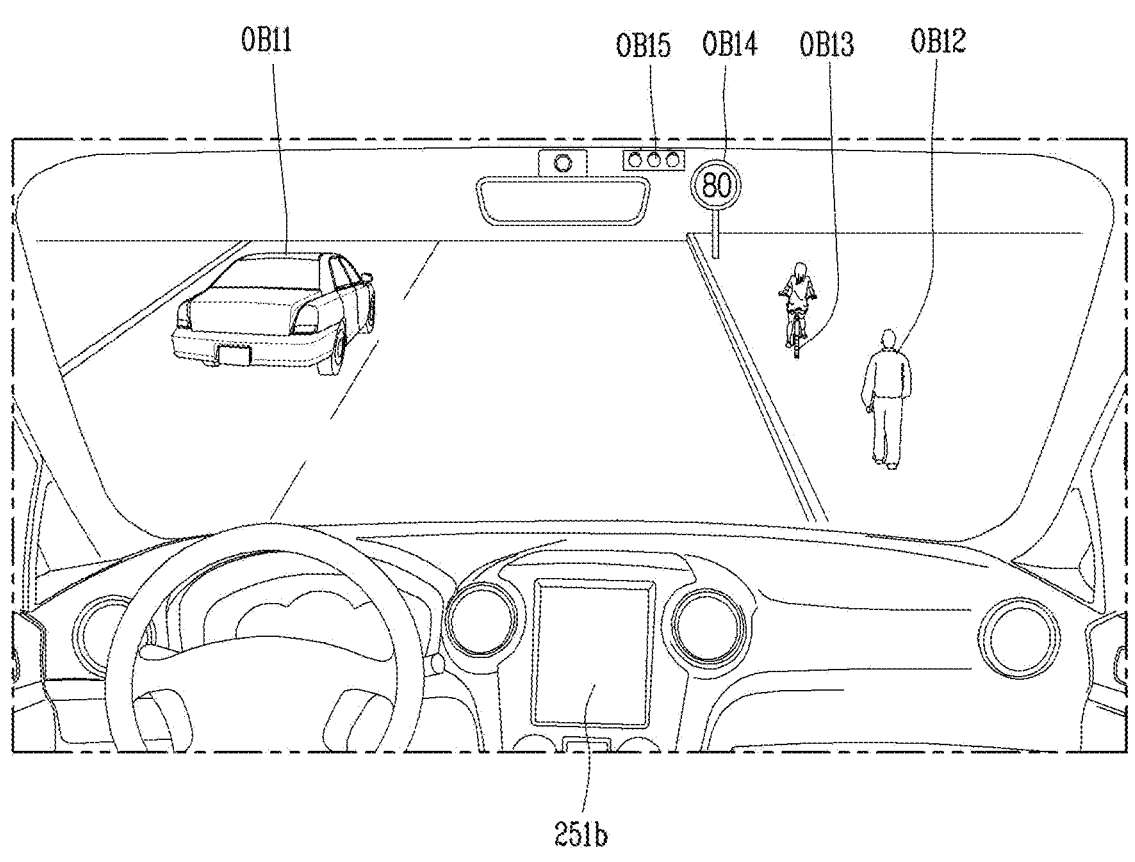

FIGS. 5 and 6 are views referenced to describe objects according to an embodiment of the present disclosure.

Figure 7:
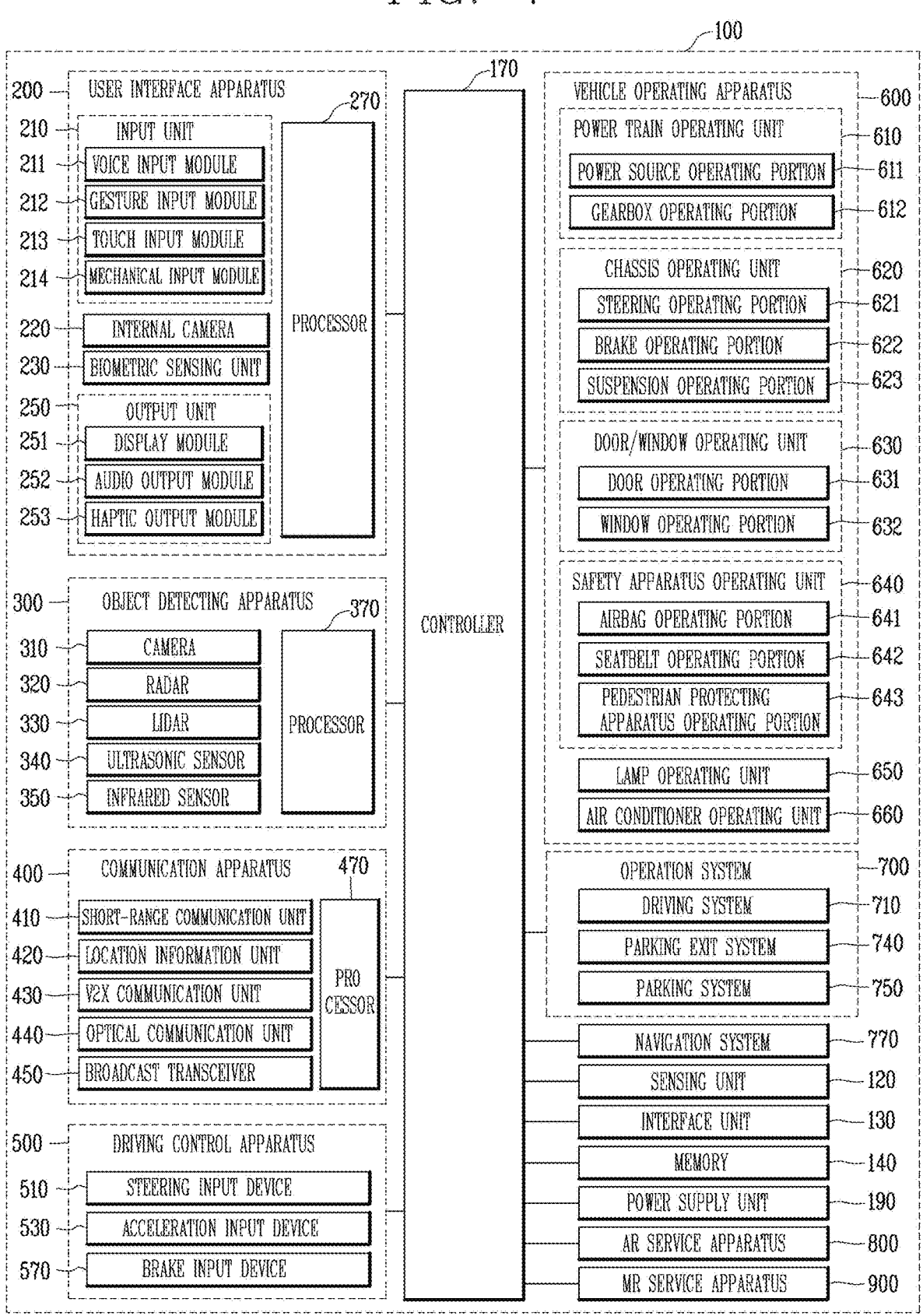
FIG. 7 is a block diagram referenced to describe a vehicle according to an embodiment of the present disclosure.

FIG. 7 is a block diagram referenced to describe a vehicle according to an embodiment of the present disclosure.

Referring to FIGS. 1 through 7, a vehicle 100 may include wheels turning by a driving force, and a steering apparatus 510 for adjusting an advancing direction of the vehicle 100.

The vehicle 100 may be an autonomous driving vehicle.

The vehicle 100 may be switched to an autonomous driving mode or a manual mode based on a user input.

For example, the vehicle may be switched from the manual mode to the autonomous driving mode or from the autonomous driving mode to the manual mode based on a user input received through a user interface apparatus 200.

The vehicle 100 may be switched to the autonomous driving mode or the manual mode based on driving environment information. The driving environment information may be generated based on object information provided from an object detecting apparatus 300.

For example, the vehicle 100 may be switched from the manual mode to the autonomous driving mode or from the autonomous driving mode to the manual mode based on driving environment information generated in the object detecting apparatus 300.

For example, the vehicle 100 may be switched from the manual mode to the autonomous driving mode or from the autonomous driving module to the manual mode based on driving environment information received through a communication apparatus 400.

The vehicle 100 may be switched from the manual mode to the autonomous driving mode or from the autonomous driving mode to the manual mode based on information, data or signal provided from an external device.

When the vehicle 100 is driven in the autonomous driving mode, the autonomous driving vehicle 100 may be driven based on an operation system 700.

For example, the autonomous driving vehicle 100 may be driven based on information, data or signal generated in a driving system 710, a parking exit system 740 and a parking system 750.

When the vehicle 100 is driven in the manual mode, the autonomous driving vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, a vehicle interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one region of a steering wheel, one region of an instrument panel, one region of a seat, one region of each pillar, one region of a door, one region of a center console, one region of a headlining, one region of a sun visor, one region of a wind shield, one region of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's three-dimensional gesture input by a time-of-flight (TOF) scheme, a structured light scheme or a disparity scheme.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display 251 so as to implement a touch screen. The touch screen may provide an input interface and an output interface between the vehicle 100 and the user.

The mechanical input module 214 may include at least one of a button, a dome switch, a jog wheel, and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, auditory or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a transparent TFEL (Thin Film Electroluminescent), a transparent OLED (Organic Light-Emitting Diode), a transparent LCD (Liquid Crystal Display), a transmissive transparent display, and a transparent LED (Light Emitting Diode) display. The transparent display may have adjustable transparency.

Meanwhile, the user interface apparatus 200 may include a plurality of display modules 251a to 251g.

The display module 251 may be disposed on one region of a steering wheel, one region 521a, 251b, 251e of an instrument panel, one region 251d of a seat, one region 251f of each pillar, one region 251g of a door, one region of a center console, one region of a headlining or one region of a sun visor, or implemented on one region 251c of a windshield or one region 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be referred to as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The other vehicle OB11 may be a vehicle which is moving around the vehicle 100. The other vehicle OB11 may be a vehicle located within a predetermined distance from the vehicle 100. For example, the other vehicle OB11 may be a vehicle which moves before or after the vehicle 100.

The pedestrian OB12 may be a person located in the vicinity of the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a lidar 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an AVM (Around View Monitoring) camera 310b, or a 360-degree Camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar scheme or a continuous wave radar scheme according to a principle of emitting radio waves. The radar 320 may be implemented by a Frequency Modulated Continuous Wave (FMCW) scheme or a Frequency Shift Keying (FSK) scheme according to a signal waveform in a continuous wave radar scheme.

The radar 320 may detect an object in a time of flight (TOF) manner or a phase-shift scheme through the medium of electromagnetic waves, and detect a position of the detected object, a distance from the detected object and a relative speed with the detected object.

The radar 320 may be disposed on an appropriate position outside the vehicle for detecting an object which is located at a front, rear or side of the vehicle.

The lidar 330 may include laser transmitting and receiving portions. The lidar 330 may be implemented in a time-of-flight (TOF) scheme or a phase-shift scheme.

The lidar 330 may be implemented as a drive type or a non-drive type.

For the drive type, the lidar 330 may be rotated by a motor and detect object near the vehicle 100.

For the non-drive type, the lidar 330 may detect, through light steering, objects which are located within a predetermined range based on the vehicle 100. The vehicle 100 may include a plurality of non-drive type lidars 330.

The lidar 330 may detect an object in a time-of-flight (TOF) scheme or a phase-shift scheme through the medium of laser light, and detect a position of the detected object, a distance from the detected object and a relative speed with the detected object.

The lidar 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the lidar 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (vehicle to infrastructure; V2I), another vehicle (vehicle to vehicle; V2V), or a pedestrian (vehicle to pedestrian; V2P). The V2X communication unit 430 may include an RF circuit capable of implementing a communication protocol with an infrastructure (V2I), a communication protocol between vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding an advancing direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in the form of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change an advancing direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a curve is present on a road surface.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating portion 650 may perform an electronic control for various lamp apparatuses within the vehicle 100.

The air-conditioner operating unit 660 may perform an electronic control for an air conditioner within the vehicle

100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may be operated in the autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

Meanwhile, according to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path navigating (route guidance) information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The vehicle interface unit 130 may serve as a path allowing the vehicle 100 to interface with various types of external devices connected thereto. For example, the vehicle interface unit 130 may be provided with a port connectable with a mobile terminal, and connected to the mobile terminal through the port. In this instance, the vehicle interface unit 130 may exchange data with the mobile terminal.

Meanwhile, the vehicle interface unit 130 may serve as a path for supplying electric energy to the connected mobile terminal. When the mobile terminal is electrically connected to the vehicle interface unit 130, the vehicle interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be various storage apparatuses such as a ROM, a RAM, an EPROM, a flash drive, a hard drive, and the like in terms of hardware. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Figure 8A:
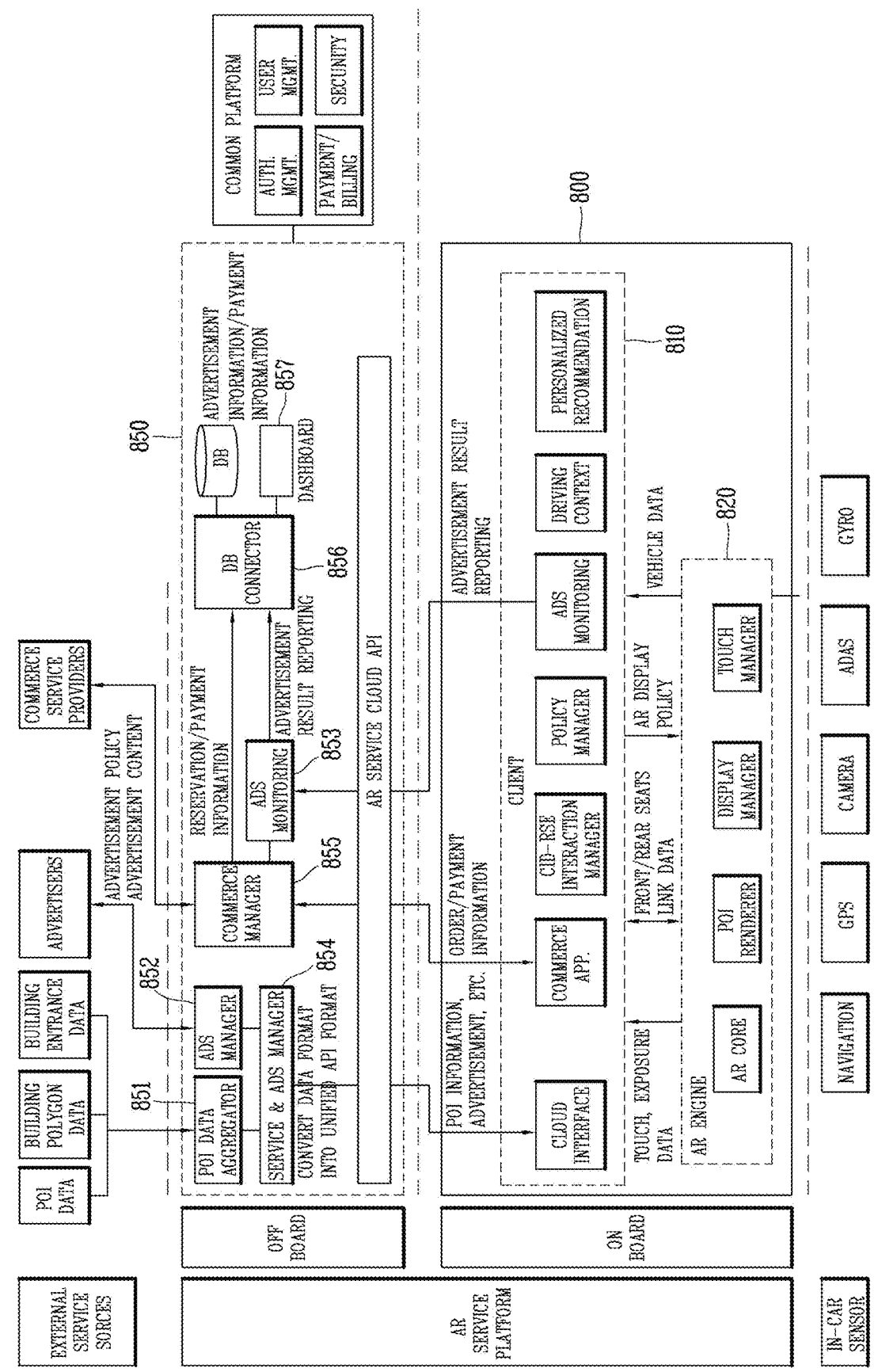
FIG. 8A is a conceptual diagram for explaining an AR service platform of the present disclosure.

FIG. 8A is a conceptual diagram for explaining an AR service platform of the present disclosure.

The AR service platform that provides an AR service of the present disclosure may be referred to as an AR service system.

The AR service platform may include a server 850 provided outside a vehicle to collect and processes information required for an AR service and transmit the processed information to the vehicle, and an AR service apparatus 800 provided in the vehicle to provide an AR service using the information transmitted from the server.

Collecting and processing information required for an AR service and transmitting the processed information to a vehicle by the server 850 may include the meaning of collecting and processing information required for the AR service and transmitting the processed information to the AR service apparatus 800 provided in the vehicle by the server 850.

The AR service apparatus 800 may vary information provided as an AR service based on the environment of the vehicle.

That is, the AR service apparatus 800 of the present disclosure may dynamically adjust (vary) information to be displayed in AR and an amount of the information according to an environment of the vehicle, and select information to be emphasized.

Furthermore, the AR service platform of the present disclosure may control an AR service provided by the vehicle to vary according to a specific condition, such as a vehicle environment and an advertisement exposure condition.

In the case of AR navigation in the related art, when displaying a destination or a major point of interest (POI) in AR navigation, it is difficult to reflect the latest information because information stored in map data is used, and there is a limitation in that the POI including real-time attributes cannot be provided therein.

On the other hand, the AR service platform of the present disclosure may fuse location information of a vehicle, map information, a plurality of sensor data, real-time POI information, advertisement/event information, and the like, and display them in AR navigation.

As an example, in order to display AR information, the AR service apparatus 800 of the present disclosure may receive AR service information from a server based on a current location of the vehicle and navigation path/guide information, and process the AR service information into a form that can be on an AR navigation screen.

As an example, the AR service apparatus 800 of the present disclosure may reconfigure real-time AR display information. The AR service apparatus 800 may determine a display format, a size, a location, an exposure method, and the like, of AR content in consideration of a driving environment to reconfigure service data received from a server to be displayed on the AR navigation screen (e.g., POI exposure location and size variation according to a driving speed, service information exposure location change, AR wall display location, exposure time adjustment according to a traffic environment, etc.).

Furthermore, the AR service apparatus 800 of the present disclosure may analyze an exposure frequency of AR display information through a user feedback.

The server 850 may collect user input information (input information such as a touch and an order) on AR service content, perform a content exposure frequency analysis, and adjust a service content exposure policy based on the information.

Through this configuration, the present disclosure may allow expression in AR navigation by fusing various external service content to provide various services through POI information including real-time properties real-time attributes.

Furthermore, according to the present disclosure, various types of AR content such as an advertisement, an event, and major landmark information as well as POI information may be displayed.

In addition, a new user experience of AR navigation may be presented through a UX scenario-based embodiment proposed in the present disclosure.

The present disclosure may provide a service platform structure and an AR information display method (UX) that dynamically adjusts an amount of information (POI data, advertisements) to be displayed in AR according to a vehicle environment and an advertisement exposure condition, a module that collects POI information and commerce service information for AR expression and processes the information into a form that is easy to render in an AR engine, a module that processes specific POI information to be emphasized according to an environment an inside/outside of the vehicle, a module that collects vehicle environment information and applies a UX policy according to the environment, and an AR engine module that renders an AR object (a group POI, a mini POI, a 3D object, an event wall, etc.) according to the UX policy.

Moreover, the present disclosure may provide a client module that transmits and receives an interaction and data between front and rear seats of the vehicle, a service app module that exposes commerce service information in association with POI, a client module that collects user actions for advertisements, such as AR advertisement object exposure results and clicks, and a cloud module that collects/analyzes user actions for advertisements such as AR advertisement object exposure results and clicks.

Referring to FIG. 8A, the AR service platform of the present disclosure may include a server 850 that is present outside the vehicle (off-board) and an AR service apparatus 800 that is a configuration provided in the vehicle (on-board).

First, the server 850 may include a POI data aggregator 851, an advertisement manager (ads manager) 852, an advertisement monitor (ads monitoring) 853, a service and advertisement manager (service & ads manager) 854, a commerce manager 855, a database (DB) connector 856, and a dashboard 857.

The POI data aggregator 851 may receive information required for an AR service from a plurality of external servers to convert/integrate the received information into a message format of the AR service platform.

The advertisement manager (ads manager) 852 may perform advertisement information/content management and advertisement campaign (advertisement exposure condition) management.

The advertisement monitor (ads monitoring) 853 may collect/store advertisement exposure and click results.

The service and advertisement manager (service & ads manager) 854 may insert advertisement information that matches an exposure condition into service information and provide the inserted advertisement information to a client.

The commerce manager 855 may collect commerce service link/payment information.

The database connector 856 may store/query advertisement content, advertisement exposure result information, and commerce payment information.

The dashboard 857 may display a real-time AR service status in which an advertisement exposure result/payment history result is visualized.

Furthermore, the server 850 may further include an AR service cloud API (or data converter) for converting information transmitted from the AR service apparatus 800 of the vehicle into a data format that can be used by the server, and converting information processed/generated by the server into a data format that can be used by the AR service apparatus 800.

Meanwhile, the AR service apparatus 800 may include a client 810 including a cloud interface, a commerce app, a CID-RSE interaction manager, a policy manager, an advertisement monitoring, a driving context, a personalized recommendation, and the like, and an AR engine 820 including a POI renderer, a display manager, a touch manager, and the like.

The client 810 may receive POI information, advertisements, and the like from the server.

Furthermore, the client 810 may transmit and receive order/payment information to and from the server 850, and may transmit an advertisement exposure result to the server 850.

The AR engine 820 may transmit data such as a number of times an AR object output as AR has been touched and a number of exposures to the client 810.

Furthermore, the AR engine 820 may transmit and receive front/rear seat (CID, RSE) link data to and from the client 810, and may output an AR object according to an AR display policy received from the client 810.

In addition, the AR engine 820 may determine the type, output location, POI type, output size, and the like of the AR object based on data collected from a gyro sensor, a camera, a telecommunication unit, a navigation system, advanced driver assistance systems (ADAS), a GPS, and the like provided in the vehicle.

The AR service apparatus 800 provided in the vehicle (on-board) may perform AR rendering on service content to display the data received from the cloud server in AR on a front camera image.

Furthermore, the AR service apparatus 800 may mediate data transmission between the server and the AR engine, such as collecting and transmitting advertisement posting result data from the AR engine to the server.

In addition, the AR service apparatus 800 may link data generated by AR between CID-RSE (i.e., front/rear seats).

Furthermore, the AR service apparatus 800 may perform data management for the AR display policy, and specifically, may provide AR display policy data according to a driving environment to the AR engine.

In addition, the AR service apparatus 800 may provide environment recognition and personalized service, and specifically, may provide AR objects according to a driving environment (speed, turn-by-turn (TBT), etc.) using in-vehicle data to the AR engine.

In this specification, an example of providing an AR service by overlapping AR information (or an AR object, AR content, POI information, etc.) on an image captured (received, processed) through a camera provided in the vehicle to output the overlapping image will be described.

However, the present disclosure is not limited thereto, and the AR service described herein will be analogously applied to various augmented reality implementation methods such as directly displaying AR information on the vehicle's windshield to overlap a real-world space, or displaying AR information through a head-up display (HUD) based on a driver or passenger in the same or similar manner.

The input data (input information) used to provide the AR service and the output data (output information) provided through the AR service platform are as follows.

First, the type of input data may include map information (navigation information), service content information (POI, advertisement, etc.), dynamic information, vehicle sensor information, historical information, and driving-related information.

The map information (navigation information) may include path information to a destination (navigation path), guide information (turn-by-turns), front road shapes (roads/lanes), a plurality of map attribute information (a road type/attribute, a road and lane width, a curvature, a slope, a speed limit, etc.), localization objects (road markings, traffic signs, etc.) information, and the like.

The service content information (POI, advertisement, etc.) may include POI information received from a plurality of service providers, advertisement information available at a current location, and real-time information for reservation/payment services such as gas stations, charging stations, and parking lots.

The dynamic information may include traffic information (road-based traffic, lane-based traffic), event information (accident, hazard warning, etc.), weather information, V2X (V2V, V2I) (Vehicle to Everything, Vehicle to Vehicle, Vehicle to Infra), and the like.

The vehicle sensor information may include current location information (GPS/DR), camera input information (ADAS information, object recognition information), and V2X (real-time surrounding environment information that can be collected through V2V and V2I).

The historical information may include information on a past driving path, a traffic history (e.g., time-based traffic), a communication speed according to a zone and time, and the like.

The driving-related information may include a driving mode (manual, autonomous driving, semi-autonomous driving, whether an ADAS function is activated, etc.), whether to enter a destination or a stopover, whether to enter a parking lot, and the like.

The output information that can be provided through the AR service platform may include current location/path-based AR service display data.

The current location/path-based AR service display data may include AR advertisement displayable points on a path (AR wall, POI building highlight), selectable AR building information (selectable major building information such as landmarks), general POI information (icons or POI summary information such as speech bubbles), long-distance POI information (distance/direction display of important POI information that is not present on the path but is useful for driving), display information to be output when a plurality of POIs are present in the same building, destination building and real-time parking lot status information, real-time status information of gas stations/charging stations, location-based advertisement/event information, and the like.

The AR service platform of the present disclosure may filter AR service information according to real-time information and determine a display method thereof.

Specifically, the AR service platform may determine a number of real-time POI exposures, POI overlap removal, size adjustment, exposure time, and the like based on a driving speed.

Furthermore, the AR service platform may determine a POI exposure method according to risk information recognition, and specifically, may dynamically change a POI display method according to an accident, a construction, a multiple moving object recognition environment, and the like.

In addition, the AR service platform may dynamically change a POI display position when AR display visibility deteriorates due to traffic.

Furthermore, the AR service platform may reconfigure front/rear seat AR display data, and as an example, AR service information may be minimized on a front seat display in consideration of a driving speed, risk information, and weather information, and all displayable information may be reconfigured to be displayed on a rear seat display.

Such an operation/function/control method of the AR service platform may be implemented by a server or an AR service device included in the AR service platform, or may be implemented by an organic interaction between the server and the AR service device.

Referring to FIG. 8A, the configuration of the server 850 of the AR service platform will be described in more detail as follows.

The service and advertisement manager 854 may perform a client link (request) function, a POI information and advertisement information integration (data processing & aggregation) function, and a client link (respond) function.

Specifically, the client link (request) function may include requesting/receiving POI information (location, category) from a unified API, or requesting/receiving destination entrance location information (selecting one of destination coordinates/address/id) from the unified API.

Here, the unified API refers to an API (to minimize client variation) defined in the AR service cloud that is not dependent on a specific data provider.

The POI information and advertisement information integration (data processing & aggregation) function may include integrating POI information and advertisement information within a radius of 000 meters of a location requested by the client (from data manager, ads manager) or integrating destination entrance location and POI advertisement information requested by the client (from data manager, ads manager).

Specifically, the POI information and advertisement information integration function may include a function of matching POI information with advertisement information including building wall and event wall information, or filtering according to a priority determined by the server when there are multiple POIs in the same building (e.g., excluding POI information other than partner companies).

Here, a filtering criterion may include assigning a priority score to each POI and comparing them.

The client link (respond) function may include transmitting POI information and advertisement information to the unified API or transmitting a destination entrance location and advertisement information to the unified API.

The data manager unit (not shown) included in the server 850 may include a POI information collection/transfer function, a building shape (polygon) information collection/transfer function, and a destination entrance information collection/transfer function.

The POI information collection/transfer function may perform a function of requesting POI information from a 3rd party API or transferring POI information received from the 3rd party API (converted into a unified API response format) (to the service & ads aggregator).

The building shape (polygon) information collection/transfer function may perform a function of requesting building outline information from a 3rd party API/data set or transferring POI information received from the 3rd party API (converted into a unified API response format) (to the service & ads aggregator).

The destination entrance information collection/transfer function may perform a function of requesting destination entrance information from a 3rd party API or transferring destination entrance information received from the 3rd party API (converted into a unified API response format) (to the service & ads aggregator).

The advertisement manager (ads manager) 852 may provide a partner (advertisement) company management interface, an advertisement campaign management interface, and an advertisement content management interface.

The advertisement monitor (ads monitoring) 853 may perform an advertisement effect measurement feedback reception function and an advertisement information transfer function.

The partner (advertisement) company management interface may perform POI advertiser management (add/modify/delete advertiser information) and general advertiser management (add/delete advertiser information).

A POI supporting advertisement format may include a brand POI pin, a building wall, 3D rendering, an event wall, and the like, and a supporting advertisement format (general supporting advertisement format) of a brand advertisement (e.g., Coca-Cola advertisement, etc.) that are not related to an actual POI/location may be an event wall.

The advertisement campaign management interface may add/modify/delete an advertisement campaign (an advertisement location, a type, a time, etc.).

The advertisement content management interface may add/modify/inquire about/delete content for each advertisement format (a POI brand icon image, a building wall image, an event wall image/video, a 3D rendering image).

The advertisement effect measurement feedback reception function may include a function of receiving an advertisement exposure feedback transmitted by the client to transfer the received advertisement exposure feedback to the DB manager (CPC/CPM/CPT&P).

The advertisement information transfer function may include a function of inquiring about and transferring advertisement campaign information to be exposed within a radius of 000 meters of a location requested by the service & ads aggregator (in the case of CPT&P, only advertisements that match a time condition are transferred).

The commerce manager 855 may perform a client link function, an external commerce service link function, and a payment information management function.

The client link function may include a function of receiving a request in linkage with a client through a unified API, converting the requested content received through the unified API into an external commerce API specification, converting data received from an external API into a message format of the unified API, and transferring the data to the client.

The commerce manager may convert the requested content received through the unified API into an external commerce API specification, and then perform an external service link function with the converted content.

Converting data received from an external API into a message format of the unified API may refer to converting data received from an external service link into the unified API.

The external commerce service link function may include a function of requesting a store list and meta information adjacent to a current location to receive a result thereof, requesting detailed information on a specific store in the above list to receive a result thereof, requesting a reservation/order to receive a result thereof, requesting a service usage status to receive a result thereof, and linking member information for a commerce service to receive a result thereof.

Here, the requesting of a service usage status to receive a result thereof may be used for sequence management and AR message pop-up according to the service usage status (reservation completed/parking lot entry/parked/parking lot exit/reservation canceled).

The linking of service member information to receive a result thereof may be used for a commerce service member and AR service member (OEM connected service member) information link.

The payment information management function may include a function of collecting a payment history (content, amount) from an external commerce service and charging a fee to an external commerce company based on the payment history.

The database connector 856 may perform an advertisement effect measurement data management function, a commerce data management function, an advertiser data management function, an advertisement content data management function, and an advertisement location data management function.

The advertisement effect measurement data management function may store/delete CPC/CPM/CPT&P related log data and inquire about data (by POI, by brand, by time, by advertisement type).

The commerce data management function may store/delete a payment history (content, amount) from an external commerce service and inquire about data (by POI, by brand, by time, by advertisement type).

The advertiser data management function may store/modify/delete/inquire about advertiser information and advertisement campaign settings for each advertiser.

The advertisement content data management function may store/modify/delete/inquire about advertisement content in linkage with advertiser information.

The advertisement location data management function may perform event wall section coordinates, building wall coordinates management (by brand) to display an AR advertisement, which may be divided into coordinates directly registered by a user and specific coordinates obtained through linkage with a company API.

The dashboard 857 may perform an advertisement effect measurement data visualization function and a commerce service data visualization function.

The advertisement effect measurement data visualization function may provide CPC: a chart of a number of total advertisement clicks by company/brand (available for inquiry by period), CPC: an aggregate chart of a number of total advertisement clicks (available for inquiry by period), CPM: a chart of a number of total advertisement exposures by company/brand (available for inquiry by period), CPM: an aggregate chart of a number of total advertisement exposures (available for inquiry by period), CPT&P: a chart a number of advertisement clicks by company/brand (available for inquiry by period), and CPT&P: a chart of a number of advertisement exposures by company/brand (available for inquiry by period).

Such a chart may be provided in various ways, such as a bar graph, a line graph, a pie chart, a word graph, and a geospatial graph.

Although CPT&P is billing per hour rather than a number of clicks or exposures for a settlement method, it may be used as data for measuring an exposure effect.

The commerce service data visualization function may provide a chart for an accumulated payment amount by company (available for inquiry by period) and a chart for a total payment amount (available for inquiry by period).

Figure 8B:
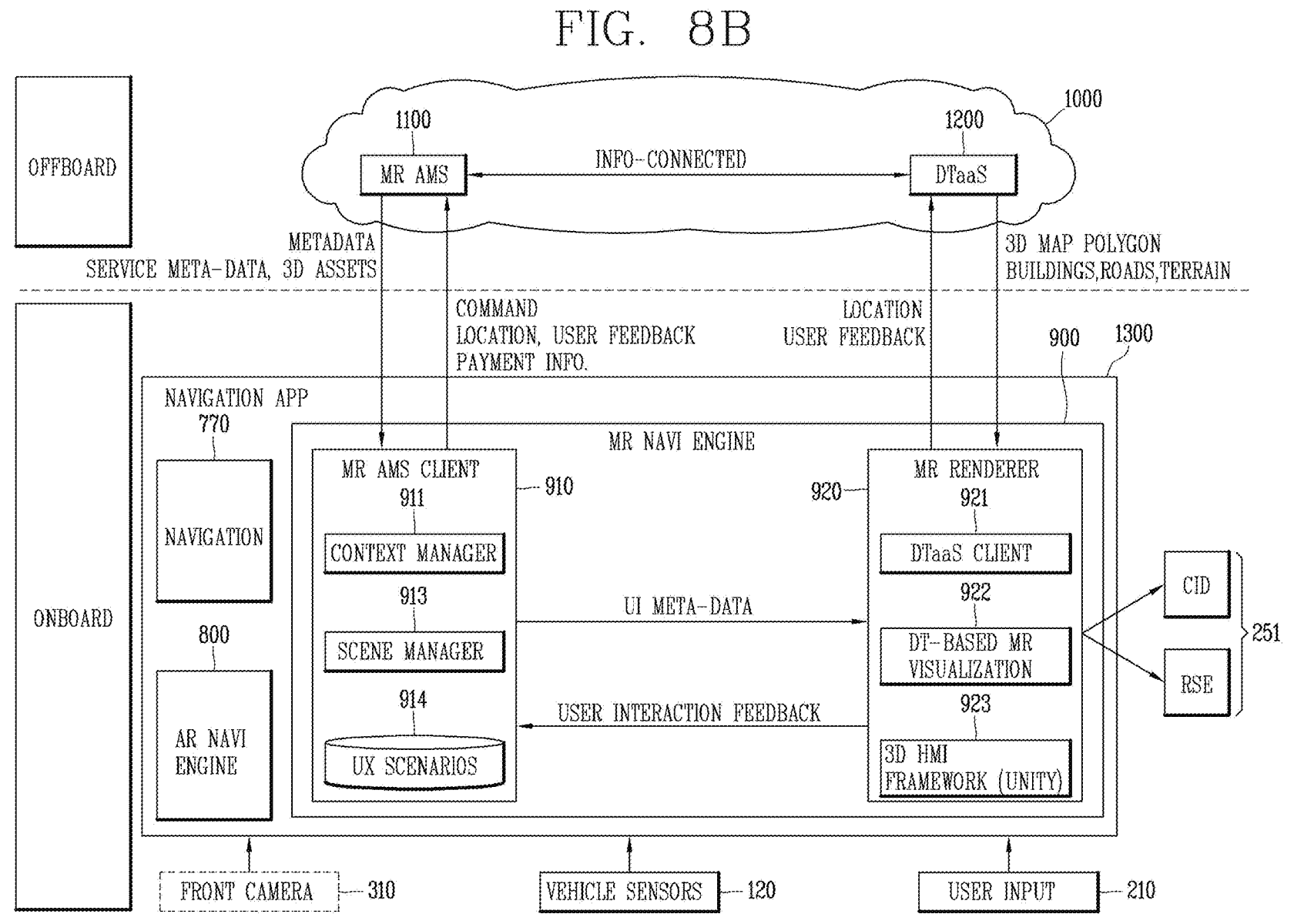

FIG. 8B is a conceptual diagram illustrating an MR service platform for providing an MR service according to the present disclosure.

The present disclosure may provide an MR service platform capable of providing a mixed reality automotive meta service (MR AMS) (hereinafter, interchangeably used with an MR service).

The MR service platform may be referred to as an MR service system, an MR navigation system, an MR platform, an MR system, or the like.

The MR service platform refers to a platform capable of providing a service based on mixed reality, and may include several independent elements.

For example, the MR service platform may include an MR service apparatus 900 (or referred to as an MR navigation engine) provided at a vehicle end (onboard), an MR AMS (hereinafter, referred to as an MR AMS server) 1100 and a Digital Twin as a Service (DTaaS) server 1200 provided at a server end (or cloud end) outside the vehicle (offboard).

The MR service apparatus 900 may include an MR AMS client 910 and an MR renderer 920.

The MR service described herein may be understood as a mixed reality navigation service for a vehicle. That is, the MR service platform of the present disclosure may provide an interface for a vehicle implemented in mixed reality to a user who is onboard a vehicle.

The MR service provided by the MR service platform of the present disclosure may provide a digital world experience through a display in the vehicle while driving in an actual world.

Specifically, the MR service may interactively provide a driver with directions, safe driving, a point of interest (POI), and an entertainment user experience in a virtual 3D space in which real-world information is fused with the digital world.

Through this, the MR service platform of the present disclosure may provide a variety of user experiences (UXs)

deviating from space-time constraints compared to camera-based (or head-up display (HUD)-based) augmented reality (AR) in the related art.

Here, the digital world may refer to a digital twin or a digitally twinned smart city, and the real-world information may include infrastructure data such as Vehicle-to-Everything (V2X) and Cooperative-Intelligent Transport Systems (C-ITS) and/or surrounding recognition data sensed by a sensor provided in an autonomous driving vehicle.

Furthermore, the fusion described above may include a concept of fusing a vehicle and infrastructure sensor data, as well as an MR service cloud 1000 (or MR AMS cloud) and an MR service apparatus 900 for implementing the MR service platform.

In addition, "interactive" should be understood as a concept including not only mixed reality navigation, but also high-quality three-dimensional image rendering and user interaction.

Meanwhile, mixed reality (MR) described herein may refer to an environment in which virtual reality is grafted onto a real world such that a real physical object and a virtual object can interact with each other.

Mixed reality (MR) may include the meaning of augmented reality (AR) in which virtual information is added based on reality and augmented virtuality (AV) in which reality information is added to a virtual environment.

In other words, a smart environment in which reality and virtuality are naturally connected to each other may be provided to provide the user with a rich experience. For example, the user may interact with a virtual pet placed on his or her palm or play a game by creating a virtual game environment in a real room. The user may also virtually rearrange furniture in his or her home, or create an environment where people in remote locations gather and work together.

The mixed reality auto meta service (MR AMS) using mixed reality (MR) according to an embodiment of the present disclosure may help the user to prepare road shapes and actions in advance by expressing a future driving path in preview.

Furthermore, the mixed reality automatic meta service (MR AMS) using mixed reality (MR) according to an embodiment of the present disclosure may improve an advertisement effect or induce service usage rate enhancement by allowing the user to watch a specific point of interest (POI).

In addition, the mixed reality automatic meta service (MR AMS) using mixed reality (MR) according to an embodiment of the present disclosure may not be dependent on a specific map company, and may allow data from various map companies to be fused with one another.

The present disclosure may provide an MR navigation function as one of the mixed reality automotive meta services.

Since the MR navigation function is implemented in a virtual world rather than overlapping an augmented reality object on a real world, it may be possible to solve problems such as front occlusion and difficulties in achieving matching quality that occur in AR navigation.

Accordingly, the present disclosure may improve a user experience (UX) by effectively expressing various contexts that have been difficult to express in the existing navigation through the MR navigation function.

To this end, the MR service platform of the present disclosure may provide an MR context management method, and a method and system of acquiring metadata and 3D assets for providing an MR AMS.

The MR service platform of the present disclosure may render related service metadata and 3D assets to MR navigation by defining an MR context required in a digital world and modeling the service metadata for acquiring the MR context.

Accordingly, the present disclosure may provide a digital world experience through a display in the vehicle while driving in an actual world, and recommend and provide various additional human machine interface (HMI) services to the user by utilizing the improved visibility and watchfulness of the MR navigation.

Hereinafter, an MR service platform according to an embodiment of the present disclosure for providing the foregoing MR service will be described.

Referring to FIG. 8B, the MR service platform (or MR service system) of the present disclosure may include an MR service cloud 1000 provided outside a vehicle and an MR service apparatus 900 provided in the vehicle.

The MR service cloud 1100 provided outside the vehicle (offboard) may include at least one of a Mixed Reality Automotive Meta Service (MR AMS) server 1100 and a Digital Twin as a Service (DTaaS) server 1200.

The onboard MR service apparatus 900 may include an MR AMS client 910 and an MR renderer 920.

The MR service apparatus 900 may interact with the AR service apparatus 800 and the navigation system 770 to provide a navigation function (or a navigation application).

Information required for the navigation function may be received through the camera 310, the sensing unit 120, and a user input (or user request) received through the user input unit 210 provided in the vehicle.

Furthermore, the information required for the navigation function may be received through the MR service cloud 1000 provided outside the vehicle (offboard), and information sensed or processed in the vehicle may be transmitted to the MR service cloud 1000 to receive the information required for each vehicle.

Figure 8C:
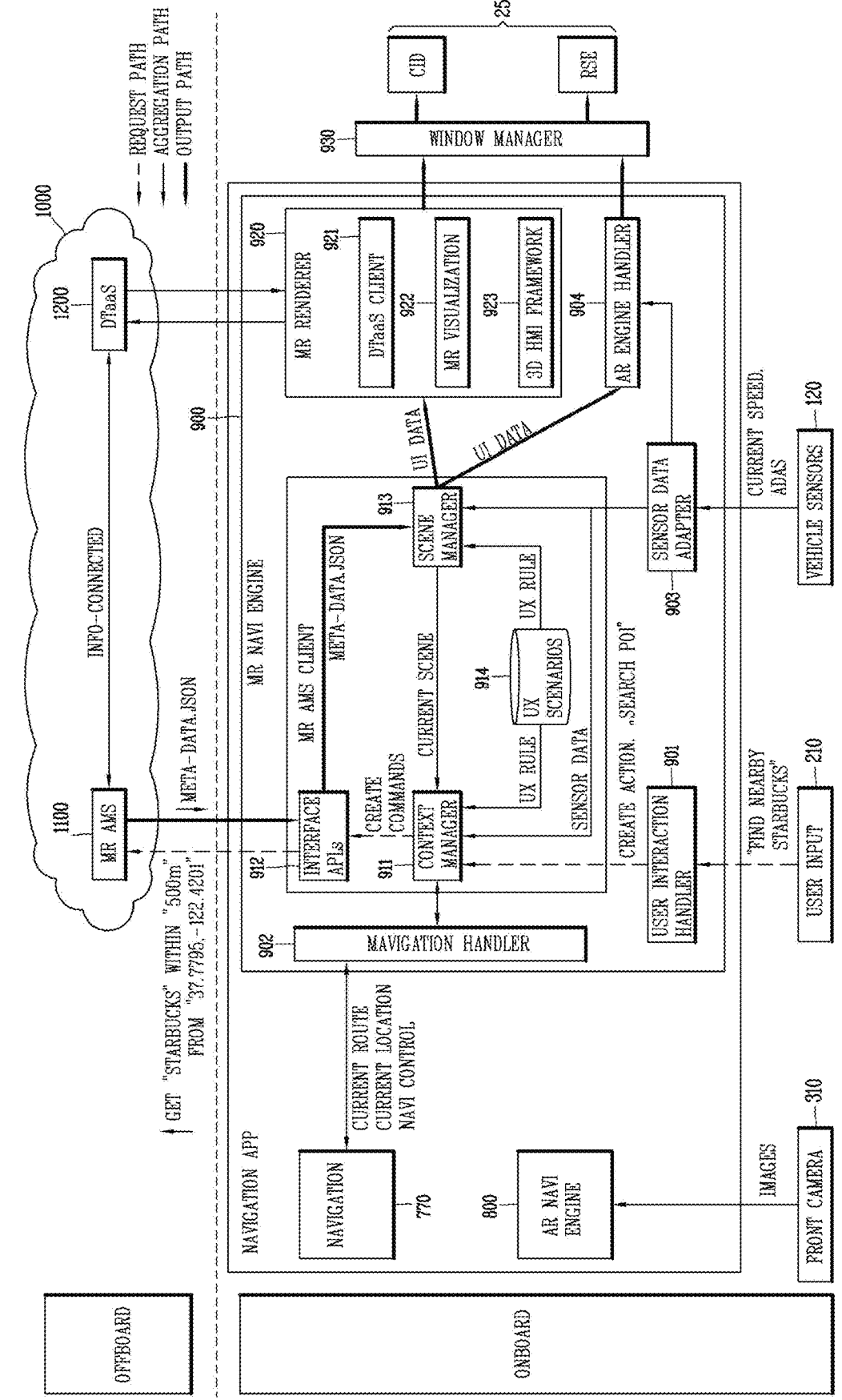
FIG. 8C is a conceptual diagram for explaining an MR AMS client of the present disclosure.
Figure 8D:
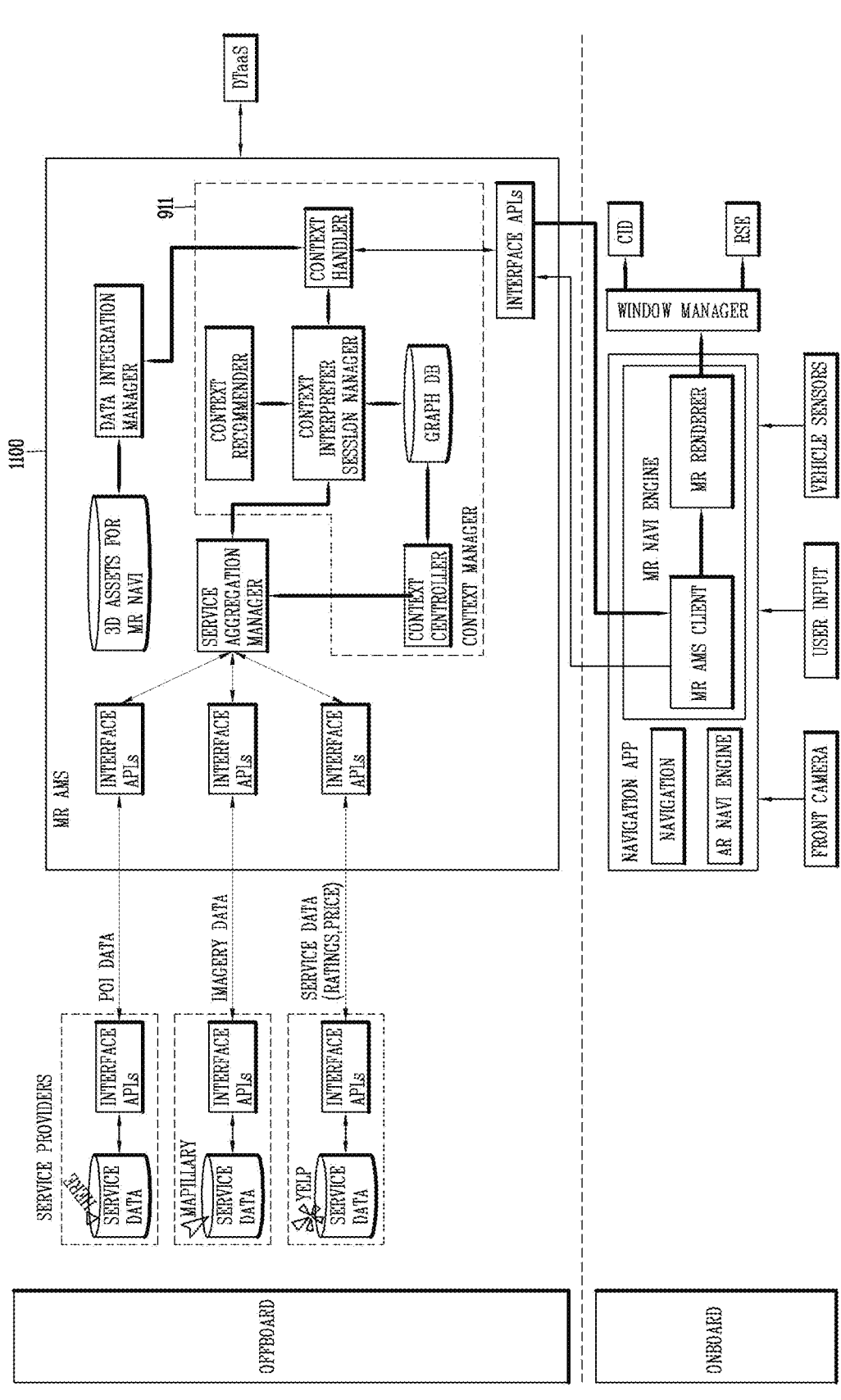
FIG. 8D is a conceptual diagram for explaining an MR AMS server of the present disclosure.

As illustrated in FIG. 8D, the mixed reality automotive meta service (MR AMS) server 1100 may be connected to various service providers 1300a, 1300b, 1300c that provide online map services such as Open Street Map (OSM), Mapbox, HERE, WRLD, BingMAP, and the like. Furthermore, the mixed reality automotive meta service (MR AMS) server 1100 may aggregate shape information of each building included in a map (e.g., footprint information and height of the building) based on a result of aggregating map data provided from the connected service providers 1300a, 1300b, 1300c and provide the aggregated information to the DTaaS server 1200. Here, the DTaaS server 1200 may refer to a server or apparatus that provides a service using DTaaS, that is, a digital twin map.

The DTaaS may refer to a Digital Twin as a Service or a Digital Transformation as a Service.

Meanwhile, the DTaaS server 1200 may be connected to a POI database in which POI service data for each building or each region included in map information is stored. In addition, the DTaaS server 1200 may be connected to a 3D model database in which data of a three-dimensional polygon model (or three-dimensional polygon map) for each building included in the map information is stored. Here, the three-dimensional (3D) polygon model, which is a polygon model capable of providing a building volume, may be a polygon model in which a texture is not defined on a surface thereof. The DTaaS server 1200 may receive service data related to POI from the connected POI database, and may receive data of 3D polygon models of respective buildings included in the map information of a region from the connected 3D model database.

The processor (not shown) of the MR service apparatus 900 may receive various information related to the driving of the vehicle from the object detecting apparatus 300, the sensing unit 120, and the navigation system 770. For an example, the processor may receive information on an object detected from the front, rear, or side of the vehicle from the camera 310 of the object detecting apparatus 300.

In addition, the processor may receive information related to a speed of the vehicle, a driving direction thereof, a current location of the vehicle (GPS), and the like, from the sensing unit 120 including sensors connected to each component of the vehicle including the driving system 710. Furthermore, information related to the driving path of the vehicle may be provided from the navigation system 770.

Meanwhile, the MR service apparatus 900 and the DTaaS server 1200 may be connected through MR AMS interfaces (Interface APIs). Here, the MR service apparatus 900 and the MR AMS interfaces (Interface APIs) may be connected through a wireless network connection. In this case, the MR AMS server 1100 may be a network server or a cloud server connected to the MR service apparatus 900 in a wireless manner.

When connected to the MR AMS server 1100 in this manner, the MR service apparatus 900 may provide at least part of information received from a component (e.g., the vehicle camera 310, the sensing unit 120, or a user input received from the user input unit 210) connected thereto to the MR AMS server 1100 through a network connection. Then, the MR AMS server 1100 may provide three-dimensional map data for providing mixed reality to the MR service apparatus 900 in response to the provided information.

For example, the MR service apparatus 900 may transmit information on objects detected around the vehicle, and information on a speed, a direction of the vehicle, and a current location of the vehicle. Furthermore, information on a driving path may be provided to the MR AMS server 1100. Then, the MR AMS server 1100 may provide the three-dimensional map data of a region according to the current location of the vehicle to the MR service apparatus 900 based on the information provided from the MR service apparatus 900.

In this case, the MR AMS server 1100 may determine POI information based on a current location of the vehicle, a speed of the vehicle, and a driving path of the vehicle, and provide three-dimensional map data further including the determined POI information in the three-dimensional building map. In addition, the MR AMS server 1100 may provide three-dimensional map data further including information on an environment around the vehicle to the MR service apparatus 900 based on the received information on objects around the vehicle.

Meanwhile, the MR service apparatus 900 may render a mixed reality image based on the three-dimensional map data received from the MR AMS server 1100. For an example, the MR service apparatus 900 may control the MR renderer 920 to display a three-dimensional map screen including models of buildings around the vehicle based on the received three-dimensional map data. Furthermore, the MR renderer 920 may display a graphic object corresponding to the vehicle on the three-dimensional map screen, and display graphic objects corresponding to the received POI data and environment information around the vehicle on the three-dimensional map screen.

Therefore, an image of a virtual environment (i.e., a mixed reality (MR) image, or MR navigation screen, or MR navigation interface) including a three-dimensional building model similar to a current vehicle and a shape of a building around the vehicle and a graphic object corresponding to the vehicle may be displayed on a display 251 provided in the vehicle, for example, a center information display (CID), a head up display (HUD), rear sheet information (RSI), or rear sheet entertainment (RSE).

In this case, information related to driving of the vehicle and an environment around the vehicle may be provided to a driver through the virtual environment. Through the three-dimensional map information, that is, a digital twin map (hereinafter referred to as a DT map), the MR service apparatus 900 according to an embodiment of the present disclosure may provide a mixed reality service to the driver.

Meanwhile, the MR AMS server 1100 may determine three-dimensional map data and three-dimensional map data, and POI information that can be provided along with the dimensional map data or environment information around each vehicle based on information collected from the MR service apparatus 900 provided in one vehicle as well as the MR service apparatuses 900 provided in a plurality of vehicles. In this case, the MR AMS server 1100 may collect information from a plurality of vehicles in the form of a cloud server, and generate three-dimensional map data for mixed reality based on the collected information. In addition, based on the generated three-dimensional map data, the mixed reality service may be provided to at least one MR service apparatus 900 provided in different vehicles.

Therefore, for convenience of description, hereinafter, a cloud or server, including the MR AMS server 1100 and the DTaaS server 1200, which provides metadata for providing a mixed reality service (e.g., service metadata, three-dimensional asset), and three-dimensional map information, that is, a digital twin map (DT map) such as a three-dimensional polygon map and a digital twin map, will be referred to as an MR service cloud 1000.

As illustrated in FIG. 8B, the MR service apparatus 900 (or MR navigation engine) may include an MR AMS client 910 and an MR renderer 920.

In addition, in order to implement an MR navigation function, which is one of the MR services, the MR service apparatus 900 may transmit and receive data to and from the AR service apparatus 800 (or AR engine) and the navigation system 770 provided in the vehicle.

The MR AMS client 910 may include a context manager 911, a scene manager 913, and a UX scenario database 914.

Furthermore, the MR renderer 920 may include a DTaaS client 921, an MR visualization unit 922, and a three-dimensional HMI framework 923.

The MR AMS client 910 may collect location information of a vehicle, a user input, user feedback information, payment information, and the like, and transmit them to the MR AMS server 1100 existing outside the vehicle.

The MR AMS server 1100 may transmit at least one of metadata, service metadata, and three-dimensional assets required for providing an MR service based on information received from the MR AMS client.

The MR AMS client 910 may transmit data received from the MR AMS server 910 to the MR renderer 920.

The MR renderer 920 may generate a digital twin map using a three-dimensional polygon map received from the DTaaS server 1200 and an image received from the MR AMS client 910 or the camera 310 provided in the vehicle.

In addition, the MR renderer 920 may render data received from the MR AMS client 920 as an MR object that can be overlapped on the digital twin map, and overlap the rendered MR object on the digital twin map to generate a mixed reality (MR) image.

Then, the MR renderer 920 may display the generated mixed reality image on the display 251 provided in the vehicle.

All elements described herein may be implemented as separate hardware modules, and may be understood as elements implemented in units of blocks in a software configuration as necessary.

Hereinafter, each element constituting the MR service platform will be described in more detail with reference to the accompanying drawings.

FIG. 8C is a conceptual diagram for explaining an MR AMS client of the present disclosure.

The MR AMS client 910 may be provided in the vehicle to provide a mixed reality automotive meta service (MR AMS).

The MR AMS client 910 includes a context manager 911 that requests a context corresponding to a user request (or user input) from the MR AMS server 1100 provided outside the vehicle, a scene manager 913 that manages MR scene information provided to the display 251 provided in the vehicle, and a UX scenario database 914 that provides a UX rule to at least one of the context manager 911 and the scene manager 913.

Furthermore, the MR AMS client 910 may further include an interface API 912 that calls a function for communicating with the MR AMS server 1100 provided outside the vehicle.

The interface API 912, including one or more functions defined to communicate with the MR AMS server 1100, may convert a data format or a message format using these functions to transmit data to the MR AMS server 1100 or convert the format of data received from the MR AMS server 1100.

The interface API 921 may transmit a context request output from the context manager 911 to the MR AMS server 1100, and receive a three-dimensional (3D) asset corresponding to the requested context from the MR AMS server 912.

Here, the context may refer to environment information, and may refer to information corresponding to an environment around the vehicle. Furthermore, the context may include the concept of contents.

The three-dimensional asset may refer to three-dimensional object data corresponding to a requested context. In addition, the three-dimensional asset may refer to a three-dimensional graphic object that can be overlapped or newly updated on a digitally twinned image (or a digital twin map).

The MR AMS client 910 may be included in the MR service apparatus 900.

The MR service apparatus 900 may include a user interaction handler 901 that generates an action corresponding to a user input and transmits the action to the context manager 901 when the user input is received through the input unit 210 provided in the vehicle.

The user interaction handler 901 may be included in the MR service apparatus 900 or included in the MR AMS client 910.

For example, when a user input of "Find nearby Starbucks" is received through the input unit 210 of the vehicle, the user interaction handler 901 may generate an action (e.g., "Search POI") corresponding to the user input and transfer the action to the context manager 911 provided in the MR AMS client 910.

As an example, the action may be determined by an action matching a word included in a user input, and the action may be referred to as a command or a control command.

The context manager 911 may generate a command for requesting a context corresponding to an action received from the user interaction handler 901, and transmit the command to the MR AMS server 1100 through the interface API 912.

The command may be generated based on an action (e.g., "Search POI") received from the user interaction handler 901, and as an example, may be defined to include a current location of the vehicle, a type of POI to be found, and radius information (e.g., GET "Starbucks" (type of POI) WITHIN "500m" (radius) FROM "37.7795, −122.4201" (current location of vehicle (latitude, longitude)).

The context manager 911 may receive current scene information currently being output from the vehicle from the scene manager 913, and receive a UX rule from the UX scenario database 914.

Furthermore, the context manager 911 may receive navigation information including a current path and a current location from a navigation handler 902 that handles information of the navigation system 770.

The navigation handler 902 may be provided in the MR service apparatus 900 or may be provided in the MR AMS client 910.

The context manager 911 may generate a command for requesting the context based on at least one of the current scene information, the UX rule, and the navigation information.

The current scene information may include screen information currently being displayed on the display 251 of the vehicle. As an example, the current scene information may include information on a mixed reality image in which an MR object and an MR interface are overlapped on a digital twin map.

In addition, at least one of the context manager 911 and the scene manager 913 of the present disclosure may receive sensor data processed through a sensor data adapter 903 that processes information sensed through the sensing unit 120 of the vehicle.

The sensor data adapter 903 may be provided in the MR service apparatus 900 or may be provided in the MR AMS client 910. The sensor data adapter 903 may transmit the processed sensor data to the AR engine handler 904 that handles data transmitted to the AR engine (or AR service device) 800.

The interface API 912 may receive metadata of a context corresponding to the command and/or a three-dimensional asset corresponding to the context from the MR AMS server 1100.

Then, the interface API 912 may transmit the received metadata and/or three-dimensional asset to the scene manager 913.

The scene manager 913 may generate UI data using the UX rule received from the UX scenario database 914 and the metadata and three-dimensional asset received from the interface API 912.

Then, the scene manager 913 may transmit the generated UI data to the MR renderer 920 that renders the data to be displayed as a mixed reality (MR) or mixed reality image on the display 251 provided in the vehicle.

Furthermore, the scene manager 913 may further transmit the generated UI data to the AR engine handler 904 configured to handle the AR service apparatus 800 provided in the vehicle.

The UX rule stored in the UX scenario database 914 may refer to information on a rule, form, format, or template for generating a screen, UX, or user interface provided by the MR service device, and the UX rule may be predefined for each type of data.

In addition, the UX rule may be updated or modified by a user or an administrator.

FIG. 8D is a conceptual diagram for explaining an MR AMS server of the present disclosure.

Referring to FIG. 8D, the MR AMS server 1100 provided outside the vehicle (offboard) to provide a mixed reality automotive meta service (MR AMS) may include an interface API 1101 that calls a function for communicating with the MR AMS client provided in the vehicle, a service aggregation manager 1110 that requests and receives a context corresponding to a request received from the MR AMS client from the service provider, and a data integration manager 1120 that loads a three-dimensional asset corresponding to the received context from a database (3D assets for MR navigation database) 1130.

The interface API 1101 may be referred to as a server interface API 1101 to be distinguished from the interface API 912 of the MR AMS client 910 provided in the vehicle.

Furthermore, the interface API 912 of the MR AMS client 910 may be referred to as a vehicle interface API or an MR AMS client interface API.

The interface API 1101 included in the MR AMS server 1100 may transfer a user request (or context request) received from the MR AMS client to the service aggregation manager 1110.

The interface API may include a first interface API 1101 that calls a function for performing communication with the MR AMS client 910, and a second interface API 1102a, 1102b, 1102c in which the service aggregation manager 1110 calls a function for performing communication with the service provider 1300a, 1300b, 1300c.

The second interface API 1102a, 1102b, 1102c may receive service data and/or map data through an interface API provided in the service provider 1300a, 1300b, 1300c.

The second interface API 1102a, 1102b, 1102c and the interface API provided in the service provider 1300a, 1300b, 1300c may perform mutual data transmission and reception, and may include a function defined to convert data format or message format, and may convert data format or message format using such a function to transmit and receive data to and from each other.

The service aggregation manager 1110 may request the requested context from different service providers based on a type of context requested by the MR AMS client 910 provided in the vehicle.

Specifically, the service aggregation manager 1110 may request a first type of context from the first service provider 1300a that provides the first type of context when the requested type of the context is the first type of context, and request a second type of context from the second service provider 1300b that provides the second type of context when the type of the requested context is the second type of context.

As an example, in a case where the type of the requested context relates to a POI (e.g., "Starbucks"), the service aggregation manager 1110 may request and receive a context for the POI (or POI data) from the first service provider 1300a that provides information on the POI.

Furthermore, when the type of the requested context is a view of a certain street, the service aggregation manager 1110 may request and receive a context (or imagery data) for the view of the certain street from the second service provider 1300*b* that provides information on the view of the street.

In addition, when the type of the requested context is a certain service, the service aggregation manager 1110 may request and receive a context related to the service (or data (e.g., service ratings or prices) on the service) from the third service provider 1300*c* that provides information related to the service.

Furthermore, the interface API 1101 may request expanded service API calls from the service aggregation manager 1110 based on the service (or context request) requested by the MR AMS client 910.

The service aggregation manager 1110 may request and receive information corresponding to the expanded service from the service provider 1300*a*, 1300*b*, 1300*c* based on the expanded service API request, and generate a service API using the information and output the generated service API to the data integration manager 1120.

The data integration manager 1120 may perform data enhancement based on the service API received from the service aggregation manager 1110, and generate a metadata package for the requested context to transmit the generated metadata package to the MR AMS client 910 of the vehicle through the interfaces API 1101.

The metadata package may include the three-dimensional asset and service metadata described above. Here, the service metadata may refer to metadata for providing a service corresponding to a requested context.

Meanwhile, the interface API 1101 may transmit a three-dimensional asset loaded from the data integration manager 1120 to the MR AMS client 910.

Meanwhile, the MR AMS server 1100 of the present disclosure may further include the context manager 911 described above.

That is, the context manager 911 may be included in the MR AMS client 910 to be provided at a vehicle end, included in the MR AMS server 1100 to be provided at a server (cloud) end, on both sides, or provided at both sides.

When provided in the MR AMS server 1100, the context manager 911 may be configured to manage a context corresponding to a request received from the MR AMS client 910.

The context manager 911 may include a context handler 911*a* that handles and parses a context request, a context interpreter 911*b* that manages a session for interpreting the context request and generates a context set using a data model, and a context graph database (context graph DB or MR context DB) 911*c* that stores the data model.

Here, the context handler 911*a* may receive a user request input to the MR AMS client through the interface API 1101, and parse the received user request to transmit the parsed user request to the context interpreter 911*b*.

The context interpreter 911*b* may generate a session and then generate a query for a context request corresponding to the user request, and request and receive a context data model corresponding to the query from the context graph database 911*c*.

The context interpreter 911*b* may request a context corresponding to the context data model from the service aggregation manager 1110, and the service aggregation manager 1110 may request and receive context data corresponding to the context data model from the service provider 1300*a*, 1300*b*, 1300*c*.

The service aggregation manager 1110 may request and receive a three-dimensional asset (and/or service meta data) corresponding to the requested context from the data integration manager 1120, and transmit context data received from the service provider and the three-dimensional asset (and/or service metadata) received from the data integration manager to the context interpreter 911*b*.

The context interpreter 911*b* may transmit the received context data and the three-dimensional asset to the MR AMS client 910 provided in the vehicle through the context handler 911*a* and the interface API 1101.

On the other hand, the context manager 911 may further include a context recommender 911*d* that extracts a recommendation context based on the generated context set and a context controller 911*e* (or context tracker) that manages a context to be periodically acquired.

When the completed context data includes information that is unavailable for a specific service, the context recommender 911*d* may request the context interpreter 911*b* to generate a query for recommending a service capable of substituting the specific service.

Figure 9:
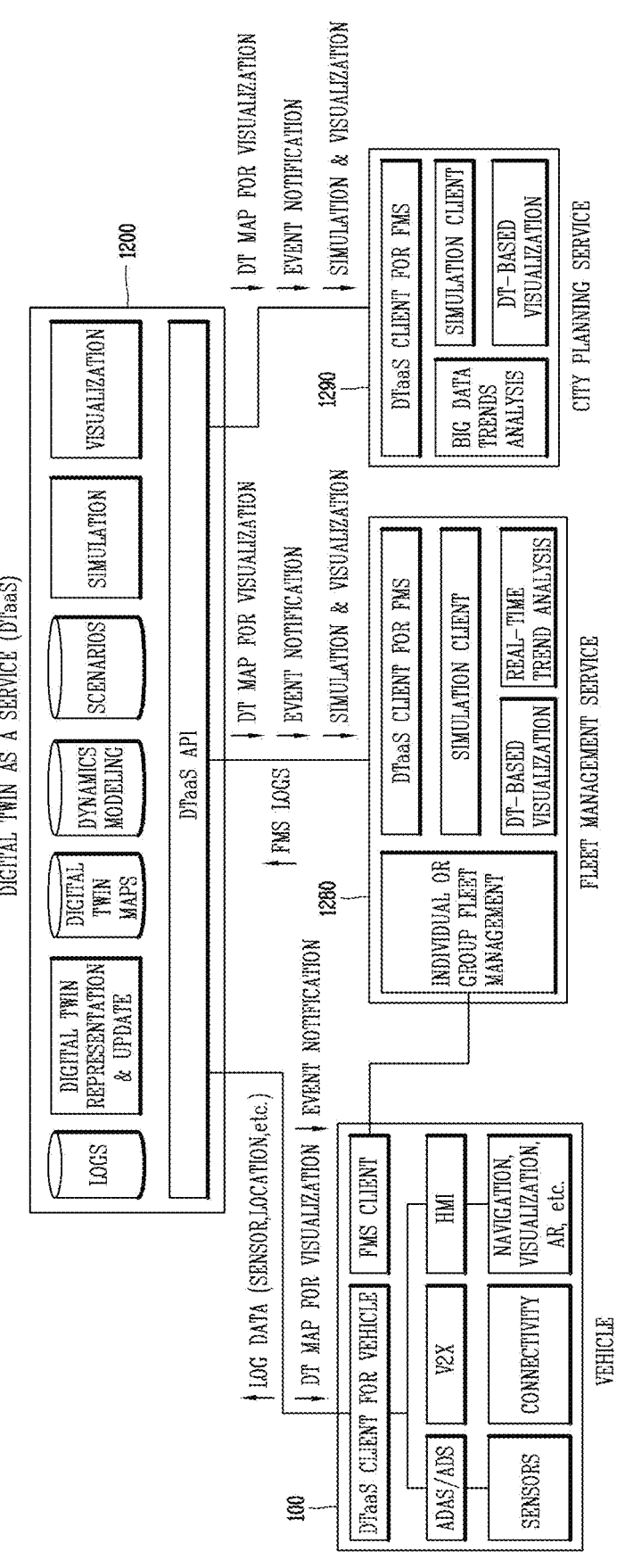
FIG. 9 is a conceptual diagram for explaining an DT AMS server of the present disclosure.

FIG. 9 is a conceptual diagram for explaining an DT AMS server of the present disclosure.

Referring to FIG. 9, the Digital Twin as a Service or Digital Transformation as a Service (DTaaS) server 1200 of the present disclosure may be provided outside the vehicle to provide a mixed reality automotive meta service (MR AMS). Specifically, the DTaaS server 1200 may provide a digital twin map or data (e.g., all types of information on an object overlapping on a three-dimensional polygon map or digital twin) required to generate the digital twin map.

The DTaaS server 1200 may include a DTaaS API 1210 that calls a function for communicating with the MR service apparatus 900 provided in the vehicle, a database (Digital Twins Maps DB) 1220 that stores a digital twin map and a renderable 3D polygon map provided to the MR service device, and a processor 1280 that transmits a three-dimensional polygon map corresponding to location information to the MR service device through the DTaaS API based on the location information of the vehicle received from the MR service device.

In addition, the DTaaS server 1200 may further include a telecommunication unit (TCU) 1290 provided outside the vehicle to perform communication with the MR AMS server 1100 that provides an MR AMS service.

In addition, the DTaaS server 1200 may further include a digital twin map generation unit (digital twin representation and update unit) 1230 that generates a digital twin map by matching an actually captured image to a three-dimensional polygon map stored in the database 1220.

Furthermore, the DTaaS server 1200 may further include a dynamics modeling DB 1240 that stores dynamic information on a moving object received from at least one of the MR service apparatus 900 and the MR AMS server 1100, and a scenario DB 1250 that stores information related to a scenario that can be implemented in a digital twin.

In addition, the DTaaS server 1200 may further include a simulation unit 1260 that performs a simulation corresponding to a user request on the digital twin, and a visualization unit 1270 that visualizes information to be implemented on the digital twin.

All of the above-described elements may be implemented as independent hardware (e.g., a chip or a module), and may also be implemented as blocked components in a software configuration if necessary.

The DTaaS server 1200 may transmit and receive data to and from not only the vehicle 100 but also a server (FMS server) 1280 that provides a fleet management service and a server 1290 that provides a city planning service through the DTaaS API 1210.

As an example, the DTaaS server 1200 may collect log information collected by each server from at least one of the vehicle 100, the FMS server 1280, and the city planning service providing server 1290.

Then, the DTaaS server 1200 may store the collected log information in a log database.

The DTaaS server 1200 may provide a digital twin map for visualization from at least one of the vehicle 100, the FMS server 1280, and the city planning service providing server 1290 based on the collected log information.

In addition, the DTaaS server 1200 may transmit at least one of event notification information, simulation information and visualization information to at least one of the vehicle 100, the FMS server 1280 and the city planning service providing server 1290 based on the received log information.

Meanwhile, the vehicle 100 according to the present disclosure may include a route guidance device (path navigating device) 1300.

The route guidance device 1300 may include the AR service apparatus 800 and/or the MR service apparatus 900 described above.

The AR service apparatus 800 may be referred to as an AR engine or an AR module, and the MR service apparatus 900 may be referred to as an MR engine or an MR module.

The route guidance device 1300 may perform a function/operation/control method of at least one of the AR service apparatus 800 and the MR service apparatus 900.

A processor 1330 included in the route guidance device 1300 may be a separate processor 1330 that controls at least one of the AR service apparatus 800 and the MR service apparatus 900, or may refer to the AR service apparatus 800 and/or the MR service apparatus 900 itself.

Furthermore, the route guidance device 1300 may control at least one of those elements illustrated in FIG. 7. From this perspective, the route guidance device 1300 may be the controller 170.

However, the present disclosure is not limited thereto, and route guidance device 1300 may be a separate configuration independent of the controller 170. When the route guidance device 1300 is implemented as an element independent of the controller 170, the route guidance device 1300 may be provided on a part of the vehicle 100.

Hereinafter, description will be given of an example that the route guidance device 1300 is an element separate from the controller 170 for the sake of explanation. In this specification, functions (operations) and control methods described in relation to the route guidance device 1300 may be executed by the controller 170 of the vehicle. That is, every detail described in relation to the route guidance device 1300 may be analogically applied to the controller 170 in the same/like manner.

Furthermore, the route guidance device 1300 described herein may include some of the components illustrated in FIG. 7 and various elements included in the vehicle. For the sake of explanation, the components illustrated in FIG. 7 and the various components included in the vehicle will be described with separate names and reference numbers.

Figure 10A:
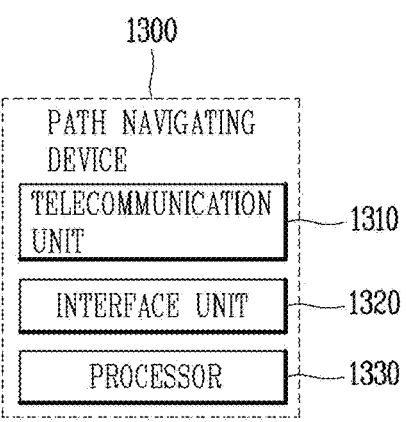
FIG. 10A is a block diagram illustrating a structure of a route guidance device according to an embodiment of the present disclosure.

FIG. 10A is a conceptual diagram for explaining the route guidance device 1300.

The route guidance device 1300 according to an embodiment of the present disclosure may include a telecommunication unit 1310, an interface unit 1320, and a processor 1330.

The telecommunication unit 1310 may be configured to perform wireless communication with at least one of electrical parts provided in the vehicle (e.g., electrical parts provided in the vehicle illustrated in FIG. 7).

Furthermore, the telecommunication unit 1310 may be configured to communicate with apparatuses other than the vehicle, for example, a mobile terminal, a server, another vehicle, an infrastructure provided on a road, and the like.

The telecommunication unit 1310 may be a communication apparatus 400 described above, and may include at least one of components included in the communication apparatus 400.

The interface unit 1320 may communicate with at least one of components provided in the vehicle.

Specifically, the interface unit 1320 may be configured to perform wired communication with at least one of the components included in the vehicle illustrated in FIG. 7.

The interface unit 1320 receives sensing information from one or more sensors provided in the vehicle 100.

The interface unit 1320 may be referred to as a sensor data collector.

The interface unit 1320 may collect (receive) information sensed through sensors (for example, sensors (V. sensors) (e.g., heading, throttle, break, wheel, etc.) for sensing the operation of a vehicle) and sensors (S. sensors) (e.g., camera, radar, LiDAR, sonar, etc.) for sensing the surrounding information of a vehicle).

The interface unit 1320 may transmit the information sensed through the sensors provided in a vehicle to the telecommunication control unit 1310 (or the processor 1330) to reflect the information on the high-definition map.

The interface unit 1320 may serve as a passage with electrical parts provided in the vehicle through the vehicle interface unit 130.

The interface unit 1320 may exchange data with the vehicle interface unit 130.

The interface unit 1320 may be connected to the vehicle to serve as a passage through which electric energy is supplied.

For example, the route guidance device 1300 may receive electrical energy from the power supply unit 190 of the vehicle through the interface unit 1320 to turn on power.

Meanwhile, the present disclosure may include the processor 1330 that controls each element of the route guidance device 1300 connected thereto and controls an overall operation of the route guidance device 1300. The processor 1330 may generate a digitally twinned three-dimensional map using at least one of an image captured by a camera provided in the vehicle, two-dimensional map information, and three-dimensional map information.

The processor 1330 may overlap (or superimpose, display) a graphic object related to path navigation on the digitally twinned three-dimensional map.

Here, the graphic object related to path navigation may refer to an object being displayed in augmented reality, and may include various types of objects (e.g., a POI object, a carpet-type object, a 3D object, etc.) required to perform path navigation.

In this case, the graphic object related to path navigation may be referred to as an AR object, and an image on a display screen that displays the AR object, that is, a view image, may be referred to as an AR view image.

Furthermore, the graphic object related to path navigation may refer to an object being displayed in mixed reality (MR), and may include various types of objects (e.g., objects on a digitally twinned three-dimensional map, etc.) required to perform path navigation. In this case, the graphic object related to path navigation may be referred to as an MR object, and an image on a display screen that displays the MR object, that is, a view image, may be referred to as an MR view image.

The route guidance device 1300 may render a mixed reality image based on the three-dimensional map data received from the MR AMS server 1100. For an example, the route guidance device 1300 may control the MR renderer to display a three-dimensional map screen including models of buildings around the vehicle based on the received three-dimensional map data. Furthermore, the route guidance device 1300 may display a graphic object corresponding to the vehicle on the three-dimensional map screen, and display graphic objects corresponding to the received POI data and environment information around the vehicle on the three-dimensional map screen.

Therefore, an image of a virtual environment including a three-dimensional building model similar to a current vehicle and a shape of a building around the vehicle and a graphic object corresponding to the vehicle may be displayed on a display 251 such as a center information display (CID), a head up display (HUD), rear sheet information (RSI), or rear sheet entertainment (RSE).

In this case, information related to driving of the vehicle and an environment around the vehicle may be provided to a driver through the virtual environment. Through the three-dimensional map information, that is, a digital twin map, the route guidance device 1300 according to an embodiment of the present disclosure may provide a mixed reality service to the driver.

Meanwhile, the MR AMS server 1100 may determine three-dimensional map data and three-dimensional map data, and POI information that can be provided along with the dimensional map data or environment information around each vehicle based on information collected from the route guidance device 1300 provided in one vehicle as well as the route guidance devices 1300 provided in a plurality of vehicles.

In this case, the MR AMS server 1100 may collect information from a plurality of vehicles in the form of a cloud server, and generate three-dimensional map data for mixed reality based on the collected information. In addition, based on the generated three-dimensional map data, MR information for providing a mixed reality service may be transmitted to at least one route guidance device 1300 provided in different vehicles.

Hereinafter, for convenience of description, the MR AMS server 1100 connected to the DTaaS server 1200 to provide three-dimensional map information for providing a mixed reality service, that is, a digitally twinned three-dimensional map, and the DTaaS server 1200 will be collectively referred to as a cloud server.

Hereinafter, a method of performing path navigation using an AR view image provided through an image captured by a camera and an MR view image provided through a digitally twinned three-dimensional map will be described in more detail with reference to the accompanying drawings.

Figure 10B:
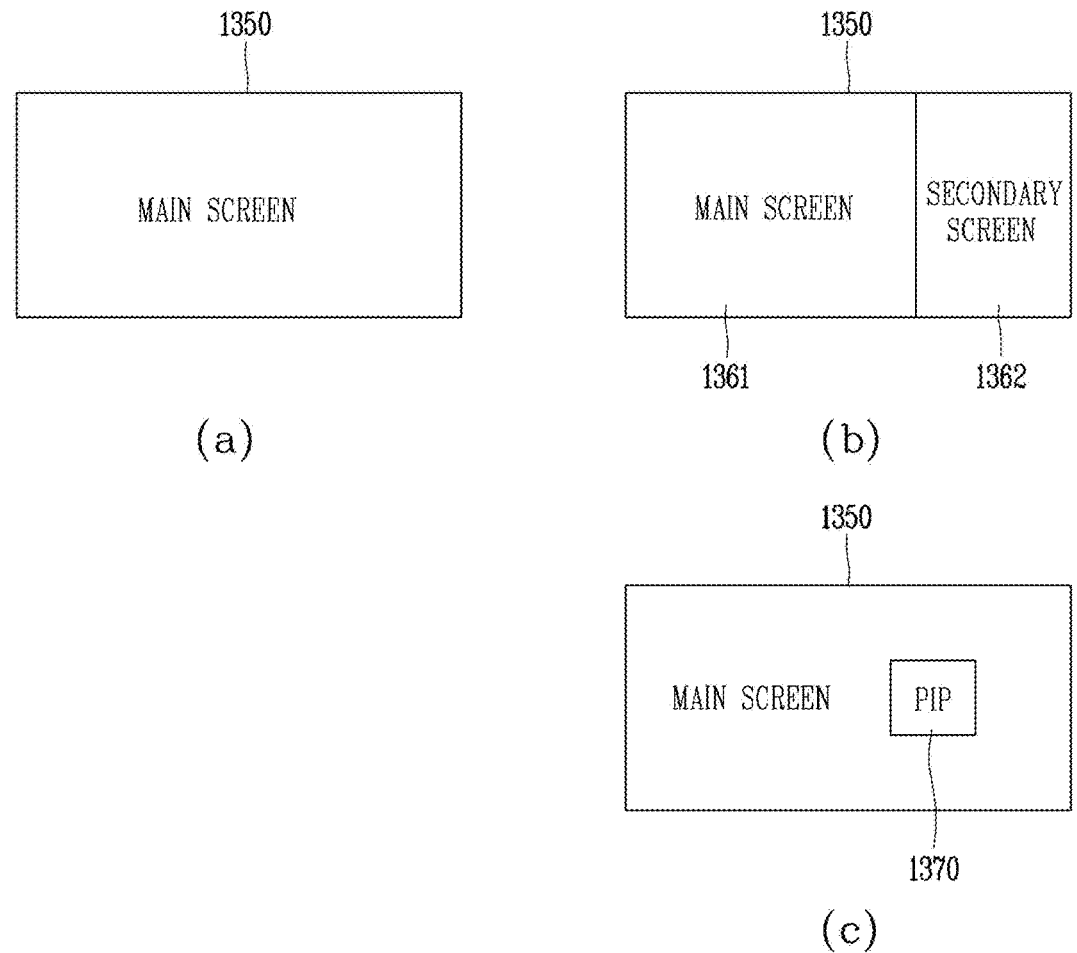
FIG. 10B is an exemplary diagram illustrating an example of a display that displays path navigating information through the route guidance device according to an embodiment of the present disclosure.

FIG. 10B illustrates an example of a display screen 1350 that displays a view image by the route guidance device 1300 according to an embodiment of the present disclosure. The display screen 1350 may be a screen of the display 251 provided in a vehicle in which the route guidance device 1300 is mounted. As an example, the display 251 may be at least one of a center information display (CID), a head up display (HUD), rear sheet information (RSI), and rear sheet entertainment (RSE) provided in the vehicle.

The route guidance device 1300 may provide a view image includes a view image (e.g., an AR view image, an MR view image) including various objects (e.g., an AR object and an MR object) for displaying path navigating information on the display 251 through the interface unit 1320 to allow the display 251 to display at least one of an AR view image including an AR object and an MR view image including an MR object. In this case, the display 251 may display at least one of an AR view image and an MR view image under the control of the route guidance device 1300 through the interface unit 1320.

Referring to FIG. 10B, the route guidance device 1300 may display one view image on an entire region of the display screen 1350 as shown in (a) of FIG. 10B. In this case, the view image may be an AR view image or an MR view image. Here, when the AR view image is displayed, the route guidance device 1300 may display an image in which at least one AR object is displayed in an actual image acquired from a camera provided in the vehicle. In this case, the actual image acquired from the camera may be an image that has captured a front of the vehicle, a side (left or right) of the vehicle, or a rear of the vehicle. Furthermore, AR objects displayed on the image may be graphic objects corresponding to objects or surrounding environments located at the front of the vehicle, at the side of the vehicle, or at the rear of the vehicle, respectively, according to the captured image.

On the other hand, when the MR view image is displayed on the display screen 1350, the route guidance device 1300 may display a view image in which an MR object corresponding to the vehicle is displayed at a specific shooting angle corresponding to a passenger's selection or a state of the vehicle. As an example, the MR view image displayed on the route guidance device may include an MR view image such as a bird view image looking down on a vehicle from above using a digitally twinned three-dimensional map, a side view image looking at the right or left side of the vehicle from a predetermined angle, or a rear side view looking at the rear of the vehicle.

Meanwhile, in a state where one type of view image is displayed on the display screen 1350, the route guidance device 1300 may switch the view image displayed on the display screen 1350 to another type of view image depending on whether a preset condition is satisfied. As an example, the route guidance device 1300 may switch a view image displayed on the display screen 1350 to an MR view image when it is difficult to provide an accurate AR view image as it is difficult to acquire an image capable of clearly identifying objects included therein, such as weather, a traffic condition, and an ambient illuminance around the vehicle, while the display 251 displays an AR view image. In this case, path navigating information provided through augmented reality may be switched to a state of being provided through mixed reality. In addition, path navigating information may be provided through an MR view image.

Alternatively, the route guidance device 1300 may switch a view image displayed on the display screen 1350 to an AR view image depending on whether the AR view image can be provided while the display 251 displays the MR view image, and provide path navigating information through the MR view image. In this case, the path navigating information provided through mixed reality may be switched to a state of being provided through augmented reality.

Hereinafter, an operation process in which the route guidance device 1300 switches from an AR operation mode for displaying an AR view image to an MR operation mode for displaying an MR view image, or switches from the MR operation mode to the AR operation mode based on preset conditions related to a vehicle to control the display 251 to provide path navigating information using a view image that is more suitable for a current state and surrounding environment of the vehicle between the AR view image and the MR view image and an embodiment thereof will be described below in detail with reference to FIGS. 11 to 15.

Meanwhile, while one type of view image is displayed on the display screen 1350, the route guidance device 1300 may divide a display region to display different types of view images. For example, the route guidance device 1300 may divide the display screen 1350 into a main screen region 1361 and a secondary screen region 1362 as shown in (b) of FIG. 10B.

In this case, the route guidance device 1300 may control the display 251 to display different types of view images on the main screen region 1061 and the secondary screen region 1362. That is, the route guidance device 1300 may control the display 251 to display an AR view image on the main screen region 1361, and display an MR view image on the secondary screen region 1362. Alternatively, on the contrary, the display 251 may be controlled to display an MR view image on the main screen region 1361, and display an AR view image on the secondary screen region 1362.

Alternatively, the route guidance device 1300 may generate a picture-in-picture (PIP) region 1370 that overlaps at least part of the display screen 1350 while one type of view image is displayed on the display screen 1350. In this case, the PIP region is displayed in the form of a pop-up, and may be a region that overlaps at least part of the display screen 1350. In this case, the PIP region 1370 may overlap the display screen 1350 through a multi-layer scheme.

In this case, the route guidance device 1300 may control the display 251 to display different types of view images on the display screen 1350 and the PIP region 1370. That is, the route guidance device 1300 may control the display 251 to display an AR view image on the display screen 1350, and display an MR view image on the PIP region 1370. Alternatively, on the contrary, the display 251 may be controlled to display an MR view image on the display screen 1350, and display an AR view image on the PIP region 1370.

Hereinafter, an operation process in which the route guidance device 1300 divides the display screen 1350 to control the display 251 to display both an AR view image and an MR view image on a single screen and embodiments thereof will be described below in more detail with reference to FIGS. 16 to 20. In addition, an operation process in which the route guidance device 1300 overlaps at least part of the display screen 1350 on which any one type of view image is displayed and another type of view image to control the display 251 to display both an AR view image and an MR view image on a single screen and embodiments thereof will be described below in more detail with reference to FIGS. 20 to 22.

First, an operation process of the route guidance device 1300 that switches from an AR operation mode to an MR operation mode or switches from the MR operation mode to the AR operation mode to control the display 251 to provide a view image according to the switched operation mode will be described.

Figure 11:
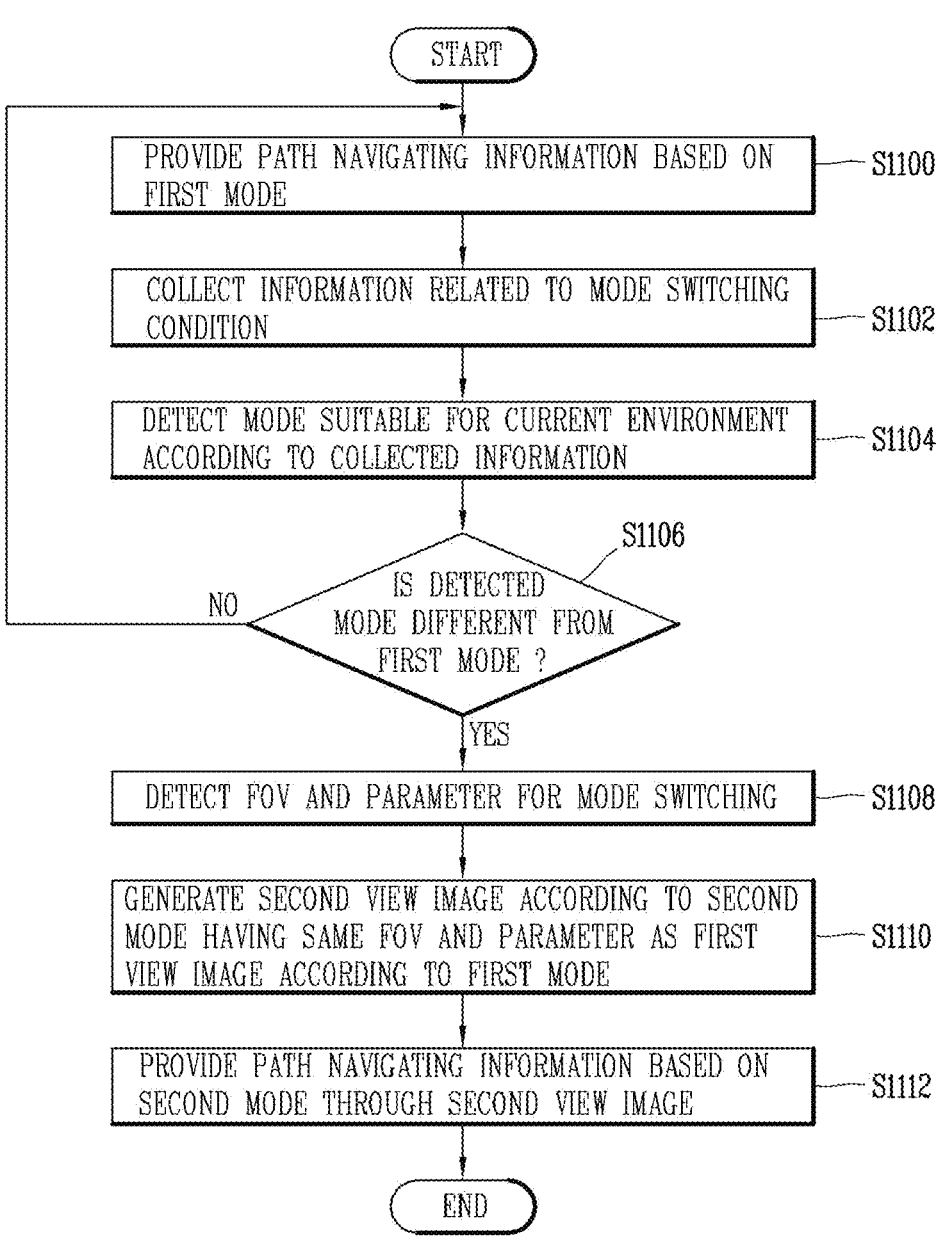
FIG. 11 is a flowchart illustrating an operation process of providing path navigating information through either AR or MR through operation mode switching by the route guidance device according to an embodiment of the present disclosure.
Figure 12:
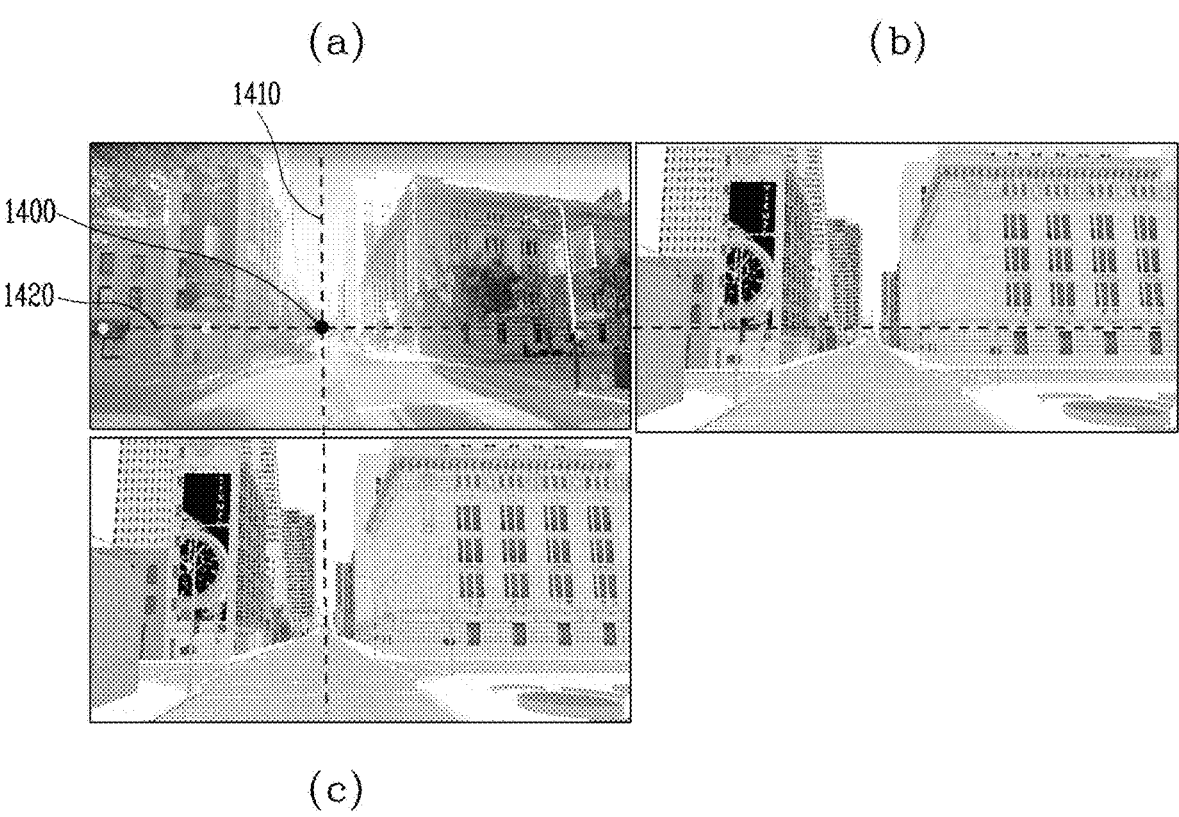
FIG. 12 is an exemplary diagram illustrating an example in which the route guidance device according to an embodiment of the present disclosure generates an MR view image corresponding to an AR view image.

FIG. 11 is a flowchart illustrating an operation process of providing path navigating information through either augmented reality or mixed reality through operation mode switching by the route guidance device 1300 according to an embodiment of the present disclosure. Furthermore, FIG. 12 illustrates an example in which the route guidance device 1300 according to an embodiment of the present disclosure generates a second view image according to parameters detected from a first view image. Furthermore, FIG. 13 illustrates an example of an augmented reality view image displayed on the route guidance device 1300 according to an embodiment of the present disclosure and a mixed reality view image corresponding to the augmented reality view image.

First, referring to FIG. 11, the route guidance device 1300 according to an embodiment of the present disclosure may provide path navigating information through a view image based on a first mode (S1100).

Here, the first mode may be an AR operation mode in which an AR object is displayed on a real image acquired through a camera according to an augmented reality technology. In this case, the view image displayed in the first mode may be an AR view image including the AR object. Alternatively, the first mode may be an MR operation mode in which a virtual object (MR object) is displayed on a digitally twinned three-dimensional map according to a mixed reality technology. In this case, the view image displayed in the first mode may be an MR view image including the MR object.

Furthermore, the path navigating information may include a plurality of information related to a vehicle or an environment around the path as well as path information related to a path to a currently set destination. As an example, the path navigating information may include information on objects corresponding to at least objects or buildings currently located in the vicinity of the vehicle. In addition, the path navigating information may include information on at least one object located in the vicinity of the path to the destination or various objects related to the vicinity of the destination. The information of these objects may be included in the form of point of interest (POI) information. In addition, the path navigating information may be information including information on a state of the vehicle or an environment around the vehicle, such as a current speed or an amount of fuel of the vehicle, a state of a driving road, whether there is traffic congestion, weather around the vehicle, and the like.

In the step S1100 of providing path navigating information based on the first mode, the route guidance device 1300 may collect information related to a mode switching condition based on at least one sensor provided in the vehicle (S1102). Here, the at least one sensor may include the telecommunication unit 1310 of the route guidance device 1300.

Furthermore, the information related to the mode switching condition may be information related to a type of path information requested by a passenger, a zone or road in which the vehicle drives, a driving mode of the vehicle, a time of driving, weather, a traffic condition around the vehicle, a driving state, a driving environment and a preferred path of the vehicle. In addition, the information related to the mode switching condition may be information related to an accuracy of a currently displayed view image or a location of a warning generated around the vehicle.

Furthermore, the route guidance device 1300 may detect a mode suitable for the current environment based on the information collected in the step S1102 (S1104).

As an example, the route guidance device 1300 may determine a suitable mode based on path information requested by a passenger. When the passenger requests path information corresponding to a current time point, the route guidance device 1300 may determine that an AR mode that provides an AR view image displaying an actual image acquired through a camera is a mode suitable for the current environment.

On the other hand, when the path information requested by the passenger is not path information corresponding to the current time point, that is, when the passenger requests path information on a future driving path of a junction or a destination where the vehicle has not yet driven, or path information such as a past driving path where the vehicle has already driven, or POI information on a path that has already been passed, the route guidance device 1300 may determine that an MR mode that provides an MR view image including a digitally twinned three-dimensional map and a virtual object is a mode suitable for a current environment.

Alternatively, the route guidance device 1300 may determine a suitable mode based on a zone in which the vehicle is driving. For example, when a road on which the vehicle is driving is a highway with low traffic complexity, the route guidance device 1300 may determine that an AR mode that provides an AR view image is a mode suitable for a current environment. On the other hand, when a road on which the vehicle is driving is a typical road with high traffic complexity, the route guidance device 1300 may determine that an MR mode that provides an MR view image is a mode suitable for a current environment.

Furthermore, the route guidance device 1300 may determine an operation mode that displays a suitable view image according to a state of a road on which the vehicle drives. For example, in the case of a paved road or a road with a curvature below a preset threshold value, the route guidance device 1300 may determine that the AR mode is a mode suitable for a current environment.

On the other hand, when the road on which the vehicle drives is an unpaved road, a road with a curvature exceeding the threshold value, or a road without lanes, it may be difficult to accurately recognize the road through an image acquired through a camera. For example, it may be difficult to recognize lanes. Therefore, when the road on which the vehicle drives is an unpaved road or a road with a curvature exceeding a threshold value, the route guidance device 1300 may determine that an MR mode that does not use an actually captured image is a mode more suitable for a current environment. In addition, when driving on a slope where no height profile is provided, it may be determined that an MR mode is a mode more suitable for a current environment.

Meanwhile, information on the state of the road may be collected from a server that provides traffic information or collected from an image acquired through a camera. Alternatively, the information on the state of the road may be acquired from a digitally twinned three-dimensional map.

Alternatively, the route guidance device 1300 may determine a suitable mode based on a driving mode of the vehicle. For example, when the vehicle is driving in a manual driving mode in which a passenger directly drives, the route guidance device 1300 may determine that an AR mode that provides an AR view image is a mode suitable for a current environment. On the other hand, when the vehicle is driving in an autonomous driving mode in which the vehicle autonomously drives, the route guidance device 1300 may determine that an MR mode that provides an MR view image is a mode more suitable for a current environment.

Alternatively, the route guidance device 1300 may determine a mode suitable for a current environment according to whether an image having a brightness contrast above a threshold value can be acquired. As an example, when the vehicle is driven during a daytime period in which an image having a clear brightness contrast can be acquired due to high illuminance, the route guidance device 1300 may determine that an AR mode that provides an AR view image using an actually acquired image is a mode suitable for a current environment.

On the contrary, when the vehicle is driven during a nighttime period in which an image having a brightness contrast above a threshold value cannot be acquired due to low illuminance, the route guidance device 1300 may determine that an MR mode that provides an MR view image using a digitally twinned three-dimensional map is a mode suitable for a current environment. As such, when the vehicle is driving at night, an MR view image including objects having higher visibility for objects around the vehicle may be displayed (night MR mode).

Meanwhile, as described above, the route guidance device 1300 may determine a mode suitable for a current environment according to whether an image having a brightness contrast above a threshold value can be acquired. Therefore, when illuminance is sufficient as a result of detecting the illuminance around the vehicle (above a threshold value), the route guidance device 1300 may determine that an image around the vehicle having a brightness contrast above the threshold value can be acquired even when a time period during which the vehicle drives is a nighttime period. Therefore, it may of course be determined that an AR mode is more suitable even when the time period during which the vehicle drives is a nighttime period.

Meanwhile, the route guidance device 1300 may determine a mode suitable for a current environment based on weather around the vehicle. For example, as a result of sensing the weather around the vehicle, when it is snowy, rainy, or foggy weather, the route guidance device 1300 may determine that an MR mode using a digitally twinned map rather than an AR mode using an actual image is suitable. In this case, the route guidance device 1300 may display an MR view image including an MR object reflecting the weather around the vehicle. For example, in the case of snowy or rainy weather, the route guidance device 1300 may display an MR object including an ice-shaped road carpet on the MR view image.

On the other hand, in the case of clear weather without snow, rain, fog, etc., the route guidance device 1300 may determine that an AR mode using an actual image is more suitable for a current environment.

Here, the route guidance device 1300 may collect information on weather around the vehicle through a sensor provided in the vehicle. Alternatively, the route guidance device 1300 may connect the vehicle to a weather server that provides weather information on a zone in which the vehicle is currently driving through the telecommunication unit 1310, and determine weather around the vehicle based on weather information provided from the weather server.

Meanwhile, the route guidance device 1300 may determine a mode suitable for a current environment based on a traffic congestion environment around the vehicle. For example, the route guidance device 1300 may determine that an AR mode that displays an AR view image is suitable when the traffic congestion around the vehicle is below a predetermined level. However, when the traffic congestion around the vehicle is above a predetermined level, it may be determined that an MR mode that displays an MR view image is suitable.

In this case, the route guidance device 1300 may display an MR view image including MR objects that can be distinguished from one another according to a traffic congestion level on each road around the vehicle.

Here, the traffic congestion levels for each road may be provided through a traffic control server that provides traffic information on a zone in which the vehicle is currently driving. In this case, the route guidance device 1300 may determine traffic congestion levels for each road around the vehicle based on the traffic information provided from the traffic control server. In addition, MR objects having different colors according to the determined traffic congestion levels may be displayed on a digitally twinned three-dimensional map to provide the MR view image.

Alternatively, the route guidance device 1300 may determine a traffic congestion level by itself. In this case, a traffic congestion level on a specific path may be determined according to a difference between a typical expected arrival time (first expected arrival time) required for the vehicle to arrive at a destination when the vehicle drives on the specific path, and an expected arrival time (a second expected arrival time) required for the vehicle to arrive at a destination when the vehicle drives on the specific path.

Meanwhile, the route guidance device 1300 may determine a mode suitable for a current environment based on the driving state of the vehicle. For example, the route guidance device 1300 may determine that an MR mode that provides an MR view image is suitable when the vehicle is in a stationary state. On the other hand, during a driving state in which the vehicle is moving, it may be determined that an MR mode that provides an AR view image is suitable.

In this case, the route guidance device 1300 may determine that the MR mode is suitable when the vehicle is stopped to wait for a signal, and determine that the AR mode is suitable when the vehicle starts driving after waiting for a signal. Accordingly, when the vehicle is stopped to wait for a signal while driving, a view image displayed on the display 251 may be switched from the AR view image to the MR view image. And when the vehicle starts driving after waiting for a signal, the MR view image may be switched back to the AR view image.

Meanwhile, the route guidance device 1300 may determine a mode suitable for a current environment based on the driving speed of the vehicle. For example, when a driving speed of the vehicle is below a reference speed, it may be determined that an AR mode that provides an AR view image is suitable. On the contrary, when a driving speed of the vehicle is above the reference speed, that is, when the vehicle is driving at a reference speed or the vehicle is driving at a higher speed than the reference speed, the route guidance device 1300 may determine that an MR mode that provides an MR view image is suitable.

In this case, the route guidance device 1300 may provide an MR view image displaying different MR objects according to a driving speed of the vehicle. As an example, when the driving speed of the vehicle is above a first speed, an MR view image may be provided in the form of a bird view image looking at an object corresponding to the vehicle at a high altitude. However, when the driving speed of the vehicle is above a second speed higher than the first speed, the route guidance device 1300 may provide an MR view image in the form of a drone view showing a path to be driven by the vehicle in advance, beyond looking at the object corresponding to the vehicle at a high altitude.

Meanwhile, the route guidance device 1300 may determine a mode suitable for a current environment based on the driving environment of the vehicle. In this case, the route guidance device 1300 may determine a mode suitable for the current environment based on objects detected around the vehicle.

As an example, when there is a large vehicle around the vehicle, or when there is a structure such as a building or a billboard larger than a predetermined size within a prede-termined adjacent distance from the vehicle, the route guidance device 1300 may determine that there is a possibility of causing a region obscured by the large vehicle or large-sized structure, that is, a blind spot. Accordingly, the route guidance device 1300 may determine that an MR mode that provides an MR view image is suitable when there is a vehicle or structure having a predetermined size or larger within an adjacent distance from the vehicle.

Alternatively, the route guidance device 1300 may determine that an MR mode that provides an MR view image is suitable when a dangerous region is detected around the vehicle. Here, the dangerous region may be a region previously designated as a region to pay attention to while driving, such as a region under construction or an accident black spot. Alternatively, the dangerous region may be a region designated according to information on a dangerous region provided to a nearby vehicle by a preset server that provides traffic information or road information. The route guidance device 1300 may display warning information on a dangerous region through an AR object or an MR object when the dangerous region is detected around the vehicle while the vehicle is driving.

Meanwhile, when the dangerous region is detected, the route guidance device 1300 may determine that an MR mode that provides an MR view image is suitable. When an MR view image is provided through an MR mode as described above, the route guidance device 1300 may provide information on the dangerous region to the passenger in advance through a preview function that provides path information on a zone in which the vehicle will drive in advance.

Alternatively, when the dangerous region is detected or a collision warning is generated, the route guidance device 1300 may determine either one of an AR mode that provides an AR view image and an MR mode that provides an MR view image as a more suitable mode based on a location at which the warning information is displayed.

As an example, in the case of an AR view image, since an actual image captured by the camera is used, a displayable range of the AR object may be limited to a range within a shooting angle, that is, a viewing angle, of the camera. Therefore, when the warning information is exposed within a region displayed through the AR view image, that is, within a viewing angle range of the camera, for example, from the front, the route guidance device 1300 may determine that an AR view image including an AR object corresponding to the warning information is more suitable for a current environment. Accordingly, the AR mode may be determined as a mode more suitable for a current environment.

However, when the warning information is exposed in a region outside the viewing angle of the camera, that is, in a blind spot such as the rear of the vehicle, the route guidance device 1300 may determine that an MR view image capable of displaying an MR object corresponding to the warning information is more suitable for a current environment. Accordingly, the MR mode may be determined as a mode more suitable for a current environment.

Meanwhile, the route guidance device 1300 may determine a mode suitable for a current environment based on the driving path of the vehicle. For example, when a path on which the vehicle drives is a straight section, the route guidance device 1300 may determine that an AR mode that displays an AR view image is a mode suitable for a current environment.

On the other hand, when the driving path includes a curve with a curvature above a preset curvature, or a tunnel with a length above a preset length, or is deviated from a drivable path, the route guidance device 1300 may determine that an MR mode that displays an MR view image is a more suitable mode. Alternatively, when the path navigating information to be provided is a junction, an exit, or a destination on the path, that is, when the vehicle approaches within a preset distance from the junction or exit or destination on the path, the route guidance device 1300 may determine that the MR mode is a more suitable mode.

Furthermore, the route guidance device 1300 may determine a mode suitable for a current environment according to whether a path on which the vehicle drives is a path preferred by the passenger. As an example, the route guidance device 1300 may determine that an AR mode that displays an AR view image or a 2D map mode that displays a two-dimensional map is a mode suitable for a current environment when a path on which the vehicle currently drives is a path preferred by the passenger. On the other hand, the route guidance device 1300 may determine that an MR mode that displays an MR view image is a mode suitable for a current environment when the path on which the vehicle drives is a path that is not preferred by the passenger.

Here, whether the path is preferred by the passenger may be determined as a result of learning about a path on which the vehicle drives. That is, in the case of a path driven more than a preset number of times among a plurality of paths leading to a currently set destination, the path may be classified as a path preferred by the passenger. On the contrary, a path that is not driven more than a preset number of times may be classified as a path not preferred by the passenger.

Meanwhile, in the step S1104, when any one mode suitable for the current environment is detected according to the collected information, the route guidance device 1300 may determine whether the detected mode is different from a mode in which path navigating information is currently provided (S1106).

Furthermore, as a result of the determination, when the mode detected in the step S1104 is the same as the mode in which the path navigating information is currently provided, the route guidance device 1300 may proceed to step S1100 again, and provide path navigating information according to a current mode, that is, the first mode, without changing the mode. Then, the route guidance device 1300 may proceed again to steps S1102 and S1104 to collect information related to a mode switching condition, and detect a mode more suitable for the current environment according to the collected information.

Meanwhile, as a result of the determination, when the mode detected in the step S1104 is different from the mode in which the path navigating information is currently provided, the route guidance device 1300 may detect parameters for mode switching (S1108).

As the parameter, the route guidance device 1300 may detect a field of view (FOV) of a first view image according to a first mode. Furthermore, a point of attention of the FOV may be detected from the detected FOV. Here, the point of attention of the FOV may be a point corresponding to the center of a viewing angle of the first view image.

In addition, the route guidance device 1300 may detect a vertical reference line and a horizontal reference line based on a FOV point of attention detected from the first view image. Furthermore, a second view image according to a second mode having the same FOV as the first view image according to the first mode may be generated based on the FOV, the FOV point of attention, and the vertical and horizontal reference lines. Furthermore, the first mode may be switched to the second mode to generate a view image displayed on the display 251 from the first view image to the second view image (S1110). Furthermore, the route guidance device 1300 may provide path navigating information through the generated second view image (S1112).

Here, the route guidance device 1300 may provide path navigating information in various ways through the generated second view image. As an example, the route guidance device 1300 may be switched from a first mode in which a first view image is displayed to a second mode in which a second view image is displayed. Accordingly, a view image displayed on the display screen 1350 may be switched from a first view image to a second view image according to the mode change.

Meanwhile, when the mode switching is set to automatic switching, the route guidance device 1300 may automatically switch the mode. However, when the mode switching is set to manual switching, the route guidance device 1300 may provide information on a more suitable mode detected in the step S1104 to the passenger, and allow the mode to be switched according to the passenger's selection.

In this case, an input of the passenger for selecting the switching of the mode may be carried out in various ways. For example, the mode switching may be carried out through a touch input applied to the display 251 or a voice input, or the passenger's input to a preset switch button.

Alternatively, the route guidance device 1300 may switch the mode according to a request of the passenger regardless of the mode switching condition. As an example, when the passenger desires path navigating information corresponding to a viewing angle wider than that provided through an AR view image, he or she may request the route guidance device 1300 to switch to an MR view image.

In this case, the route guidance device 1300 may switch the mode in a preset order according to a swipe input applied in a top-down direction or a left-right direction of the display 251. That is, an MR mode may be switched to an AR mode, or the switched AR mode may be switched back to the MR mode according to a length or number of times the swipe input is applied in the top-down direction or the left-right direction. Alternatively, according to the length or number of times the swipe input is applied, the switched AR mode may be switched to a 2D map mode that provides two-dimensional map information, or the 2D map mode may be switched to the AR mode.

FIG. 12, which is an example in which the route guidance device 1300 according to an embodiment of the present disclosure generates a second view image according to parameters detected from a first view image in the step S1110 of FIG. 11, illustrates an example in which the first view image is an AR view image and the second view image is an MR view image.

Referring to FIG. 12, the route guidance device 1300 may detect a FOV of an AR view image provided as shown in (a) of FIG. 12.

Furthermore, the route guidance device 1300 may detect a point of attention 1400 of a FOV from the FOV of the AR view image provided as shown in (a) of FIG. 12. In addition, from a current location of the vehicle on a digitally twinned three-dimensional map, an MR view image oriented toward the point of attention 1400 may be acquired.

To this end, the route guidance device 1300 may detect a vertical reference line 1410 and a horizontal reference line 1420 based on the detected FOV point of attention 1400. Furthermore, the point of attention of the acquired MR view image may be allowed to match the detected vertical reference line 1410 and the horizontal reference line 1420. That is, as shown in (b) of FIG. 12, the route guidance device 1300 may match the point of attention of the MR view image on the horizontal reference line 1420 detected from the point of attention 1400 of the AR view image. Furthermore, as shown in (c) of FIG. 12, the point of attention of the MR view image may be allowed to match the vertical reference line 1410 detected from the point of attention 1400 of the AR view image. That is, the point of attention of the MR view image may be allowed to match a point where the horizontal reference line 1420 and the vertical reference line 1410 of the AR view image intersect.

In addition, the route guidance device 1300 may extract a region of the MR view image corresponding to the FOV of the AR view image. Here, the FOV, which is a viewing angle of the AR view image, may determine a size of an image displayed through the view image. That is, the route guidance device 1300 may generate an MR view image corresponding to a FOV size of the AR view image from the MR view image matching the FOV point of attention of the AR view image.

Accordingly, a second view image having the same FOV and the same location of the FOV point of attention as those of the first view image may be generated. Therefore, when a view image displayed on the display 251 is switched, the route guidance device 1300 according to an embodiment of the present disclosure may perform switching between modes through the view image having the same FOV and the same location of the point of attention, thereby performing seamless switching of the view image during mode switching.

On the other hand, in FIG. 12 described above, assuming that the first view image is an AR view image, an example in which seamless switching between modes is performed through an MR view image having the same FOV and the same FOV point of attention as those of as the AR view image has been described. However, this may of course be applied even when the first view image is an MR view image and the second view image is an AR view image. In this case, due to the characteristics of an MR view image (e.g., bird view image) capable of displaying a region other than a viewing angle displayed through an AR view image, a process of displaying the MR view image according to an image for generating the AR view image may be preceded to perform the seamless view image switching.

In this case, the route guidance device 1300 may first detect a point of attention of a FOV from the FOV of an image acquired from the camera to perform switching from the MR view image to the AR view image. In addition, from a current location of the vehicle on a digitally twinned three-dimensional map, an image of a region oriented toward the point of attention may be acquired.

In addition, a vertical reference line and a horizontal reference line may be detected based on the FOV point of attention of the image acquired from the camera. In addition, an image of a region in which the point of attention is allowed to match the detected vertical reference line and the horizontal reference line may be acquired. In addition, from the acquired image, a region having the same size as the FOV of the image acquired from the camera may be extracted and displayed on the display 251 as an MR view image. That is, an MR view image having the same FOV and the same location of the FOV point of attention as those of the image acquired from the camera may be displayed on the display 251. At the same time, the route guidance device 1300 may generate an AR view image by adding AR objects to the image acquired from the camera.

When the AR view image is generated, the route guidance device 1300 may switch the MR mode to the AR mode. Accordingly, the display 251 may switch from a state in which the MR view image is displayed to a state in which the AR view image is displayed. In this case, for the MR view image and the AR view image, which are images having the same FOV and the same location of the FOV point of attention as described above, seamless switching between view images may be carried out when the mode is switched.

Therefore, when the route guidance device 1300 operates in an AR mode in which an AR view image 1500 as shown in (a) of FIG. 13 is displayed, the route guidance device 1300 may generate an MR view image 1510 corresponding to the AR view image 1500 as shown in (b) of FIG. 13 based on whether a preset mode switching condition is satisfied. Here, an MR view image corresponding to the AR view image may be a view image having the same location of the FOV point of attention and the same size of the image region according to the FOV as those of the AR view image.

In this case, the AR view image 1500 may be a view image including an AR object 1501 corresponding to the recognized lane and an AR object 1502 indicating a future driving direction for driving to a destination. Furthermore, the MR view image 1510 may be a view image including path information 1511 in which the driving path of the vehicle is displayed as an MR object on a digitally twined three-dimensional map.

When the mode switching condition is satisfied, the route guidance device 1300 may switch the operation mode from an AR mode to an MR mode to switch a view image displayed on the display 251. Accordingly, a state in which the AR view image 1500 is displayed as shown in (a) of FIG. 13 may be switched to a state in which the MR view image 1510 is displayed as shown in (b) of FIG. 13.

Alternatively, on the contrary, when the route guidance device 1300 operates in an MR mode in which the MR view image 1510 is displayed, the route guidance device 1300 may generate the MR view image 1510 corresponding to an actual image acquired through a camera, as shown in (b) of FIG. 13, based on whether a preset mode switching condition is satisfied. Here, the MR view image 1510 corresponding to the actual image may be a view image having the same location of the FOV point of attention and the same size of an image region according to the FOV as those of the actual image.

Furthermore, when the mode switching condition is satisfied, the route guidance device 1300 may switch the operation mode from an MR mode to an AR mode to switch a view image displayed on the display 251. Therefore, a state in which the MR view image 1510 is displayed as shown in (b) of FIG. 13 may be switched to a state in which the AR view image 1500 is displayed as shown in (a) of FIG. 13.

Meanwhile, in the foregoing description, switching between an AR mode and an MR mode has been mainly described, but switching to an operation mode in which another view image other than the AR mode and the MR mode is displayed may of course be also carried out. As an example, the route guidance device 1300 may determine that a mode that displays a two-dimensional map is a more suitable mode when a zone in which the vehicle is driving is a suburban zone in which the digitally twinned three-dimensional map has a low precision. In this case, the route guidance device 1300 may provide a view image including the two-dimensional map, and may of course provide path navigating information through the two-dimensional map.

Furthermore, the route guidance device 1300 may determine a mode suitable for a current environment based on a combination of information related to the foregoing mode switching condition. For example, when the zone in which the vehicle drives is a highway, the route guidance device 1300 may provide different view images through operation mode switching according to a driving speed of the vehicle. That is, in a case where the zone in which the vehicle drives is a highway, an MR view image is displayed (MR mode) when the speed of the vehicle is below a first speed, an AR view image is displayed (AR mode) when the speed of the vehicle exceeds the first speed but is below a second speed (medium speed), and the mode may be switched to a 2D map mode that displays a two-dimensional map image when the speed of the vehicle exceeds the second speed (high speed).

Meanwhile, when the current operation mode is an AR operation mode that displays an AR view image, the route guidance device 1300 may perform mode switching to an MR mode based on the accuracy of the AR view image. To this end, the route guidance device 1300 may calculate an error rate between the AR view image and an actual image acquired through the camera, and may switch modes according to the calculated error rate.

Figure 14:
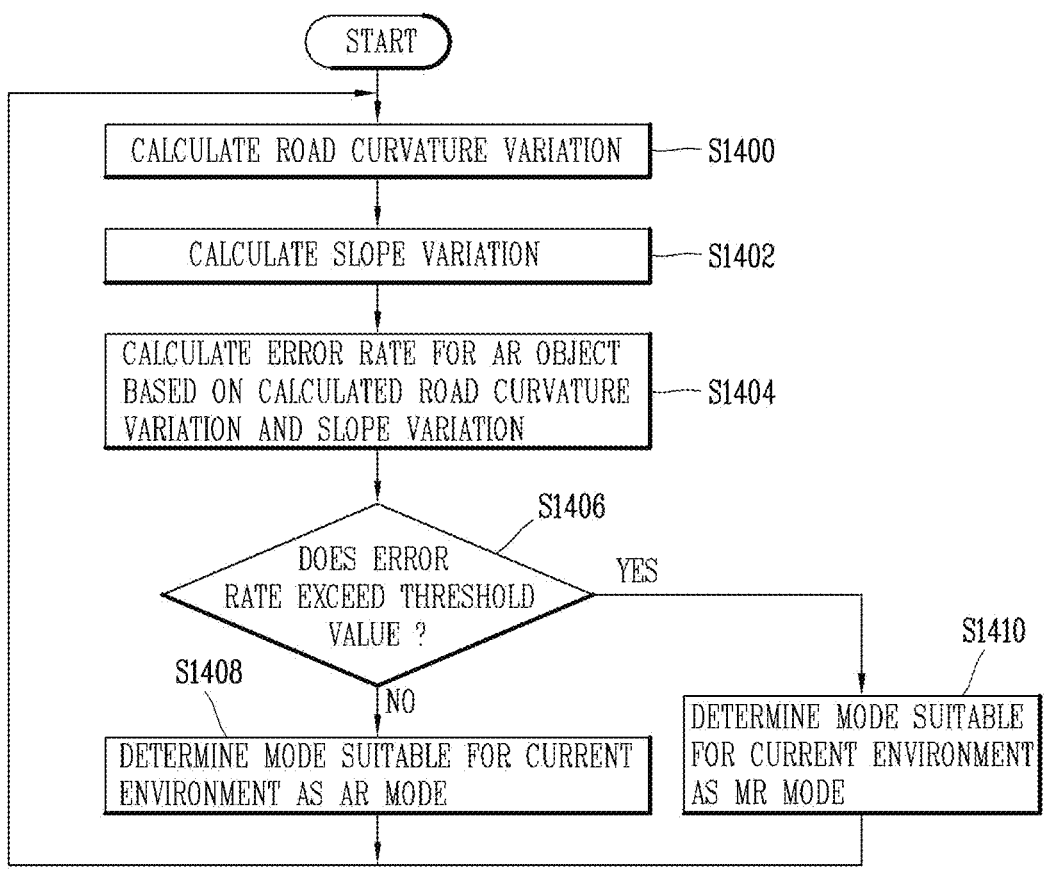
FIG. 14 is a flowchart illustrating an operation process of switching an operation mode according to an error rate of an AR view image in the route guidance device according to an embodiment of the present disclosure.

FIG. 14 is a flowchart illustrating an operation process of switching an operation mode according to an error rate of an AR view image by the route guidance device 1300 according to such an embodiment of the present disclosure.

Referring to FIG. 14, the route guidance device 1300 according to an embodiment of the present disclosure may first calculate a curvature variation of a road on which the vehicle drives and a slope variation of the road (S1400 and S1402).

Here, the road curvature variation may be calculated according to a detection value of a gyro sensor capable of sensing an inclination of the vehicle and a detection result of a lane recognizer capable of detecting a lane of a road on which the vehicle drives. That is, the curvature variation of the road may be calculated based on an inclination of the vehicle and a degree of curvature of the vehicle detected through the lane recognizer.

Furthermore, a slope variation of the road may be calculated according to a road shape detected through a digitally twinned three-dimensional map for the road on which the vehicle is currently driving, or a vertical profile and high-definition (HD) map collected through a preset server that provides road information.

Then, the route guidance device 1300 may calculate an error rate (AR fitting error rate) between an actual image acquired through the camera and an AR object displayed in the actual image based on the curvature variation and slope variation of the road calculated in the steps S1400 and S1402 (S1404). That is, the route guidance device 1300 may calculate an error rate between an AR object generated based on the road curvature variation and the slope variation, and the actual image expressed in two dimensions.

As an example, in order to calculate the error rate, the route guidance device 1300 may compare an object (e.g., a lane shape) in an actual image corresponding to an AR object and a shape of the AR object corresponding to the object in units of pixels. Furthermore, as a result of the shape comparison, a ratio of a number of pixels that does not match to a number of pixels that matches an actual object or a ratio of a number of pixels that does not match based on a total number of pixels of an image may be calculated as the error rate.

In addition, the route guidance device 1300 may determine whether the error rate calculated in the step S1404 exceeds a preset error rate threshold value (S1406). In addition, when the determined error rate does not exceed the error rate threshold value, a mode suitable for a current environment may be determined as an AR mode (S1408).

In this case, when a first mode, that is, a mode that provides current path navigating information, is an MR mode, switching to an AR mode may be carried out. In addition, a view image displayed on the display 251 may be switched from an MR view image to an AR view image. However, when the first mode is an AR mode, the route guidance device 1300 may provide path navigating information through an AR view image according to a current operation mode without changing the mode.

However, as a result of the determination in the step S1408, when the error rate exceeds the error rate threshold value, the route guidance device 1300 may determine a mode suitable for the current environment as the MR mode.

In this case, when a first mode, that is, a mode that provides current path navigating information, is an AR mode, switching to an MR mode may be carried out. In addition, a view image displayed on the display 251 may be switched from an AR view image to an MR view image. However, when the first mode is an MR mode, the route guidance device 1300 may provide path navigating information through an MR view image according to a current operation mode without changing the mode.

Meanwhile, according to the foregoing description, it has been mentioned that the route guidance device 1300 according to an embodiment of the present disclosure may provide path navigating information based on a second mode through a second view image in the step S1112 of FIG. 11. Hereinafter, FIGS. 15A and 15B are flowcharts illustrating an operation process of providing path information through a second view image when a view image displayed on the display 251 is switched from a first view image to the second view image through mode switching.

First, FIG. 15A is a flowchart illustrating an operation process of providing path navigating information through an AR view image according to an AR mode when an MR mode is switched to the AR mode, that is, when a first mode is the MR mode and a second mode is the AR mode.

Referring to FIG. 15A, the route guidance device 1300 may first update camera calibration for the AR mode before switching to the AR mode (S1500).

Here, the camera calibration may be a process of correcting parameters for a conversion relationship between three-dimensional spatial coordinates acquired through an image and two-dimensional image coordinates. That is, in the step S1500, the route guidance device 1300 may perform AR camera calibration again to correct coordinates on a two-dimensional image corresponding to coordinates on a three-dimensional space of an object recognized from an actual image that has actually acquired through the camera.

Through such a camera calibration process, accurate coordinates of a two-dimensional image corresponding to an object recognized from an actual image may be acquired. In addition, the route guidance device 1300 may display an AR object based on the coordinates corrected through the camera calibration process, thereby displaying the AR object that more accurately matches an object included in an actual image. A process of correcting coordinates on a two-dimensional space corresponding to coordinates in a three-dimensional space in order to display an AR object as described above may be referred to as AR camera calibration.

Here, the AR camera calibration process of the step S1500 may include detecting a FOV point of attention from an actual image actually acquired through the camera, and converting coordinates on a three-dimensional space into coordinates on a two-dimensional space based on a frustum formed based on the detected FOV point of attention.

Meanwhile, when the AR camera calibration process of the step S1500 is completed, the route guidance device 1300 may switch an MR view image displayed on the display 251 to an AR view image having the same ratio and size through switching from the MR mode to the AR mode (S1502). In this case, the route guidance device 1300 may gradually switch the MR view image to the AR view image for seamless switching.

Here, the AR view image having the same ratio and size may be a view image having the same FOV as the MR view image. Furthermore, an AR view image and an MR view image having the same FOV may be view images having the same location of the FOV point of attention. To this end, the route guidance device 1300, prior to switching to the AR mode, for a more seamless view image switching, may display an MR view image having a FOV point of attention at the same location as the FOV point of attention of an image acquired through the camera. Accordingly, the route guidance device 1300 may change a view image displayed on the display 251 to display an MR view image for a front of the vehicle while the MR view image such as a bird view image or a side view image is displayed.

Furthermore, in the step S1502, when the view image is switched to an AR view image having the same ratio and size as the MR view image displayed on the display 251, the route guidance device 1300 may provide path navigating information based on the AR mode (S1504). That is, the route guidance device 1300 may recognize objects (e.g., lanes, buildings, etc.) included in the actually acquired image, and display a graphic object (AR object) corresponding to the recognized object in at least part of a coordinate region in which the recognized object is displayed. That is, path navigating information may be provided through the AR view image provided through the AR mode.

On the other hand, FIG. 15B is a flowchart illustrating an operation process of providing path navigating information through an MR view image according to an MR mode when an AR mode is switched to the MR mode, that is, when a first mode is the AR mode and a second mode is the MR mode.

Referring to FIG. 15B, when switching from an AR mode to an MR mode is started, the route guidance device 1300 may change MR camera calibration according to a result of AR camera calibration that has been finally performed (S1550). That is, the same coordinate conversion process as a coordinate conversion process on a two-dimensional image corresponding to coordinates on a three-dimensional space of an object recognized from an actual image according to a result of the AR camera calibration carried out in the AR mode may be applied to the MR camera calibration.

Here, the MR camera calibration may be carried out to display an MR view image according to a point of attention of the camera on the display based on a frustum-shaped visual field formed according to the point of attention of the camera when the camera of the vehicle is oriented toward the front of the vehicle on a digitally twinned three-dimensional map. That is, the MR camera calibration may be a process of converting coordinates on the three-dimensional space captured by the camera of the vehicle on a digitally twinned three-dimensional map into coordinates on a two-dimensional space, coordinates on an MR view image. That is, when the MR camera calibration is changed according to a result of the AR camera calibration that has been finally performed in the step S1550, an image on a digitally twinned three-dimensional map oriented toward the same FOV point of attention as a FOV point of attention of an AR view image provided in an AR mode may be generated.

Then, the route guidance device 1300 may switch to an MR view image having the same ratio as the AR view image (S1552).

As an example, the route guidance device 1300 may extract a region on an MR view image corresponding to the same size as a FOV of the AR view image 1500. In this case, the route guidance device 1300 may extract an image region having the same location of a FOV point of attention as a FOV point of attention of the AR view image. Accordingly, an MR view image having the same size and ratio, and the same FOV point of attention as those of the AR view image may be extracted. That is, the MR view image 1510 corresponding to the AR view image 1500 may be generated.

In this case, since the AR view image and the MR view image have the same FOV, they may be different types of view images corresponding to the same visible distance. That is, when a visible distance displayed through an AR view image is 50 m, an MR view image having the same visible distance of 50 m may be generated.

Furthermore, the route guidance device 1300 may switch the AR view image displayed on the display 251 into the generated MR view image through switching from the AR mode to the MR mode.

Meanwhile, the MR view image, which is a view image on a digitally twinned three-dimensional map, may have a longer visible distance than the AR view image. Therefore, the MR view image may be a view image corresponding to a longer visible distance than a default MR view image. Therefore, the route guidance device 1300 may switch an MR view image having the same short visible distance as in the AR mode to an MR view image having a basic visible distance according to the MR mode (S1554). In this case, the route guidance device 1300 may gradually switch the MR view image for seamless switching.

In addition, the route guidance device 1300 may provide path navigating information based on the MR mode (S1556). In this case, the route guidance device 1300 may provide various path navigating information through virtual objects (MR objects) displayed on a digitally twined three-dimensional map. As an example, the route guidance device 1300 may provide a virtual image looking at the vehicle in a bird-view or side-view mode as path navigating information, or provide information on a POI for a path through which the vehicle has already passed or a path for the vehicle to drive in the future as path navigating information.

Meanwhile, in the above description, a case in which the route guidance device 1300 according to an embodiment of the present disclosure controls the display 251 to display one type of AR view image or MR view image on the display 251 has been described.

However, the route guidance device 1300 may of course also control the display 251 to display the AR view image and the MR view image together on a single display screen.

In this case, the route guidance device 1300 may divide the display screen, that is, a main screen region, to display an AR view image and an MR view image in the divided regions, respectively. Alternatively, the route guidance device 1300 may allow a partial region of a main screen region in which any one view image is displayed to overlap a region in which another view image is displayed to display the AR view image and the MR view image together on a single display screen.

The route guidance device 1300 may divide the display screen based on information collected in relation to the mode switching condition to determine whether to display the AR view image and the MR view image together, or to display a view in which the AR view image and the MR view image are mixed. Alternatively, it may be determined whether to allow the MR view image to overlap part of the AR view image, or conversely, to allow the AR view image to overlap part of the MR view image.

In this case, a condition in which the AR view image and the MR view image are displayed together (divided view image display) through a divided display region, a condition in which a view image mixed with the AR view image and the MR view image is displayed (mixed view image display), and a condition in which a view image that allows part of any one type of view image to overlap another type of view image is displayed (overlapped view image display) may be different from one another.

Figure 17:
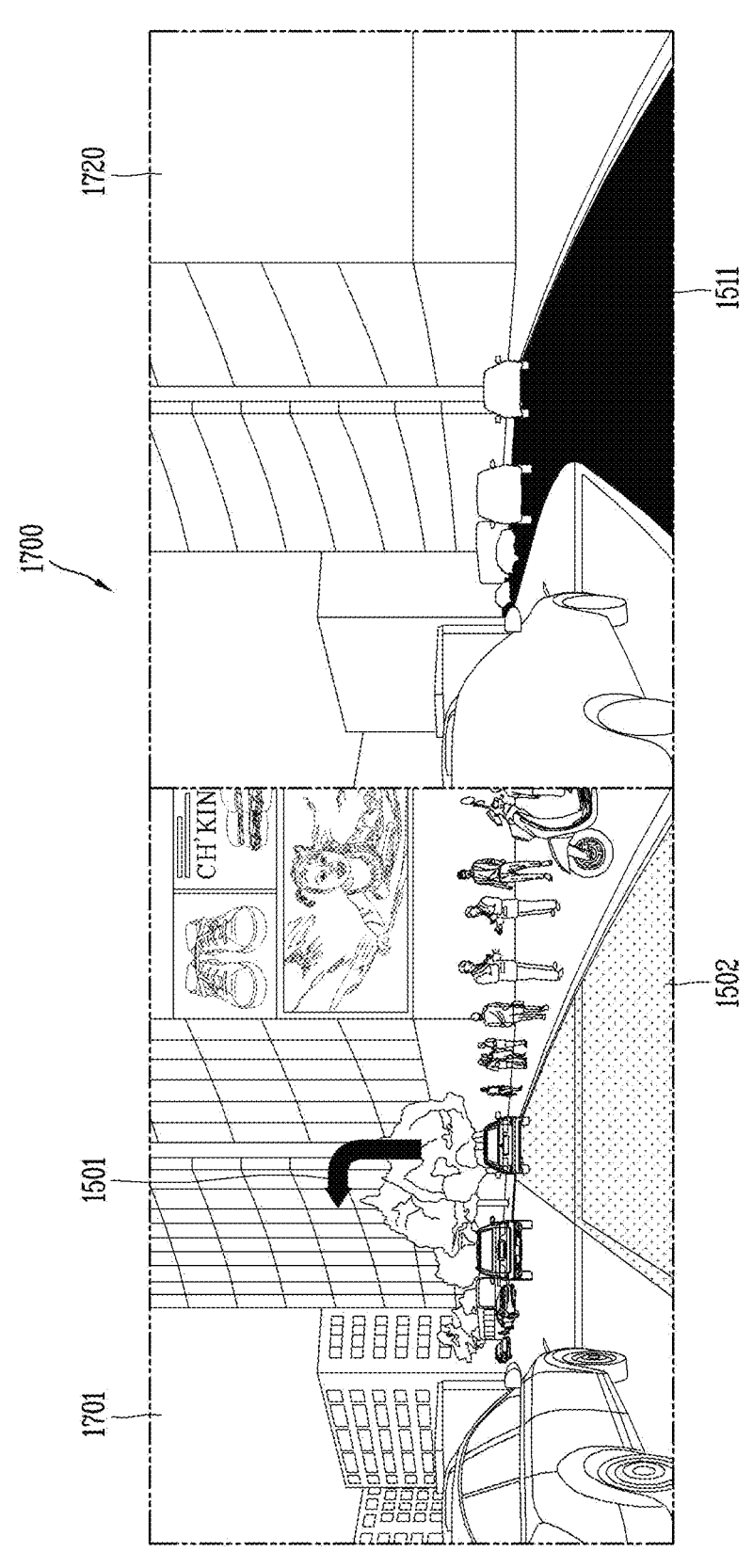
FIG. 17 illustrates an example of a display screen on which an AR view image and an MR view image are respectively displayed through the operation process of FIG. 16.

First, FIG. 16 is a flowchart illustrating an operation process of dividing a display region to simultaneously display an AR view image and an MR view image by the route guidance device 1300 according to such an embodiment of the present disclosure. Furthermore, FIG. 17 illustrates an example of a display screen on which an AR view image and an MR view image are respectively displayed through the operation process of FIG. 16.

The route guidance device 1300 may detect whether a divided view image display condition in which an AR view image and an MR view image are displayed together through a divided display region is satisfied while the vehicle is driving. In this case, the divided view image display condition may be a case in which the vehicle is deviated from a preset path.

When the divided view image display condition is satisfied as described above, the route guidance device 1300 may first divide the display region to display view images (S1600). Here, the route guidance device 1300 may divide the display region into a first region 1710 and a second region 1720, and in this case, the first region 1710 and the second region 1720 may be assigned to an AR view image and an MR view image, respectively.

When the display region is divided in the step S1600, the route guidance device 1300 may first display the AR view image in the first region 1710. Furthermore, path navigating information according to the AR mode may be provided (S1602). In this case, as deviated from the preset path, the route guidance device 1300 may control the display 251 to display an AR view image, including an AR object 1501 indicating a turn direction to a changed path set from a current location of the vehicle to a destination, and an AR object 1502 indicating a recognized lane, on the first region 1710.

Meanwhile, the route guidance device 1300 may change the MR camera calibration according to the AR camera calibration that has been finally performed (S1604). In this case, as the camera calibration result is shared, an image of a digitally twinned three-dimensional map oriented toward the same FOV point of attention as that of the AR view image provided in the AR mode may be generated.

Furthermore, the route guidance device 1300 may extract an image having the same FOV as that of the AR view image from the image of the digitally twinned three-dimensional map generated for sharing the calibration. Accordingly, an MR view image corresponding to the AR view image having the same size and ratio and the same point of attention as those of the AR view image may be generated (S1606).

Then, the route guidance device 1300 may display the generated MR view image on a second region in the divided display regions (S1608). Furthermore, path navigating information according to the MR mode may be provided (S1610).

In this case, as deviated from the preset path, the route guidance device 1300 may control the display 251 to display an MR view image, including an MR object 1511 indicating an advancing direction of the changed path set from a current location of the vehicle to a destination, on the second region 1730.

Meanwhile, in FIG. 17, an example of dividing a display region into two identical regions, and displaying view images that provide different path navigating information in the divided regions, respectively, has been described. However, the route guidance device 1300 may of course divide the display region based on a specific condition, and provide different types of view images in the divided regions, respectively.

As an example, an image acquired from the vehicle may be sharper and clearer as a distance from the vehicle decreases. Furthermore, a size of an object displayed on the image may be relatively large. Accordingly, an object included in the image may be recognized more easily, and thus the object may be recognized more accurately. That is, as a distance from the vehicle decreases, an AR view image including an AR object that accurately matches an actual object may be displayed. On the contrary, when a distance from the vehicle increases, a size of the object may decrease due to a separation distance and a number of displayed objects may increase, thereby making it difficult to accurately recognize the object. Accordingly, the accuracy of an AR object displayed on the AR view image may be reduced.

On the other hand, in the case of an MR view image, as a virtual screen displayed using a digitally twinned three-dimensional map, and an accurate MR object may be displayed regardless of a visible distance from the vehicle. However, in the case of the MR view image, path navigating information may be displayed through a virtual screen, and there may be a difference from a real world, and accordingly, the passenger may feel a sense of separation.

Therefore, the route guidance device 1300 according to an embodiment of the present disclosure may be switched to a display screen on which both the AR view image and the MR view image are displayed when it is required to secure both a field of view according to a long visible distance and a near field of view. For example, when the number of objects adjacent around the vehicle is above a preset number, and it is difficult to display an accurate AR object for path information due to a traffic congestion and an environment around the vehicle, the route guidance device 1300 may determine that it is required to secure a near field of view through the AR view image so as to display objects adjacent around the vehicle and to secure a far field of view through the MR view image so as to display clear path information.

In this case, the route guidance device 1300 may exclusively separate a display region in which a first view image is displayed and a region in which a second view image having a different type from the first view image is displayed, thereby controlling the display 251 to display a display screen in which the AR view image and the MR view image displayed in regions separated from each other, respectively, are mixed.

Figure 18:
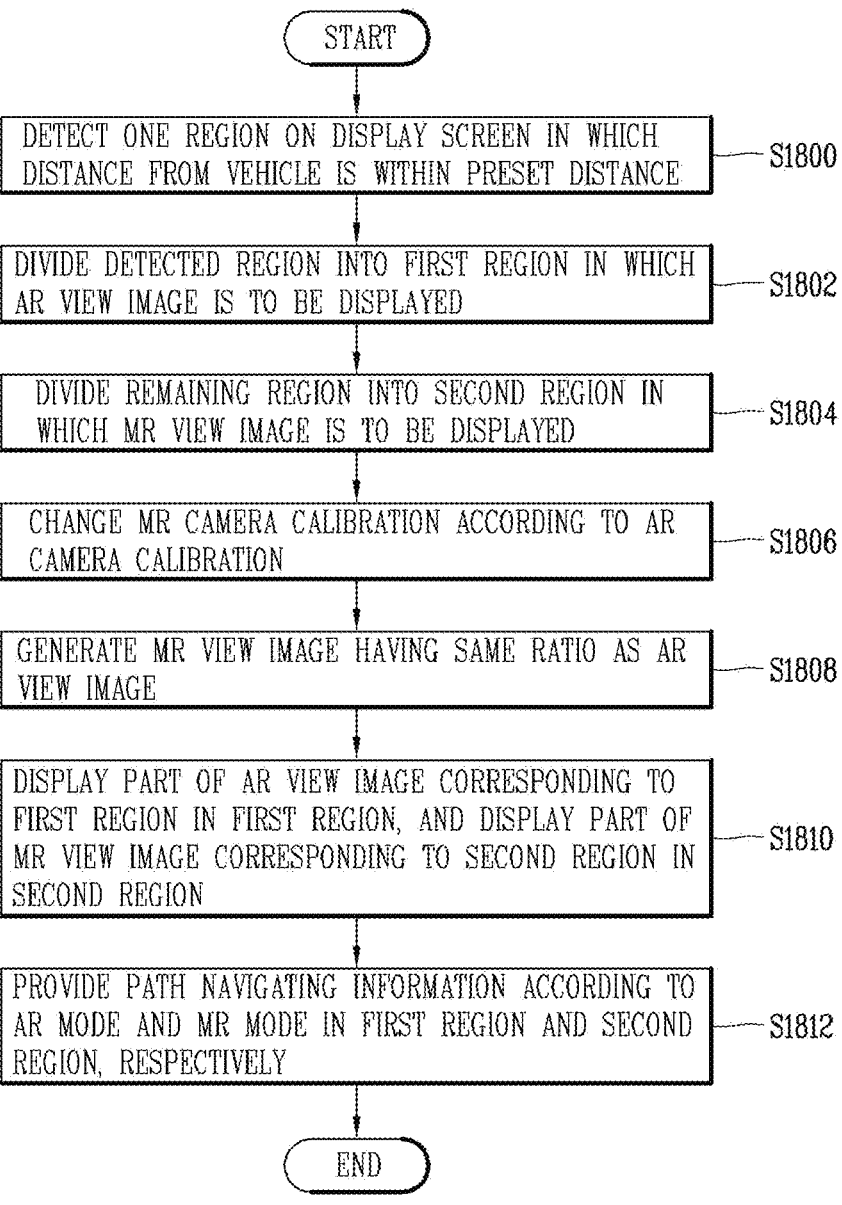
FIG. 18 is a flowchart illustrating an operation process of generating a display screen in which an AR view image and an MR view image are mixed through dividing a display region.

FIG. 18 is a flowchart illustrating an operation process of providing path navigating information through a display screen in which the first view image and the second view image are mixed as described above. Furthermore, FIG. 19 illustrates an example of a display screen in which an AR view image and an MR view image are displayed in respective regions divided from each other through the operation process of FIG. 18.

Meanwhile, a condition for dividing the display region may be set in various ways. As an example, the route guidance device 1300 may divide a display screen into a first region and a second region based on a separation distance from the vehicle. In this case, one region of the display screen corresponding to a region (short-distance region) within a predetermine distance (e.g., 50 m) from the vehicle may be classified into a first region, and one region of the display screen corresponding to a region (long-distance region) exceeding the predetermined distance from the vehicle may be classified into a second region.

Hereinafter, for convenience of description, it will be assumed that the display region is divided into a first region and a second region based on a separation distance from the route guidance device 1300 in the vehicle. However, the present disclosure may of course not be limited thereto, and accordingly, the route guidance device 1300 may divide the display region into the first region and the second region based on conditions other than the distance.

Referring to FIG. 18, the route guidance device 1300 may first detect a region in which a distance from the vehicle is within a preset distance from an image displayed through the display screen (S1800). In this case, the route guidance device 1300 may detect one region on a display screen corresponding to a region in which a distance from the vehicle is within a preset distance, through a pixel depth value of an image acquired from the camera.

Then, the route guidance device 1300 may divide the one region detected in the step S1800 into a first region in which the AR view image is to be displayed (S1802). Furthermore, the remaining region of the display screen, that is, one region on the display screen corresponding to a region in which a distance from the vehicle exceeds a preset distance may be divided into a second region in which the MR view image is to be displayed (S1804).

In addition, the route guidance device 1300 may change the MR camera calibration according to the AR camera calibration (S1806). In this case, as the camera calibration result is shared, an image of a digitally twinned three-dimensional map oriented toward the same FOV point of attention as that of the AR view image provided in the AR mode may be generated.

Furthermore, the route guidance device 1300 may extract an image having the same FOV as that of the AR view image from the image of the digitally twinned three-dimensional map generated for sharing the calibration. Accordingly, an MR view image corresponding to the AR view image having the same size and ratio and the same point of attention as those of the AR view image may be generated (S1808).

Then, the route guidance device 1300 may displays part of the AR view image corresponding to the first region in the AR view image on the display screen, and display part of the MR view image corresponding to the second region in the MR view image on the display screen (S1810). Accordingly, the AR view image including an AR object may be displayed in the first region, and the MR view image including an MR object may be displayed in the second region. Furthermore, the route guidance device 1300 may provide path navigating information according to a mode corresponding to each region for each region (S1812). That is, the route guidance device 1300 may provide different types of path navigating information according to different operation modes to the first and second regions exclusively separated from each other, respectively.

Referring to FIG. 19, (a) of FIG. 19 illustrates an example in which an AR view image is displayed on a display screen. In this case, the displayed view image may be a view image including the AR object 1501 corresponding to the recognized lane and the AR object 1502 corresponding to a turn direction of a path for the vehicle to drive.

On the other hand, in an environment as shown in (a) of FIG. 19, since a large number of people and other objects located in the vicinity of the vehicle are detected, the route guidance device 1300 may determine that the provision of an AR view image capable of more accurately providing information on objects located in a short distance is required. On the contrary, since a distance at which a lane is recognized is very short due to vehicles driving ahead, the route guidance device 1300 may determine that the provision of an MR view image capable of providing path information corresponding to a longer visible distance is required.

In this case, the route guidance device 1300 according to an embodiment of the present disclosure may detect a region in which a separation distance from the vehicle is within a preset distance from an image acquired from the camera. In this case, when the preset distance is set to 50 m, the route guidance device 1300 may divide an image acquired from the camera into a region where a separation distance from the vehicle is within 50 m (first region 1950), and a region where the separation distance exceeds 50 m (second region 1900).

Furthermore, the route guidance device 1300 may generate an MR view image corresponding to an AR view image according to a process described above with reference to FIG. 18. In addition, the route guidance device 1300 may display an AR view image including an AR object in a first region where a separation distance from the vehicle is within 50 m, and display an MR view image including an MR object in a second region where the separation distance from the vehicle exceeds 50 m on the display screen. Accordingly, as shown in FIG. 19, an image actually acquired by the camera and an AR object 1951 corresponding to a lane ahead around the vehicle recognized from the image may be displayed in the first region 1950. On the contrary, an image on a digitally twinned three-dimensional map and an MR object 1901 indicating a path for the vehicle to drive on the digitally twinned three-dimensional map may be displayed in the second region 1900.

That is, the display region may be exclusively divided into regions that provide path navigating information in different ways, and path navigating information of different methods may be provided according to an operation mode corresponding to each of the divided regions.

Meanwhile, when the display region is divided to display view images provided in different operation modes that are mixed in this manner, the view images may be view images shared by camera calibration as described above. Furthermore, the view images may be view images having the same FOV point of attention. Therefore, coordinates on a three-dimensional space may be converted into a two-dimensional image according to a visual field formed based on the same FOV point of attention, and thus an object displayed in respective view image may be moved seamlessly to a region where a different view image is displayed.

That is, when an object displayed in a region where path navigating information is provided according to an AR mode moves to a region where path navigating information is provided according to an MR mode, an object displayed in the form of an actual image may be displayed as a virtual object displayed according to modeling. On the contrary, when an object displayed in a region where path navigating information is provided according to an MR mode moves to a region where path navigating information is provided according to an AR mode, the virtual object displayed according to modeling may be displayed in the form of an actual image.

Meanwhile, when displaying path information using MR an object on a mixed screen as described above, the route guidance device 1300 may display the path information using an MR object having a shape of being bent from the ground to the sky.

Meanwhile, the route guidance device 1300 according to an embodiment of the present disclosure may overlap the second view image on at least part of a region where the first view image is displayed. For example, when it is necessary to increase the visibility of POI information, the route guidance device 1300 may overlap the second view image on at least part of a region where the first view image is displayed according to a state of a road on which the vehicle drives.

In this case, the route guidance device may determine whether it is required to improve the visibility of the POI information displayed based on an importance level of the POI information determined in advance according to the user's preference or the like. In addition, when it is required to improve the visibility of the POI information, the MR view image may be allowed to overlap at least part of the AR view image to increase the visibility of the POI information.

Alternatively, when branch points of a path on which the vehicle drives are adjacent to each other, the route guidance device 1300 may overlap the MR view image on at least part of the AR view image in order to more clearly display the branch points, thereby allowing the driver to more clearly recognize the branch points. Alternatively, the route guidance device 1300 may display a display screen in which the AR view image overlaps with part of the MR view image in order to provide the passenger with an environment of a blind spot out of a viewing angle acquired from the camera of the vehicle.

Figure 20:
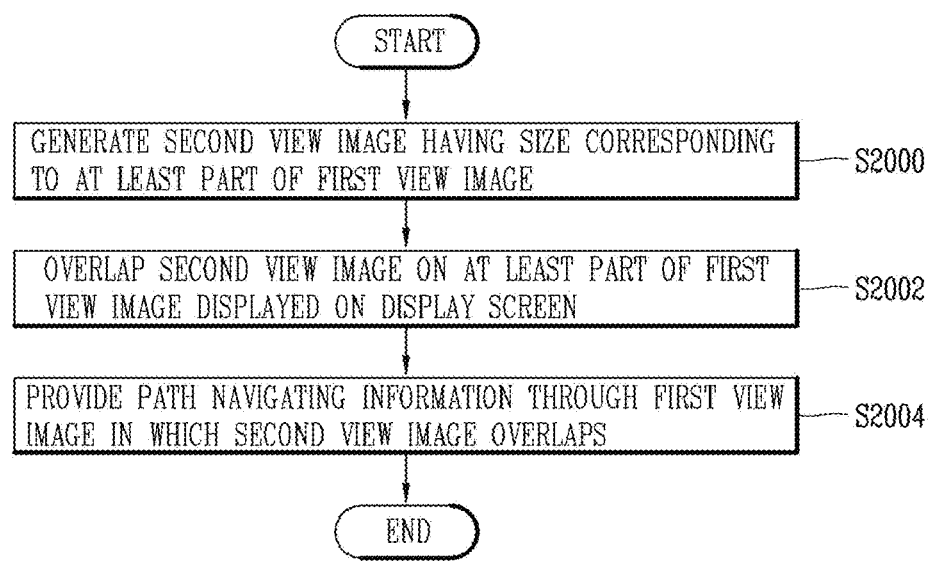
FIG. 20 is a flowchart illustrating an operation process of overlapping a second view image on at least part of a region in which a first view image is displayed by the route guidance device according to an embodiment of the present disclosure.
Figure 21:
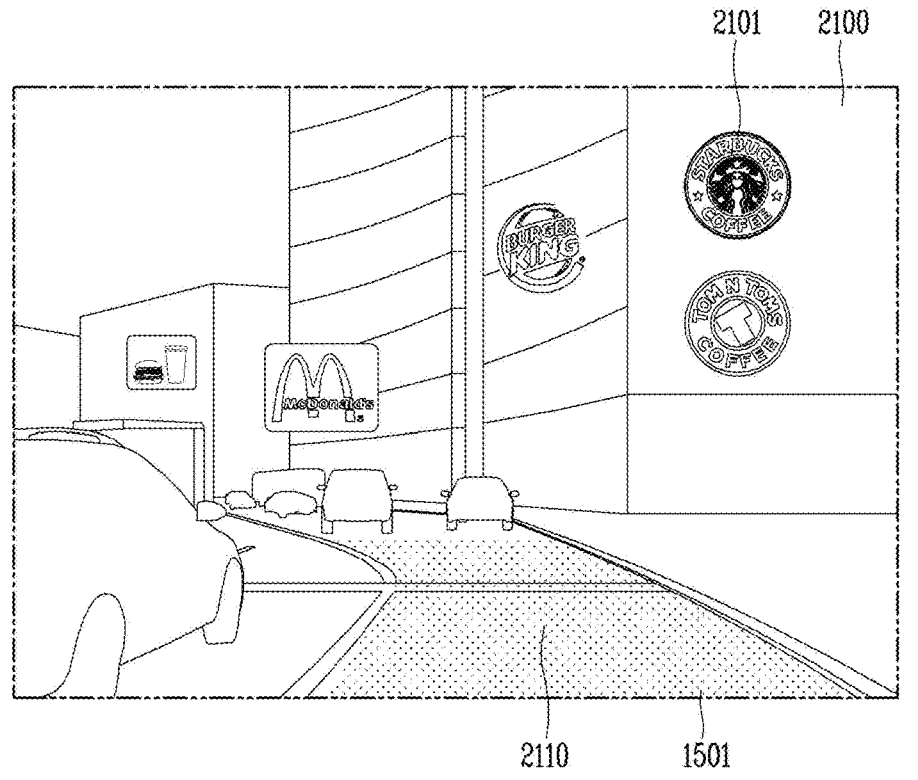
FIGS. 21 and 22 are exemplary views in which a second view image overlaps at least part of a display region in which a first view image is displayed according to the operation process of FIG. 20.
Figure 22:
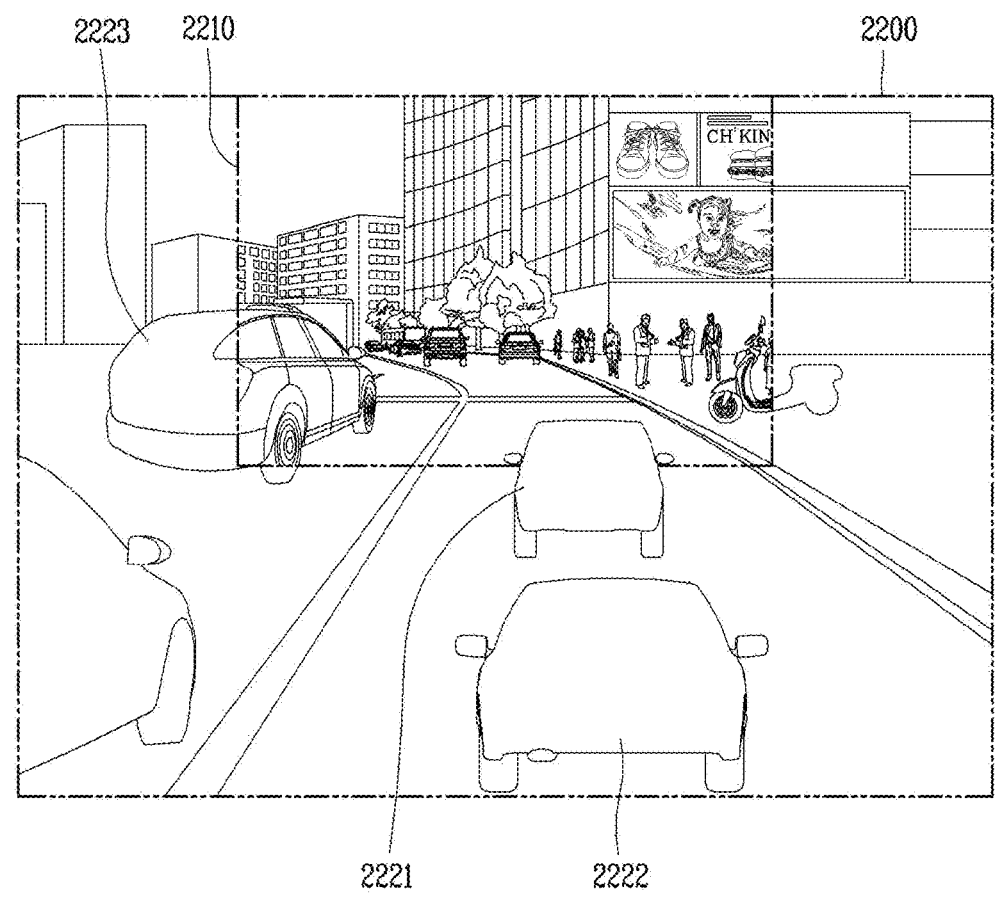

FIG. 20 is a flowchart illustrating an operation process of overlapping a second view image on at least part of a region in which a first view image is displayed by the route guidance device 1300 according to such an embodiment of the present disclosure. Furthermore, FIGS. 21 and 22 are exemplary views in which an AR view image overlaps at least part of a display region in which an MR view image is displayed according to the operation process of FIG. 20.

Referring to FIG. 20, the route guidance device 1300 may generate a second view image corresponding to at least part of the first view image (S2000). In this case, the route guidance device 1300 may generate a view image with the same FOV point of attention through camera calibration sharing. For example, the route guidance device 1300 may generate an MR view image having the same FOV point of attention as the AR view image. Alternatively, an AR view image having the same FOV point of attention as the MR view image may also be generated.

In addition, the route guidance device 1300 may overlap the second view image on at least part of the first view image displayed on the display screen (S2002). Furthermore, path navigating information may be provided based on the objects of the first view image and the objects of the second view image displayed through the first view image in which the second view image overlaps (S2004).

As an example, the route guidance device 1300 may generate an MR view image corresponding to the remaining region except for a road on which the vehicle drives while an AR view image according to an AR mode is displayed. In this case, the generated MR view image may be a view image having the same FOV point of attention and the same FOV as those of the AR view image.

In addition, the route guidance device 1300 may overlap the MR view image in the remaining region except for a region of an AR view image in which the driving road is displayed. Therefore, as shown above in FIG. 21, a display screen in which the road region 2110 is displayed in the form of an AR view image, and the remaining region 2100 except for the road region is displayed in the form of an MR view image may be displayed. Accordingly, the road region 2100 may be displayed with an actual road image captured by the camera, and an AR object 1501 indicating a lane recognized in the road image. Furthermore, the remaining region 2100 except for a road region may be displayed in the form of a building model image on a digitally twinned three-dimensional map due to the overlap of the MR view image.

Meanwhile, when the route guidance device 1300 operates according to an AR mode, the POI information of objects recognized from an actual image captured by the camera may be displayed as an AR object. Accordingly, the route guidance device 1300 may detect POI information according to objects recognized in the actual image, and display an AR object corresponding to the POI information on the display screen that overlaps the MR view image. Therefore, as shown in FIG. 21, AR objects 2101 corresponding to the detected POI information may be displayed on a building model image on a digitally twinned three-dimensional map.

In this case, the shape of a building model on the digitally twinned three-dimensional map may not be more complicated than that of an actual image of the building. Accordingly, as shown in FIG. 21, the AR object 2101 may be displayed on a background having a lower complexity to greatly improve the visibility of the AR object 2101. That is, the visibility of exposed POI information may be improved.

Meanwhile, according to the foregoing description, in the case of a display screen as shown in FIG. 21, it has been described that an MR view image overlaps an AR view image, but on the contrary, an AR view image corresponding to at least part of display screen may of course overlap an MR view image displayed on the display 251. In this case, part of an AR view image corresponding to a road on which the vehicle drives may overlap an MR view image.

In this case, the route guidance device 1300 may display AR objects corresponding to POI information of objects recognized through an actually captured image to overlap an MR view image displayed on the display 251 at locations on the MR view image corresponding to the recognized objects, and thus a display screen may of course be displayed as shown above in FIG. 21.

Meanwhile, the route guidance device 1300 may display a display screen in which an AR view image is overlapped in a region corresponding to a viewing angle of the camera while the display 251 displays an MR view image.

For example, as shown in FIG. 22, the route guidance device 1300 may display an MR view image 2200 corresponding to a surrounding region including a vehicle on which the route guidance device 1300 is mounted. In this case, since an image on a digitally twinned three-dimensional map is displayed, an image of a model corresponding to a vehicle or a building other than an actual image may be displayed on the display 251.

In this state, the route guidance device 1300 may generate an AR view image 2210 according to an image acquired through the camera. In this case, the AR view image may be limited to a field of view range, that is, FOV, that can be acquired through the camera, and thus may be an image corresponding to a region of the MR view image having a wider FOV. Here, the AR view image 2210 and the MR view image 2200 may be images having the same FOV point of attention.

Then, the route guidance device 1300 may overlap the AR view image 2210 on the MR view image 2200 based on the FOV point of attention. Accordingly, as shown in FIG. 22, path navigating information may be provided in the form of the AR view image 2210 in a range that the passenger can visually confirm, that is, a region corresponding to a viewing angle of the camera. Accordingly, path navigating information based on an actual image may be displayed.

On the contrary, for a range in which the passenger is unable to check with his or her naked eyes, that is, a rear region of the vehicle 2221 on which the route guidance device 1300 is mounted, and a blind spot region corresponding another vehicle 2222 approaching from the rear of the vehicle 2221, and both lateral directions out of the viewing angle range, path navigating information may be provided in the form of the MR view image 2200. Accordingly, path information may be displayed in the form of an image of a digitally twined three-dimensional map and a virtual object.

On the other hand, in the case of FIG. 22 as described above, through camera calibration sharing, the MR view image 2200 may be converted from coordinates on a three-dimensional space into coordinates on a two-dimensional image according to a visual field formed based on the same FOV point of attention as the AR view image 2210. In this case, the AR view image 2210 may be a region corresponding to a near limit of a frustum-shaped visual field formed according to the same FOV point of attention, and the MR view image 2200 may be a region corresponding to a far limit of the frustum-shaped visual field.

In this case, objects adjacent to the AR view image 2210 may be objects having the same distance from the FOV point of attention as the AR view image 2210. Accordingly, the AR view image 2210 and the MR view image 2200 may be view images connected to each other through a boundary surface of the view image (e.g., a boundary surface of the AR view image 2210). Therefore, an object displayed in the AR view image 2210 may move seamlessly to a region where the MR view image 2200 is displayed through a boundary surface of the view image, or an object displayed in the AR view image 2210 may move seamlessly to a region where the MR view image 2200 is displayed. In this case, it may be displayed as a virtual object or an object on an actual image depending on whether it is out of a FOV of the camera.

Therefore, in the case of a vehicle object 2223 shown in FIG. 22, a partial region included within the FOV of the camera may be displayed in the form of an actual image, and the remaining region out of the FOV of the camera may be displayed in the form of a virtual object. In this case, when the entire vehicle object 2223 is included in the FOV of the camera as the speed of the vehicle corresponding to the vehicle object 2223 is further increased, the entire vehicle object 2223 may be displayed in the form of an actual image. However, when the entire vehicle object 2223 is out of the FOV of the camera as the speed of the vehicle corresponding to the vehicle object 2223 is further decreased, the entire vehicle object 2223 may be displayed in the form of a virtual object.

Meanwhile, through the foregoing description, examples of switching from a state in which an AR view image is displayed (AR mode) to a state in which an MR view image is displayed (MR mode) or, conversely, switching from the MR mode to the AR mode have been described.

In addition, examples of dividing a display screen to display an AR view image and an MR view image, respectively, or displaying a display screen in which the AR view image and the MR view image are mixed, and examples of allowing at least part of a display screen displayed with an AR view image or an MR view image to overlap the MR view image or the AR view image have been described at in detail.

As such, the route guidance device 1300 according to an embodiment of the present disclosure may display different view images displayed in different operation modes on a single screen. In addition, the route guidance device 1300 may configure a display region including a plurality of AR view images and a plurality of MR view images in a similar manner.

Figure 23:
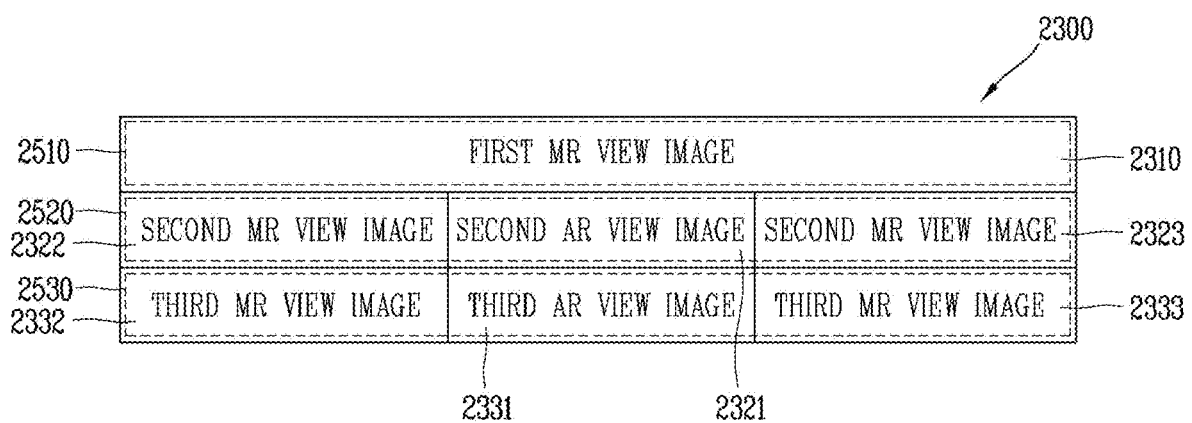
FIG. 23 is an exemplary diagram illustrating an example in which a plurality of AR view images and a plurality of MR view images are mixed to constitute a display screen by the route guidance device according to an embodiment of the present disclosure.

FIG. 23 is an exemplary diagram illustrating an example in which a display region 2300 including a plurality of AR view images and a plurality of MR view images is configured by the route guidance device 1300 according to an embodiment of the present disclosure.

In this case, the route guidance device 1300 may provide path navigating information (first view image 2510) on a road on which the vehicle will drive in the future, that is, a predicted driving path, and path navigating information (second view image 2520) on a driving path on which the vehicle is currently driving, and path navigating information (third view image 2530) on a driving path the vehicle has already driven on a single display screen.

In this case, since the first view image 2510 is a path that has not yet been driven, an AR view image cannot be displayed. Accordingly, the route guidance device 1300 may display information on a predicted driving path on which the vehicle will drive in the future according to an MR view image display method, such as a drone view or a bird view (first MR view image 2310).

On the other hand, in the case of a driving path in which the vehicle is currently driving, it may be displayed according to both the AR view image and the MR view image. The route guidance device 1300 may display an AR view image corresponding to a current forward driving image of the vehicle in part of the second view image region 2520 (a second AR view image 2321), and display at least one MR view image for a driving path in which the vehicle is currently driving in the remaining region of the second view image region 2520 (second MR view images 2322, 2323).

Here, the second MR view images 2322, 2323 and the second AR view image 2321 may be images sharing camera calibration. Accordingly, the second MR view images 2322, 2323 and the second AR view image 2321 may be images in which coordinates on a three-dimensional space are converted into coordinates on a two-dimensional image according to a visual field formed based on the same FOV point of attention.

As an example, the second MR view images 2322, 2323 may be displayed on the left and right sides of the second AR view image 2321. Furthermore, the second MR view images 2322, 2323 may be MR view images including movable objects with the AR view image in real time. In this case, the second MR view images 2322, 2323 may be MR view images that display objects currently located in blind spots on both left and right sides of the vehicle.

Meanwhile, the third view image region 2530 may be a region in which path navigating information on a driving path on which the vehicle has already driven is displayed. In this case, the route guidance device 1300 may display an AR view image that displays a past movement path and objects according to a path that has been passed by the vehicle in part of the third view image region 2530 (third AR view image 2331), and display at least one MR view image (third MR view images 2332, 2333) related to the past movement path and objects according to the path that has been passed by the vehicle in the remaining region of the third view image region 2530.

Similarly, the third MR view images 2332, 2333 and the third AR view image 2331 may be images sharing camera calibration. Accordingly, the second MR view images 2322, 2323 and the second AR view image 2321 may be images in which coordinates on a three-dimensional space are converted into coordinates on a two-dimensional image according to a visual field formed based on the same FOV point of attention.

As an example, the third MR view images 2332, 2333 may be displayed on the left and right sides of the third AR view image 2331. In this case, the third MR view images 2332, 2333 may be MR view images that display objects currently located in blind spots on both left and right sides of the vehicle.

Meanwhile, objects displayed in the second view image region 2520 may be displayed in the form of an AR view image or an MR view image according to the movement of the corresponding objects. Similarly, objects displayed in the third view image region 2530 may be displayed in the form of an AR view image or an MR view image according to the movement of the corresponding objects.

However, since the second view image region 2520, the third view image region 2530, and the first view image region 2510 have different times of driving, objects cannot be moved between the first view image region 2510 to the third view image region 2530. Accordingly, an object displayed in the second view image region 2520 cannot be moved to the third view image region 2530 or, conversely, an object displayed in the third view image region 2530 cannot be moved to the second view image region 2520.

On the other hand, FIG. 24 is an exemplary diagram in which a composite screen of an AR view image and an MR view image is displayed through the route guidance device 1300 according to an embodiment of the present disclosure.

As an example, when a driving state of the vehicle is a preset state, the route guidance device 1300 may provide path information on a path on which the vehicle will drive in the future using an MR object, as shown in (a) of FIG. 24. In this case, the route guidance device 1300 may display an object (hereinafter, vehicle object) 2411 corresponding to the vehicle on which the route guidance device 1300 is mounted on a digitally twinned three-dimensional map. In addition, the route guidance device 1300 may further display a sub virtual object 2412 corresponding to the vehicle object moving along a path on which the vehicle will drive from the vehicle object 2111.

The sub virtual object 2412 may be an object similar to the vehicle or may be an object displayed in a semi-transparent manner on the route guidance device 1300. Accordingly, it may be possible to distinguish from the vehicle object 2411 depending on whether it is displayed in semi-transparent manner. The sub virtual object 2412 may be referred to as a "ghost car" based on the virtual object displayed in a semi-transparent manner.

The route guidance device 1300 may use the ghost car object 2412 to pre-drive a driving path on which the vehicle should drive from the location of the vehicle object 2411 in advance. In addition, an MR view image such as a bird view may be further displayed along a path along which the ghost car object moves. As such, the route guidance device 1300 may provide path information of a path on which the vehicle will drive in advance using an MR view image, and a function of providing path information on a path to be driven in advance in this way is referred to as a "preview".

When the preview is provided in this way, as shown in (a) of FIG. 24, a first MR view image 2410 in which a vehicle object corresponding to a current vehicle is displayed, and a second MR view image 2420 that displays the path information of a path along which the ghost car object moves may be displayed on different regions of the display screen.

In addition, the route guidance device 1300 may display an AR view image using an actual image acquired from the camera of the vehicle instead of the first MR view image 2410. In this case, as shown in (b) of FIG. 24, an AR view image 2450 displaying a front image of the vehicle that is currently driving may be displayed in a first region of the display region, and an MR view image 2451 displaying a vehicle object corresponding to the vehicle may be displayed in a second region thereof. In this case, the MR view image 2451 may be an MR view image (first MR view image) corresponding to a current location of the vehicle or an MR view image (second MR view image-preview) that displays a driving path to a destination in advance.

Meanwhile, the route guidance device 1300 may of course display an MR view image as well as an image 2461 in a 2D map mode that displays two-dimensional map information corresponding to the current location of the vehicle. In this case, as shown in (c) of FIG. 24, an AR view image 2460 or an MR view image may be displayed in one region on the display 251, and a two-dimensional map image 2461 including a current location of the vehicle may be displayed in another region.

Figure 25:
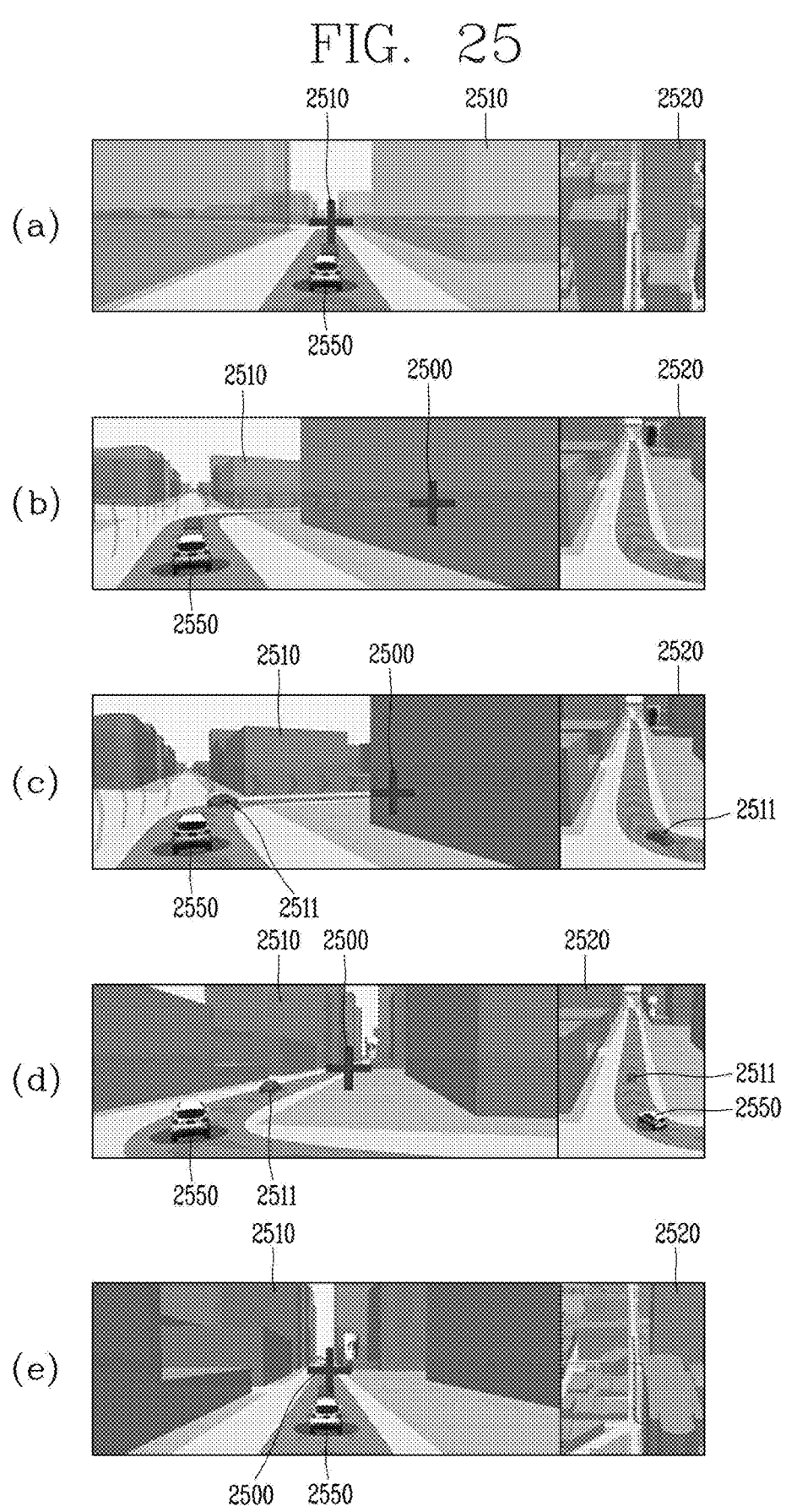
FIG. 25 is an exemplary view illustrating an example in which the route guidance device according to an embodiment of the present disclosure provides preview information on a path for a vehicle to drive as path navigating information provided through MR.

FIG. 25 is an exemplary view illustrating an example in which the route guidance device according to an embodiment of the present disclosure provides preview information on a path for a vehicle to drive as path navigating information provided through MR.

For example, when a vehicle is adjacent to a point at which a driving direction is changed, that is, a turn point, the route guidance device 1300 may provide a preview using the ghost car to provide path navigating information for the turn point. In this case, the route guidance device 1300 may display a driving path along which the ghost car object moves as an MR view image.

In this case, as shown above in (a) of FIG. 24, the route guidance device 1300 may display a first MR view image that provides a view image that looks at the vehicle at a relatively low altitude through different regions of the display screen, and a second MR view image that provides a view image of a driving path according to the movement of the ghost car object at a high altitude.

FIG. 25 illustrates an example of a display screen displaying a driving path according to the movement of a ghost car object as described above.

Referring to (a) of FIG. 25, (a) of FIG. 25 illustrates an example of a vehicle object 2550 that drives on a road. In this case, a point of attention 2500 of the first MR view image 2510 may be oriented toward the center of the first MR view image. That is, the first MR view image 2510 may display an image acquired through an MR camera (first MR camera) that focuses on the center as the first MR view image. In addition, the second MR view image 2520 may display an image (e.g., a bird view image) acquired from a second MR camera that looks at a driving path on which the vehicle object 2550 drives from a high altitude.

In this state, when the vehicle object 2550 is adjacent to the turn point, the route guidance device 1300 may display an image acquired from the first MR camera that focuses on a driving path on which the vehicle should drive past the turn point as a first MR view image. Accordingly, as shown in (b) of FIG. 25, the first MR view image 2510 oriented toward a driving path obscured by a building may be displayed.

Meanwhile, the route guidance device 1300 may locate the second MR camera at a tangent point of a turning radius of the turn point, and may allow the vehicle to be oriented toward a direction in which the vehicle should drive at the tangent point. Furthermore, an image acquired by the second MR camera may be provided as the second MR view image 2520.

Accordingly, the MR view image acquired by the second MR camera may be an image indicating an exit direction of the turn point, that is, a path on which the vehicle should drive in the future past the turn point, as shown above in (b) of FIG. 25.

In addition, when the vehicle is adjacent to the turn point, the route guidance device 1300 may further display a ghost car object 2511 corresponding to the vehicle object 2550 as shown in (c) of FIG. 25. In this case, the ghost car object 2511 may move along a turn point prior to the vehicle object 2550. Then, the ghost car object 2511 may be displayed on the second MR view image 2520 oriented toward an exit direction of the turn point.

On the other hand, when the vehicle changes a direction along a driving path at the turn point, as shown in (d) FIG. 25, the point of attention 2500 of the first MR camera may be gradually moved to the center of the MR view image 2510 according to the changed driving direction of the vehicle. Furthermore, an image of the vehicle object 2550 entering the exit direction past the turn point may be displayed on the second MR view image 2520. In this case, since the vehicle is not yet out of the turn point, a state in which the ghost car object 2511 is displayed may be maintained in the first MR view image 2510 and the second MR view image 2520, respectively.

Furthermore, when the vehicle has completely passed the turn point, the point of attention 2500 of the first MR camera may be oriented toward the center of the first MR view image 2510. In addition, the second MR view image 2520 may be displayed as a bird view image that looks at a driving path on which the vehicle object 2550 drives from a high altitude.

Meanwhile, as described above, a preview provided through the MR view image may be activated automatically (automatic activation) or activated by a passenger's selection (manual activation) according to a driving state (e.g., whether it is stopped or driving) or a driving path (e.g., whether it has entered a designated path such as a turn point) of the vehicle.

Figure 26:
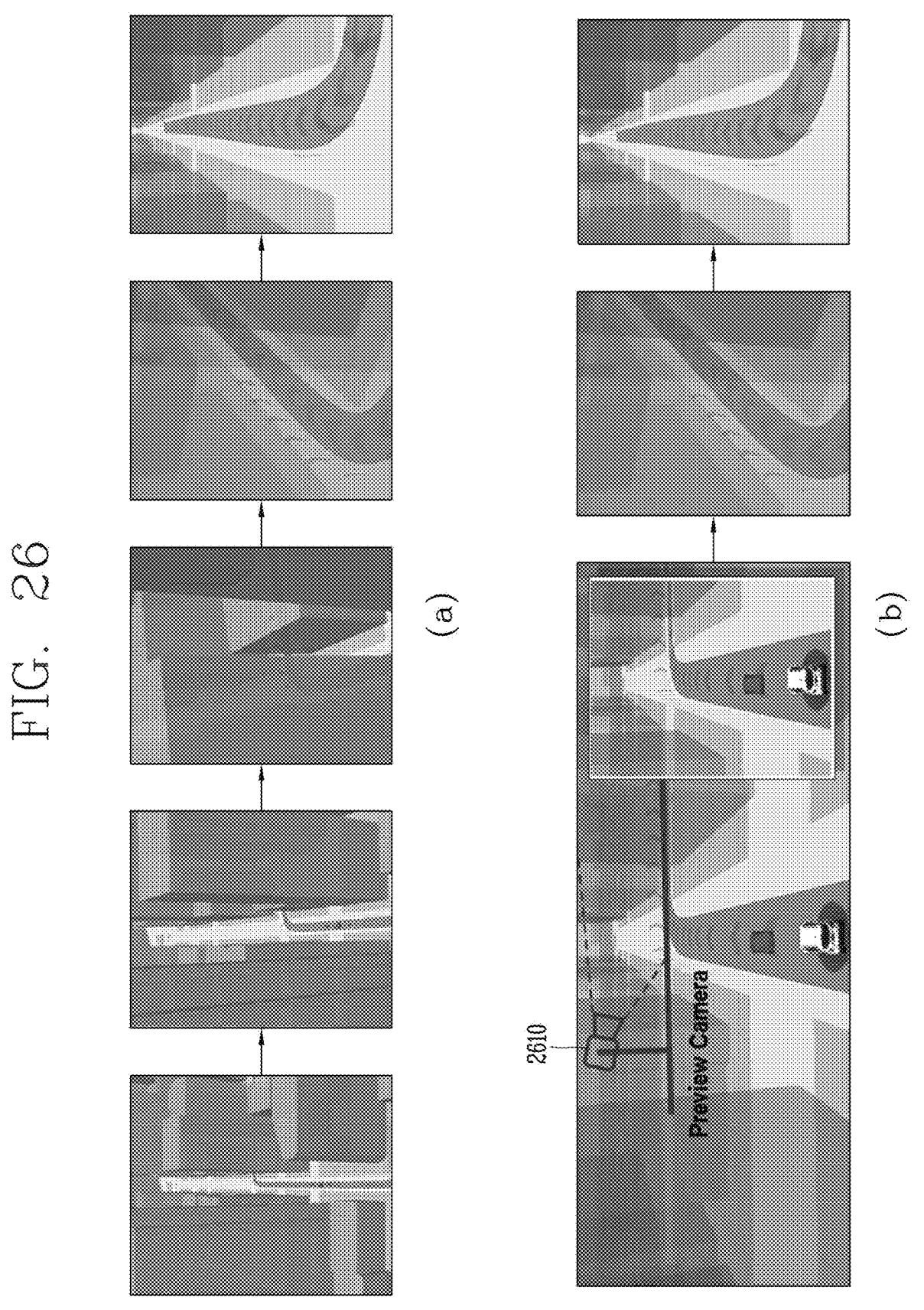

When the preview is automatically activated, the route guidance device 1300 may gradually change an MR view image displayed on one region of the display screen to an MR view image that displays a path on which the vehicle drives as illustrated above in FIG. 25. That is, as illustrated in FIG. 25, when the second MR view image is a bird view image acquired from the second MR camera oriented toward a vehicle object at a high altitude, the route guidance device 1300 may gradually move the second MR camera to a location oriented toward an exit direction of the turn point. That is, it may provide an effect (drone view) as if the second MR camera providing the second MR view image is moved by a drone. FIG. 26A illustrates an example in which the second MR view image is gradually changed from a bird view image to an image oriented toward an exit direction of the turn point according to the movement of the second MR camera.

On the other hand, when the preview is manually activated according to the passenger's selection, the route guidance device 1300 may display the second MR view image in a PIP scheme on part of the display screen according to a user's selection while the first MR view image is displayed on the entire display screen.

In this case, the second MR view image may be gradually changed from an MR view image indicating a direction in which the vehicle is currently driving to an image acquired from the second MR camera 2610 located at a tangent point to a turning radius of the turning point. Therefore, as shown in (b) of FIG. 26, while the MR view image having the same point of attention as the first MR view image is displayed, it may be gradually changed to an MR image indicating a driving path in a direction in which the vehicle should drive, that is, an exit direction of the turn point, from a tangent point of the turn point.

Figure 27:
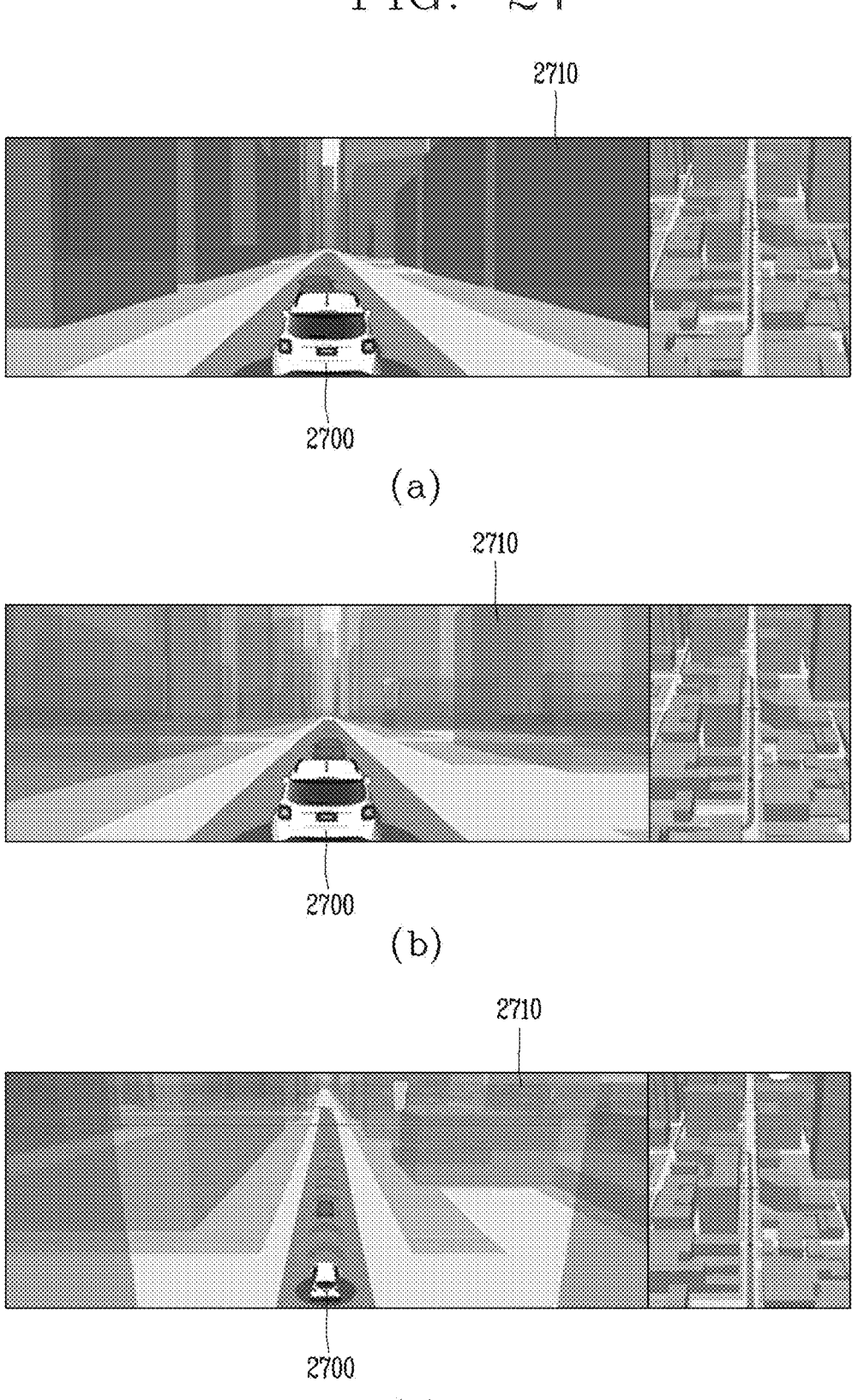
FIG. 27 is an exemplary diagram illustrating an example of an MR view image in which the route guidance device according to an embodiment of the present disclosure displays images of surrounding buildings differently according to a speed of a vehicle.

Meanwhile, the route guidance device 1300 according to an embodiment of the present disclosure may display an image of surrounding buildings in a different manner in order to further increase the visibility of the driving path. FIG. 27 is an exemplary diagram illustrating an example of an MR view image in which the route guidance device according to an embodiment of the present disclosure displays images of surrounding buildings differently according to a speed of a vehicle as described above.

When a driving speed of the vehicle is low, the route guidance device 1300 may display buildings around the driving path as non-transparent images of three-dimensional objects, as shown in (a) of FIG. 27.

In this state, when the driving speed of the vehicle increases, the route guidance device 1300 may increase the transparency of three-dimensional objects corresponding to the buildings around the driving path in proportion to the increasing speed of the vehicle, as shown in (b) of FIG. 27. Accordingly, as the speed of the vehicle increases, as shown in (b) of FIG. 27, buildings around the vehicle may be displayed as semi-transparent three-dimensional objects.

Meanwhile, while buildings around the vehicle are displayed as semi-transparent three-dimensional objects, the speed of the vehicle may further increase. However, the three-dimensional objects corresponding to the buildings around the vehicle may no longer become transparent when the transparency reaches a predetermined level. This is because when the transparency is too high, it may become difficult to recognize the buildings around the vehicle.

In this case, the route guidance device 1300 may further increase a shooting angle at which the MR view image is provided. That is, an image of a driving path of the vehicle acquired at a higher altitude may be provided as an MR view image. Therefore, as shown in (c) of FIG. 27, an MR view image acquired from a higher angle may be provided, and accordingly, a longer viewing distance may be provided when the speed of the vehicle is high.

Figure 28:
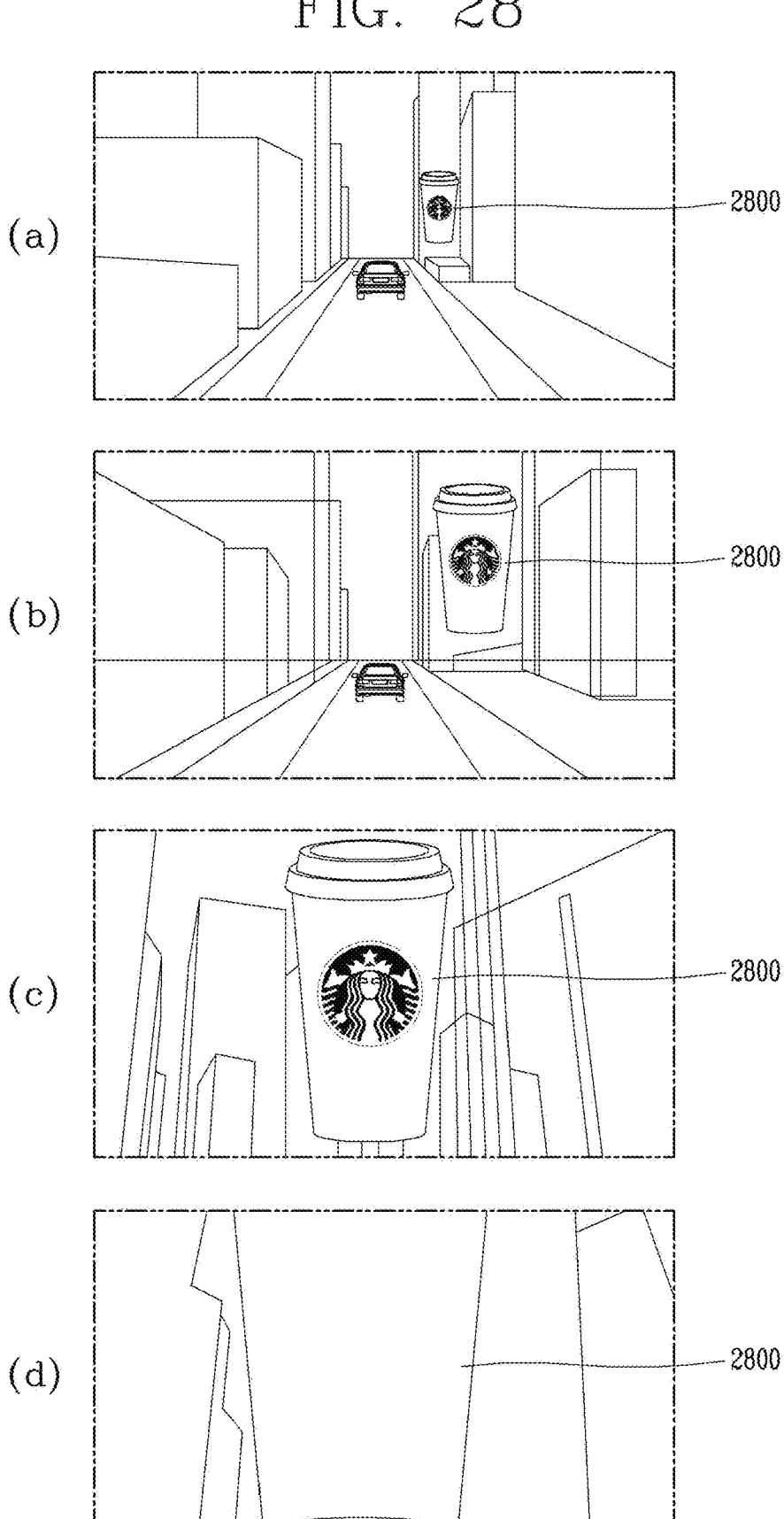
FIG. 28 is an exemplary diagram illustrating an example in which the route guidance device according to an embodiment of the present disclosure provides POI information through an MR view image.

On the other hand, FIG. 28 is an exemplary diagram illustrating an example in which the route guidance device 1300 according to an embodiment of the present disclosure provides POI information through an MR view image.

The route guidance device 1300 according to an embodiment of the present disclosure may display POI information through an image of a digitally twinned three-dimensional map provided through an MR view image. Accordingly, as shown in (a) of FIG. 28, when a building corresponding to the POI information is exposed on an MR view image, the POI information may be displayed on a virtual object corresponding to the building.

In addition, a size of the POI object may be changed according to a changed distance between the vehicle and the building corresponding to the POI information according to the driving of the vehicle. That is, as shown in (b) and (c) of FIG. 28, when the vehicle gradually approaches a building corresponding to the POI information, the POI object may be gradually enlarged and displayed. Furthermore, as shown in (c) of FIG. 28, when the POI object is enlarged and displayed to a size above a predetermined level as the vehicle enters a building corresponding to the POI information within a predetermined distance, the route guidance device 1300 may capture an image of the POI object, and store the captured image as a thumbnail image. In this case, the captured image of the POI object may be used to provide a service using the POI information later.

Meanwhile, as the vehicle moves, when the vehicle passes a building corresponding to the POI information, the POI object may be deviated from a viewing angle of the vehicle, that is, a region in front of the vehicle. Then, the route guidance device 1300 may show the POI object as a default object.

In this case, the default object may be a polygonal virtual object to which a texture is not reflected, as shown in (c) of FIG. 28. That is, when an MR view image (e.g., bird view image) that displays not only a front of the vehicle but also a surrounding of the vehicle is provided, POI objects around a driving path that the vehicle has already passed may be displayed as shaded objects without colors, images, or textures, and POI objects around a driving path on which the vehicle has not yet passed may be displayed as objects including colors, images, or textures, depending on a location where the vehicle is driving.

Figure 29:
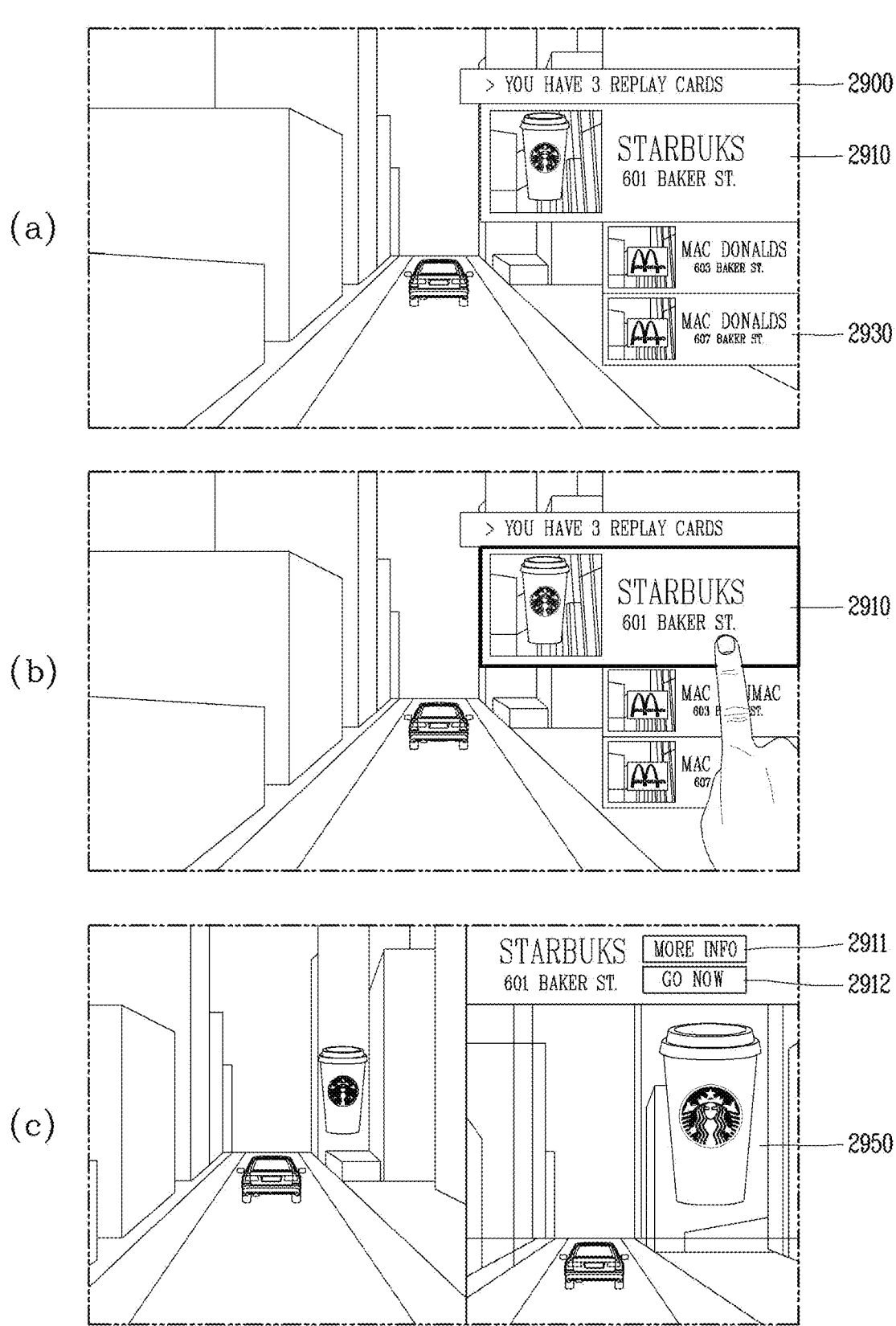
FIG. 29 is an exemplary diagram illustrating an example in which the route guidance device according to an embodiment of the present disclosure displays detailed information on any one of POIs collected according to the driving of a vehicle based on a passenger's selection.

On the other hand, FIG. 29 is an exemplary diagram illustrating an example in which the route guidance device 1300 according to an embodiment of the present disclosure displays detailed information on any one of POIs collected according to the driving of a vehicle based on a passenger's selection.

As illustrated above in FIG. 28, the route guidance device 1300 may capture and store POI objects exposed around the vehicle while the vehicle is driving. In addition, as shown in (a) of FIG. 29, thumbnail images of the stored POI objects may be displayed on the display 251 at the request of the passenger.

In this case, the thumbnail images of the POI objects may be provided in the form of a card (replay card, 2900) including POI information of the corresponding POI objects. Furthermore, they may be provided in a sorted state in the order of the collected time. As an example, a card 2910 corresponding to a POI object collected at the latest time may be displayed at the top, and a card 2930 corresponding to a POI object collected at the earliest time may be displayed at the bottom.

In this state, as shown in (b) of FIG. 29, the passenger may select any one replay card 2910 through an input such as a touch or voice. Then, the route guidance device 1300 may display information on the POI object corresponding to the currently selected replay card 2910 on the display 251.

In this case, the route guidance device 1300 may divide a region of the display 251 or overlap one region on the display 251 according to a PIP scheme, as shown in (c) of FIG. 29, to display a second MR view image including the information of the POI object. In this case, the information of the POI object may include a name of a service or company corresponding to the POI, a POI object, and an image in which a location on a driving path to which the POI object is exposed is captured. In addition, the route guidance device 1300 may set a new destination to an address corresponding to a POI object based on a passenger's selection for the information of the POI object displayed through the second MR view image, or provide the passenger with a POI function such as a service reservation through a network connection.

The effects of a route guidance device and a route guidance system according to the present disclosure will be described as follows.

First, the present disclosure may provide a view image according to mixed reality that matches an augmented reality view image when it is difficult for the view image provided according to augmented reality to display accurate path navigating information, thereby having an advantage capable of providing a driver with accurate path navigating information regardless of an environment or complexity of a real world around a vehicle or an image state of the real world required therefrom.

Second, the present disclosure may display part of a view image according to mixed reality that matches an augmented reality view image on part of the augmented reality view image provided according to augmented reality, or allow at least part of the mixed reality view image to overlap at least part of the augmented reality view image, thereby having an advantage capable of further improving the visibility of information displayed on objects around the vehicle.

Third, the present disclosure may display a mixed reality view image according to mixed reality together with an augmented reality view image provided according to augmented reality, thereby having an advantage capable of simultaneously providing information of objects located in a region within a viewing angle displayed through augmented reality, and information of objects located in a region other than the viewing angle.

The foregoing present disclosure may be implemented as codes (an application or software) readable by a computer on a medium written by the program. The control method of the above-described autonomous driving vehicle may be implemented by codes stored in a memory or the like.

The computer-readable media may include all kinds of recording devices in which data readable by a computer system is stored. Examples of the computer-readable media may include a hard disk drive (HDD), a solid-state disk (SSD), a silicon disk drive (SDD), a ROM, a RAM, a CD-ROM, a magnetic tape, a floppy disk, an optical data storage device, and the like, and also include a device implemented in the form of a carrier wave (e.g., transmission via the Internet). In addition, the computer may include a processor or controller. The above detailed description is therefore to be construed in all aspects as illustrative and not restrictive. The scope of the invention should be determined by reasonable interpretation of the appended claims and all changes that come within the equivalent scope of the invention are included in the scope of the invention.

What is claimed is:

1. A route guidance device comprising:
a transceiver and receiver that communicates with a cloud
   server;
an interface that receives an image of an environment
   around a vehicle comprising an image of a road on
   which the vehicle drives, and sensing information that
   has sensed a driving state of the vehicle from at least
   one sensor provided in the vehicle;
an augmented reality (AR) engine that renders an AR
   view image comprising at least one AR information using at least one of the sensing information and point(s) of interest (POI) information received from the cloud server;

a virtual view navigation engine that generates a reality-based virtual view image comprising at least one virtual object based on the sensing information and map information; and a processor that controls the interface to display the AR view image, or the reality-based virtual view image including at least one real-world-based virtual object and corresponding to the AR view image, on a display of the vehicle for driving guidance of the vehicle, wherein the processor is further configured to:

detect a view image that matches a current driving situation of the vehicle based on the sensing information while the AR view image is displayed, determine whether the driving guidance using the AR view image is possible based on the detected view image, and based on a determination that the driving guidance using the AR view image is not possible, switch the view image displayed on the vehicle display to the virtual view image that reflects the current driving situation of the vehicle.

2. The route guidance device of claim 1, wherein the processor determines whether a zone in which the vehicle is driving is a highway or a general road in a downtown based on the sensing information, and detects any one view image that matches a driving environment of the vehicle based on a result of the determination.

3. The route guidance device of claim 1, wherein the processor determines a road condition of a zone in which the vehicle is driving based on the sensing information, and detects any one view image that matches a driving environment of the vehicle based on the determined road condition of the road or a curvature of the road.

4. The route guidance device of claim 1, wherein the processor determines a time at which the vehicle is driven and weather around the vehicle based on the sensing information, and detects any one view image that matches a driving environment of the vehicle based on at least one of the determined time or weather.

5. The route guidance device of claim 1, wherein the processor determines a driving state of the vehicle based on the sensing information, and detects any one view image that matches a driving environment of the vehicle based on at least one of whether the vehicle is stopped or driving, and a speed at which the vehicle is driving.

6. The route guidance device of claim 1, wherein the processor determines a traffic congestion condition around the vehicle based on the sensing information, and detects any one view image that matches a driving environment of the vehicle based on the determined traffic congestion condition.

7. The route guidance device of claim 1, wherein the processor determines structures detected from a vicinity of the vehicle based on the sensing information, and detects any one view image that matches a driving environment of the vehicle based on sizes of the determined structures.

8. The route guidance device of claim 1, wherein the processor controls the interface to display warning information for warning of a potential collision detected from a danger region located around the vehicle or from a vicinity of the vehicle, and detects any one view image that matches a driving environment of the vehicle according to whether the displayed warning information is exposed from a front of the vehicle.

9. The route guidance device of claim 1, wherein the processor determines a driving path of the vehicle based on the sensing information, detects the AR view image as a view image that matches a driving environment of the vehicle when the determined driving path is a straight section, and detects the reality-based virtual view image as a view image that matches a driving environment of the vehicle when the vehicle approaches to a junction, an exit, or a destination on the path within a predetermined distance.

10. The route guidance device of claim 1, wherein the processor calculates a curvature variation of a road and a slope variation of the road on which the vehicle drives based on the sensing information, calculates an error rate (fitting rate) between an actual image of a front of the vehicle acquired through a camera of the vehicle and an AR object displayed on the actual image based on the calculated curvature variation and slope variation, detects the reality-based virtual view image as a view image that matches a driving environment of the vehicle when the calculated error rate exceeds a threshold value, and detects the AR view image as a view image that matches the driving environment of the vehicle when the calculated error rate is below the threshold value.

11. The route guidance device of claim 10, wherein the processor calculates a curvature variation of a road according to a detection value of a gyro sensor that detects an inclination of the vehicle and a detection result of a lane recognizer that detects a lane of the road on which the vehicle drives, and detects a slope variation of the road according to a vertical profile detected based on map information on the road on which the vehicle is currently driving and a road shape detected through a high-definition map (HD MAP).

12. The route guidance device of claim 1, wherein the processor detects the AR view image as a view image that matches a driving environment of the vehicle when path information requested by a passenger of the vehicle is path information on a driving path where the vehicle is currently driving, and detects the reality-based virtual view image as a view image that matches the driving environment of the vehicle when the path information requested by the passenger is path information on a driving path where the vehicle has not yet driven or path information on a driving path where the vehicle has already driven.

13. The route guidance device of claim 1, wherein the processor changes the camera calibration of the reality-based virtual view image according to the camera calibration of the AR view image to generate the reality-based virtual view image having the same point of attention as that of the AR view image when conversion of the view image is started.

14. The route guidance device of claim 13, wherein the reality-based virtual view image is an image having the same size and ratio of the AR view image based on a field of view (FOV) of the AR view image, and an image in which a point of attention of the reality-based virtual view image corresponding to the point of attention of the AR view image is formed at the same location as the point of attention of the AR view image.

15. The route guidance device of claim 13, wherein the processor detects a horizontal reference line and a vertical reference line from a point of attention of the AR view image, and generates the reality-based virtual view image whose point of attention corresponds to a point where the horizontal reference line and the vertical reference line of the AR view image intersect as the reality-based virtual view image having the same point of attention as the AR view image.

16. The route guidance device of claim 13, wherein the processor determines whether or not a view position of the reality-based virtual view image matches a view position of the AR view image, and generates the reality-based virtual view image having the same point of attention according to a result of the determination.

17. The route guidance device of claim 1, wherein the processor controls the interface to further display an additional screen comprising additional information while the AR view image or the reality-based virtual view image is displayed on the display, and wherein the additional information comprises at least one of point of interest (POI) information, driving history, and path navigating information in the form of a bird view image.

18. The route guidance device of claim 17, wherein the additional screen is displayed on the display on which the AR view image or the reality-based virtual view image is displayed in any one of screen division, picture-in-picture (PIP), and multi-layer schemes.

19. The route guidance device of claim 1, wherein the processor switches the AR view image into the reality-based virtual view image according to whether or not a preset view image switching condition is satisfied, the preset view image switching condition includes a case where the AR view image is not appropriate for displaying the information required according to a driving environment of the vehicle.

20. A route guidance system comprising:

a route guidance device mounted on a vehicle configured to display an AR view image comprising augmented reality (AR) information rendered based on received point of interest (POI) information or a reality-based virtual view image comprising MR information rendered based on three-dimensional map information on a display of the vehicle; and a cloud server that provides POI information or three-dimensional map information corresponding to a current, past or expected future location of the vehicle to the route guidance device according to a request of the route guidance device, wherein the route guidance device switches a view image displayed on the display to either one of the AR view image and the reality-based virtual view image based on sensing information sensed from at least one sensor provided in the vehicle, and the reality-based virtual view image includes an image rendered with virtual objects equal to objects in an area corresponding to an area displayed through the AR view image, wherein the route guidance device is further configured to:

detect a view image that matches a current driving situation of the vehicle based on the sensing information while the AR view image is displayed, determine whether driving guidance using the AR view image is possible based on the detected view image, and based on a determination that the driving guidance using the AR view image is not possible, switch the view image displayed on the vehicle display to the virtual view image that reflects the current driving situation of the vehicle.

21. The route guidance system of claim 20, wherein the cloud server comprises:

a Digital Twin as a Service (DTaaS) server comprising digitally twinned three-dimensional map information comprising virtual objects corresponding to respective buildings included in a map region;

a mixed reality (MR) server that performs communication connection with the route guidance device, provides the location information of the vehicle collected from the route guidance device to the DTaaS server, and provides digitally twinned three-dimensional map information provided from the DTaaS server to the route guidance device; and an augmented reality (AR) server that receives the location information of the vehicle and the sensing information provided from the route guidance device, and provides POI information corresponding to the received information to the route guidance device.

* * * * *